US012100048B1

(12) United States Patent
Arnott

(10) Patent No.: US 12,100,048 B1
(45) Date of Patent: Sep. 24, 2024

(54) SYSTEM, METHOD AND COMPUTER PROGRAM PRODUCT FOR CONSTRUCTING A CAPITALIZATION-WEIGHTED GLOBAL INDEX PORTFOLIO

(71) Applicant: Robert D Arnott, Newport Beach, CA (US)

(72) Inventor: Robert D Arnott, Newport Beach, CA (US)

(73) Assignee: Robert D. Arnott, Newport Beach, CA (US)

( * ) Notice: Subject to any disclaimer, the term of this patent is extended or adjusted under 35 U.S.C. 154(b) by 60 days.

(21) Appl. No.: 17/900,801

(22) Filed: Aug. 31, 2022

(51) Int. Cl.
*G06Q 40/06* (2012.01)
*G06Q 40/12* (2023.01)

(52) U.S. Cl.
CPC ............. *G06Q 40/06* (2013.01); *G06Q 40/12* (2013.12)

(58) Field of Classification Search
CPC ................................ G06Q 40/00; G06Q 40/06
(Continued)

(56) References Cited

U.S. PATENT DOCUMENTS

| 5,297,032 | A | * | 3/1994 | Trojan | ................... | G06Q 40/04 705/37 |
| 5,761,442 | A | * | 6/1998 | Barr | ...................... | G06Q 40/06 705/36 R |

(Continued)

*Primary Examiner* — Kirsten S Apple
(74) *Attorney, Agent, or Firm* — Reston Law Group, LLP; Ralph P. Albrecht

(57) ABSTRACT

According to an exemplary embodiment of the invention, a system, method and/or computer program product may be provided setting forth various exemplary features, including, electronically constructing data indicative of an index and data indicative of a portfolio of financial objects based on the index including constructing data indicative of an investible risk factor portfolio of financial objects, including: electronically constructing data indicative of an index, including: electronically receiving a plurality of accounting-based data about a plurality of companies in a starting universe; electronically determining a relative non-market capitalization metric-based size of each of the plurality of the companies in the starting universe using a plurality of non-market capitalization-based metrics of the plurality of the accounting-based data about the plurality of the companies in the starting universe; electronically creating, by the at least one electronic computer processor, a plurality of geographic market regions; electronically selecting a first threshold top percentage range calculated based on a cumulative non-capitalization metric-based weight of the relative non-market capitalization metric-based size of each of the plurality of the companies, the cumulative non-capitalization metric-based weight computed based upon a weighted average of the plurality of non-market capitalization-based metrics of the plurality of the accounting-based data about the plurality of the plurality of companies in the starting universe, to obtain an electronic list indicative of electronic index constituents of the plurality of geographic market regions; electronically weighting the electronic list indicative of the electronic index constituents by: electronically combining for the plurality of geographic market regions, the electronic list indicative of the electronic index constituents obtained by the selecting of the first threshold top percentage range calculated based on the cumulative non-capitalization metric-based weight of the accounting-based non-market capitalization-based data about the plurality of the companies in the starting universe; and electronically weighting within each of the plurality of geographic market regions, financial objects of the electronic list indicative of the electronic index constituents, by a float-adjusted market capitalization weight to obtain electronic data indicative of an index of the financial objects may include the electronic list indicative of the electronic index constituents and the float-adjusted market capitalization weights; electronically constructing electronic data indicative of at least one investible portfolio based on the electronic data indicative of the index of the financial objects; and electronically providing the electronic data indicative of the index of the financial objects, and the electronic data indicative of the at least one investible portfolio based on the index of the financial objects.

20 Claims, 16 Drawing Sheets

(58) Field of Classification Search
USPC .......................................................... 705/38
See application file for complete search history.

(56) References Cited

U.S. PATENT DOCUMENTS

| | | | | |
|---|---|---|---|---|
| 5,812,988 A * | 9/1998 | Sandretto | ............... | G06Q 40/00 702/179 |
| 6,009,402 A * | 12/1999 | Whitworth | ............ | G06Q 40/08 705/400 |
| 6,014,645 A * | 1/2000 | Cunningham | ......... | G06Q 40/00 235/379 |
| 6,058,379 A * | 5/2000 | Odom | .................... | G06Q 40/04 705/37 |
| 6,313,833 B1 * | 11/2001 | Knight | .................... | G06Q 40/06 705/37 |
| 6,345,090 B1 * | 2/2002 | Walker | ................... | G06Q 40/04 379/114.03 |
| 6,954,758 B1 * | 10/2005 | O'Flaherty | ............ | G06Q 30/02 707/999.102 |
| 7,165,037 B2 * | 1/2007 | Lazarus | ............. | G06Q 30/0269 705/7.31 |
| 7,376,431 B2 * | 5/2008 | Niedermeyer | ........... | G07C 9/22 379/189 |
| 8,104,678 B2 * | 1/2012 | Yoshikawa | ........ | G06Q 20/4037 235/492 |
| RE43,435 E * | 5/2012 | Krause | ................... | G06Q 40/06 705/37 |
| 8,219,482 B2 * | 7/2012 | Neri | ...................... | G06Q 40/04 705/37 |
| 8,234,201 B1 * | 7/2012 | Canabarro | ............. | G06Q 40/06 705/36 R |
| 8,412,605 B2 * | 4/2013 | Griffin | ................... | G06Q 40/02 705/76 |
| 8,452,681 B2 * | 5/2013 | Clements | ............... | G06Q 40/04 705/37 |
| 8,825,456 B2 * | 9/2014 | Vasudevan | .............. | G06T 7/521 703/2 |
| 9,176,789 B2 * | 11/2015 | Lowes | ................... | G06F 9/5083 |
| 9,760,910 B1 * | 9/2017 | Tuchman | ............... | G06Q 50/01 |
| 10,958,211 B1 * | 3/2021 | Sarwat | ....................... | H02J 3/004 |
| 10,977,110 B2 * | 4/2021 | Matei | ....................... | G06N 5/01 |
| 2002/0161677 A1 * | 10/2002 | Zumbach | ............... | G06Q 40/00 707/E17.001 |
| 2002/0184134 A1 * | 12/2002 | Olsen | .................... | G06Q 40/06 705/37 |
| 2003/0149648 A1 * | 8/2003 | Olsen | .................... | G06Q 40/00 705/35 |
| 2005/0187854 A1 * | 8/2005 | Cutler | .................... | G06Q 40/04 705/37 |
| 2005/0192899 A1 * | 9/2005 | Reardon | ................ | G06Q 40/00 705/40 |
| 2006/0195391 A1 * | 8/2006 | Stanelle | .................. | G06Q 40/02 705/38 |
| 2007/0244795 A1 * | 10/2007 | Lutnick | .................. | G06Q 40/00 705/37 |
| 2008/0255910 A1 * | 10/2008 | Bagchi | ............... | G06Q 10/0635 705/7.28 |
| 2008/0288326 A1 * | 11/2008 | Abramowicz | ..... | G06Q 30/0605 705/7.29 |
| 2008/0288889 A1 * | 11/2008 | Hunt | ...................... | G06Q 30/02 715/810 |
| 2008/0301019 A1 * | 12/2008 | Monk | ................... | G06Q 20/4016 705/35 |
| 2009/0024539 A1 * | 1/2009 | Decker | .................. | G06Q 40/06 705/36 R |
| 2010/0023460 A1 * | 1/2010 | Hughes | .................. | G06Q 40/06 705/36 R |
| 2010/0312701 A1 * | 12/2010 | Bosch | ..................... | G07F 19/20 705/43 |
| 2011/0047006 A1 * | 2/2011 | Attenberg | .......... | G06Q 30/0282 705/347 |
| 2011/0145149 A1 * | 6/2011 | Valdes | ................. | G06Q 20/102 705/44 |
| 2011/0178912 A1 * | 7/2011 | Parsons | .................. | G06Q 40/00 705/35 |
| 2011/0213731 A1 * | 9/2011 | Cho | ........................ | G06Q 50/16 705/36 R |
| 2011/0264581 A1 * | 10/2011 | Clyne | .................... | G06Q 20/10 705/39 |
| 2012/0029956 A1 * | 2/2012 | Ghosh | .................. | G06Q 10/063 705/7.11 |
| 2012/0030154 A1 * | 2/2012 | Nicholson | ............... | G01S 7/003 703/2 |
| 2012/0278254 A1 * | 11/2012 | Rosenthal | ............. | G06Q 40/06 705/36 R |
| 2012/0323764 A1 * | 12/2012 | Boberski | ................ | G06Q 40/04 705/39 |
| 2013/0024395 A1 * | 1/2013 | Clark | ..................... | G06Q 40/06 705/36 R |
| 2013/0226764 A1 * | 8/2013 | Battyani | ................ | G06Q 40/04 705/37 |
| 2014/0156491 A1 * | 6/2014 | Koh | ........................ | G06Q 40/04 705/37 |
| 2014/0229353 A1 * | 8/2014 | Lutnick | ................ | G06Q 40/04 705/37 |
| 2015/0154284 A1 * | 6/2015 | Pfeifer | ................ | G06F 16/3344 707/723 |
| 2016/0314425 A1 * | 10/2016 | Cunningham | ... | G06Q 10/06398 |
| 2016/0371779 A1 * | 12/2016 | Stearns | .................. | G06Q 40/06 |
| 2018/0047071 A1 * | 2/2018 | Hsu | .................... | G06Q 30/0282 |
| 2019/0370716 A1 * | 12/2019 | Kavumpurath | ..... | G06F 16/2458 |
| 2021/0264520 A1 * | 8/2021 | Cummings | ............ | G06Q 40/12 |
| 2022/0058735 A1 * | 2/2022 | Chuzhoy | ................ | G06Q 40/04 |
| 2022/0309475 A1 * | 9/2022 | Kurniawan | ........... | G06F 16/248 |
| 2023/0116345 A1 * | 4/2023 | Chirochangu | ..... | G06Q 10/0635 705/7.28 |

\* cited by examiner

Simulation Results

| | Excess Return | Tracking Error | I.R. | Turnover (Select by Cap) | Turnover (Select by RAFI) |
|---|---|---|---|---|---|
| RACWI US Large | 0.27% | 1.04% | 0.26 | 5.6% | 4.7% |
| RACWI Developed | 0.40% | 0.90% | 0.44 | 6.2% | 5.1% |
| RACWI Emerging Markets | 0.63% | 1.19% | 0.53 | 11.9% | 10.1% |
| RACWI Global Markets | 0.34% | 0.99% | 0.34 | 6.3% | 5.1% |

- Selecting by RAFI and weighting by Cap consistently outperforms
- Minimal tracking error
- Slight reduction in turnover The data published herein is simulated. Please see disclosures for important information regarding simulated data. Simulation selects the top 86% by Market Capitalization or RAFI Fundamentals then weights by Market Capitalization. US history begins on 4/30/1962–6/30/2021. Developed History begins on 4/30/1984–6/30/2021. Emerging Markets History begins on 4/30/1995–6/30/2021. Global History begins on 4/30/1995–5/30/2021.
Source: RAFI Indices, LLC, based on data from Worldscope and Datastream.

FIG. 9

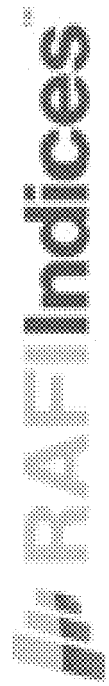

Regression Results By Region

12/31/1996 - 5/31/2021

| Strategy | Alpha (Annual) | Beta (Mkt-Rf) | Size (SMB) | Value (HML) | Momentum (WML) |
|---|---|---|---|---|---|
| RACW Global Index | -0.02% | 0.99 | -0.15 | 0.04 | -0.01 |
| MSCI ACWI | -0.47% | 1.00 | -0.14 | -0.04 | -0.01 |
| RACW US | 0.43% | 0.97 | -0.14 | 0.03 | 0.00 |
| S&P 500 | -0.20% | 0.99 | -0.12 | -0.01 | -0.01 |
| RACW Developed | -0.02% | 0.99 | -0.15 | 0.03 | 0.00 |
| MSCI World | -0.45% | 1.00 | -0.14 | -0.03 | 0.00 |
| RACW Emerging Markets | 0.23% | 1.01 | -0.08 | 0.03 | -0.01 |
| MSCI Emerging Markets | -0.13% | 0.97 | -0.11 | -0.04 | 0.02 |

For illustrative purposes only.
The data published herein are simulated. Please see important information at the end of this presentation regarding simulated data.
Source: Research Affiliates, LLC, based on data from WorldScope and Datastream.

FIG. 11

Important Information

1200a

By accepting this document, you agree to keep its contents confidential. You also agree not to disclose the contents of this document to third parties without the prior written permission of Research Affiliates, LLC ("RA"), RAFI Indices, LLC ("RAFI"), or their affiliated entities.

The material contained in this document is for informational purposes only. This material is not intended as an offer or solicitation for the purchase or sale of any security or financial instrument, nor is it advice or a recommendation to enter into any transaction. The information contained herein may be opinions, which are subject to change, at any time, and should not be construed as financial or investment advice on any subject matter.

Past performance is not indicative of future results. Performance of a product may change significantly over time and yield materially different results in the future. Certain performance information presented represents simulated performance or performance based on combined simulated index data (pre-index launch) and live index data (post-index launch). Hypothetical investor accounts depicted are not representative of actual client accounts. Indexes are unmanaged and cannot be invested in directly. Past simulated performance is no guarantee of future performance and does not represent actual performance of an investment product based on an index. No allowance has been made for trading costs, management fees, or other costs associated with asset management, as the information provided relates only to the index itself. Actual investment results will differ. As such, the simulated data may have under-or over-compensated for the impact, if any, of certain market factors. Simulated returns may not reflect the impact that material economic and market factors might have had on the advisor's decision making if the advisor were actually managing clients' money. Simulated data is subject to the fact that it is designed with the benefit of hindsight. Simulated returns carry the risk that actual performance is not as depicted due to inaccurate predictive modeling. Simulated returns cannot predict how an investment strategy will perform in the future. Simulated returns should not be considered indicative of the skill of the advisor. Investors may experience loss of all or some of their investment. With the exception of the data on Research Affiliates Fundamental Index, all other information and data are generally based on information and data from third party sources.

RA, RAFI, their affiliates, agents, and each of their respective officers, directors, employees, agents, representatives and licensors (collectively "Research Affiliates") do not make any warranties, express or implied, to anyone regarding the information provided herein, including, without limitation, any warranties with respect to the timeliness, sequence, accuracy, completeness, currentness, merchantability, quality or fitness for a particular purpose or any warranties as to the results to be obtained by any third-party in connection with the use of the information. Nothing contained in this material is intended to constitute legal, tax, securities or investment advice, nor an opinion regarding the appropriateness of any investment, nor a solicitation of any type. The general information contained in this material should not be acted upon without obtaining specific legal, tax and investment advice from a licensed professional. Investors should be aware of the risks associated with data sources and quantitative processes used to create the content contained herein or the investment management process. Errors may exist in data acquired from third party vendors, the construction or coding of indices or model portfolios, and the construction of the spreadsheets, results or information provided. Research Affiliates takes reasonable steps to eliminate or mitigate errors, and to identify data and process errors so as to minimize the potential impact of such errors; however, Research Affiliates cannot guarantee that such errors will not occur.

Use of this material is conditioned upon, and evidence of, the user's full release of Research Affiliates from any liability or responsibility to any third party for any loss or damage, direct, indirect or consequential, arising from or related to (i) any inaccuracy or incompleteness in, errors or omissions in the provided information or (ii) any decision made or action taken by any third party in reliance upon this information. Research Affiliates shall not be liable to anyone for loss of business revenues, lost profits or any indirect, consequential, special or similar damages whatsoever, whether in contract, tort or otherwise, even if advised of the possibility of such damages.

The trademarks Fundamental Index™, RAFI™, Research Affiliates Equity™, RAE™, and the Research Affiliates™ trademark and corporate name and all related logos are the exclusive intellectual property of RA and, in some cases, are registered trademarks in the U.S. and other countries.

Research Affiliates, LLC

Frank Russell Company is the source and owner of the Russell index data contained or reflected in this material and copyrights related thereto. Frank Russell Company and RA have entered into a strategic alliance with respect to the Russell RAFI Indexes. The Russell RAFI Indexes are calculated by Russell in conjunction with RA. All intellectual property rights in the Russell RAFI Indexes (the "Index") vest in Russell and RA. Neither Russell nor RA nor their licensors accept any liability for any errors or omissions in the Index and/or Index ratings or underlying data. No further distribution of Russell Data is permitted without Russell's express written consent. Russell® is a trademark of Frank Russell Company. RA is the owner of the trademarks, service marks, patents and copyrights related to the Fundamental Index and the Fundamental Index methodology. The presentation may contain confidential information and unauthorized use, disclosure, copying, dissemination, or redistribution is strictly prohibited. Frank Russell Company is not responsible for the formatting or configuration of this material or for any inaccuracy in Research Affiliates' presentation thereof.

The FTSE Research Affiliates Fundamental Indexes are calculated by FTSE International Limited ("FTSE") in conjunction with RA. All rights and interests in the FTSE Research Affiliates Fundamental Indexes vest in FTSE. All rights in and to the RA fundamental weighting methodology used in the calculation of the FTSE Research Affiliates Fundamental Indexes vest in RA. All rights in the FTSE indices and/or FTSE ratings (together the "FTSE Data") vest in FTSE and/or its licensors. Except to the extent disallowed by applicable law, neither FTSE nor RA nor their licensors shall be liable (including in negligence) for any loss arising out of use of the FTSE Research Affiliates Fundamental Indexes, the FTSE Data or underlying data by any person. "FTSE™" is a trademark of the London Stock Exchange Plc and is used by FTSE under license. FTSE is not an investment adviser and makes no representation regarding the advisability of investing in any security. Inclusion of a security in an index is not a recommendation to buy, sell or hold such security. No further distribution of FTSE Data is permitted without FTSE's express written consent.

Copyright MSCI. All Rights Reserved. Without prior written permission of MSCI, this information and any other MSCI intellectual property may only be used for your internal use, may not be reproduced or redisseminated in any form and may not be used to create any financial instruments or products or any indices. This information is provided on an "as is" basis, and the user of this information assumes the entire risk of any use made of this information. Neither MSCI nor any third party involved in or related to the computing or compiling of the data makes any express or implied warranties, representations or guarantees concerning the MSCI index-related data, and in no event will MSCI or any third party have any liability for any direct, indirect, special, punitive, consequential or any other damages (including lost profits) relating to any use of this information. All MSCI returns information provided under license through MSCI. Any expected returns forecasted herein may be calculated by RA using data provided by MSCI Inc. No funds or securities relating to those expected returns forecasted herein are sponsored, endorsed or promoted by MSCI Inc., and MSCI bears no liability with respect to any such funds or securities.

RA is an investment adviser registered under the Investment Advisers Act of 1940 with the U.S. Securities and Exchange Commission (SEC). Our registration as an investment adviser does not imply a certain level of skill or training. RA does not provide investment advice outside of Australia, the United States, Canada and Ireland. RA does not offer or sell any securities, commodities or derivative instruments or products. Any such business may only be conducted through registered or licensed entities and individuals permitted to do so within the respective jurisdiction and only in

FIG. 12B

1200c conjunction with legally required disclosure documents and subject to all legally required regulatory filings. RA is not a broker-dealer and does not effect transactions in securities.

Notice to wholesale clients in Australia:

RA is exempt from the requirement to hold an Australian financial services license by operation of ASIC Class Order 03/1100: US SEC regulated financial service providers.

RAFI Indices, LLC

Any applicable financial instruments referenced herein are not sponsored, promoted, sold or supported in any other manner by RAFI or Solactive AG ("Solactive"). With respect to any RAFI index referenced herein (the "Index"), neither RAFI nor Solactive offer any express or implicit guarantee or assurance either with regard to the results of using the Index and/or Index trademark referenced herein, or the Index price at any time or in any other respect. The Index is calculated and published by RAFI and Solactive, which use their best efforts to ensure that the Index is calculated correctly. Irrespective of their obligations toward any licensee, neither RAFI nor Solactive has any obligation to point out errors in the Index to third parties, including but not limited to licensees, investors and/or financial intermediaries of the financial instrument. Neither publication of the Index nor the licensing of the Index or Index trademark for the purpose of use in connection with the financial instrument constitutes a recommendation by RAFI or Solactive to invest capital in said financial instrument nor does it in any way represent an assurance or opinion of RAFI or Solactive with regard to any investment in the financial instrument.

RAFI is a wholly owned subsidiary of Research Affiliates Global Holdings, LLC and does not offer or provide investment advice or offer or sell any securities, commodities or derivative instruments or products. Any such business may only be conducted through registered or licensed entities and individuals permitted to do so within the respective jurisdiction and only in conjunction with legally required disclosure documents and subject to all legally required regulatory filings.
The RAFI trademark is used under license by RAFI. The RAFI Indices, LLC corporate name and all related logos are the exclusive intellectual property of RAFI.

Various features of the Fundamental Index™ methodology, including an accounting data-based non-capitalization data processing system and method for creating and weighting an index of securities, are protected by various patents, and patent-pending intellectual property of RA. (See all applicable US Patents, Patent Publications, Patent Pending intellectual property and protected trademarks located at https://www.researchaffiliates.com/en_us/about-us/legal.html, which are fully incorporated herein.) Any use of these trademarks, logos, patented or patent pending methodologies without the prior written permission of RA is expressly prohibited. RA reserves the right to take any and all necessary action to preserve all of its rights, title, and interest in and to these marks, patents or pending patents.

It is not RAFI's intent to provide investment advice and accordingly, we will not receive any fees or other compensation directly from you for the provision of investment advice (as opposed to other services) in connection with any transaction, unless contracted for or permissioned to do so. Without an express written objection from you, we will deem that these acknowledgments and representations apply.

© 2021 Research Affiliates, LLC and RAFI Indices, LLC. All rights reserved. Duplication or dissemination prohibited without prior written permission.

FIG. 12C

SYSTEM, METHOD AND COMPUTER PROGRAM PRODUCT FOR CONSTRUCTING A CAPITALIZATION-WEIGHTED GLOBAL INDEX PORTFOLIO

BACKGROUND OF THE DISCLOSURE

Field of the Disclosure

The application relates generally to portfolio construction techniques and more particularly to financial object index and index portfolio construction techniques.

Related Art

Various computer-implemented financial object portfolio construction systems and methods are known including conventional market capitalization weighted indexes like the VANGUARD S&P 500 funds, and various non-market capitalization-based index construction and portfolio construction and management systems and methods known as the RESEARCH AFFILIATES FUNDAMENTAL INDEX® as described in U.S. Pat. Nos. 8,005,740, 7,747,502, 7,620,577, and 7,792,719, having a common inventor to the present disclosure, the contents of all of which are incorporated herein by reference in their entirety. Various example methods of constructing indices and portfolios based on those indices, are set forth in the noted patents, which relate to various example electronic methods of computationally constructing indices and portfolios of financial objects based on those non-market capitalization metrics selected metrics and weighting methodologies, and electronic index calculation computation and electronic portfolio management and electronic trading systems. A financial object, according to one exemplary embodiment, may include, e.g., but not limited to: at least one unit of interest in at least one of: an asset; a liability; a tracking portfolio; a resampled portfolio, a financial instrument and/or security, equity, stock, share, etc., where the financial instrument and/or the security denotes a debt, an equity interest, and/or a hybrid; a financial position, a currency position, a trust, a real estate investment trust (REIT), a portfolio of trusts and/or REITS, a security instrument, an equitizing instrument, a commodity, an exchange traded note, a derivatives contract, including at least one of: a future, a forward, a put, a call, an option, a swap, and/or any other transaction relating to a fluctuation of an underlying asset, notwithstanding the prevailing value of the contract, and notwithstanding whether such contract, for purposes of accounting, is considered an asset or liability; a fund; and/or an investment entity or account of any kind, including an interest in, or rights relating to: a hedge fund, an exchange traded fund (ETF), a fund of funds, a mutual fund, a closed end fund, an investment vehicle, and/or any other pooled and/or separately managed investments. In an exemplary embodiment, the financial object may include a debt instrument, including, according to one exemplary embodiment, any one or more of a bond, a debenture, a subordinated debenture, a mortgage bond, a collateral trust bond, a convertible bond, an income bond, a guaranteed bond, a serial bond, a deep discount bond, a zero coupon bond, a variable rate bond, a deferred interest bond, a commercial paper, a government security, a certificate of deposit, a Eurobond, a corporate bond, a government bond, a municipal bond, a treasury-bill, a treasury bond, a foreign bond, an emerging market bond, a developed market bond, a high yield bond, a junk bond, a collateralized instrument, an exchange traded note (ETN), and/or other agreements between a borrower and a lender, etc.

Genesis of Indexation

The first index fund strategies appeared in 1972 and 1973, Launched by Batterymarch, American National Bank, Wells Fargo, and Vanguard.

An index fund (also index tracker) is a mutual fund or exchange-traded fund (ETF) designed to follow certain preset rules so that the fund can track a specified basket of underlying investments. While index providers often emphasize that they are for-profit organizations, index providers have been said to have somewhat of an ability to act as "reluctant regulators" when determining which companies may be suitable for an index. Those rules may include tracking prominent indexes like the S&P 500 or the Dow Jones Industrial Average or implementation rules, such as tax-management, tracking error minimization, large block trading or patient/flexible trading strategies that allow for greater tracking error but lower market impact costs. Index funds may also have rules that screen for social and sustainable criteria, etc.

An index fund's rules of construction clearly identify the type of companies suitable for the fund. The most commonly known index fund in the United States, the S&P 500 Index Fund, is based on the rules established by S&P Dow Jones Indices for their S&P 500 Index. Equity index funds would include groups of stocks with similar characteristics such as the size, value, profitability and/or geographic location of the companies. A group of stocks may include companies from the United States, Non-US Developed, emerging markets or Frontier Market countries. Additional index funds within these geographic markets may include indexes of companies that include rules based on company characteristics or factors, such as companies that are small, mid-sized, large, small value, large value, small growth, large growth, the level of gross profitability or investment capital, real estate, or indexes based on commodities and fixed-income. Companies are purchased and held within the index fund when they meet the specific index rules or parameters and are sold when they move outside of those rules or parameters. Think of an index fund as an investment utilizing rules-based investing. Some index providers announce changes of the companies in their index before the change date whilst other index providers do not make such announcements.

The main advantage of index funds for investors is they don't require much time to manage as the investors don't have to spend time analyzing various stocks or stock portfolios. Many investors also find it difficult to beat the performance of the S&P 500 Index. Some legal scholars have previously suggested a value maximization and agency-costs theory for understanding index funds stewardship.

One index provider, Dow Jones Indexes, has 130,000 indices. Dow Jones Indexes says that all its products are maintained according to clear, unbiased, and systematic methodologies that are fully integrated within index families.

As of 2014, index funds made up 20.2% of equity mutual fund assets in the US. Index domestic equity mutual funds and index-based exchange-traded funds (ETFs), have benefited from a trend towards more index-oriented investment products. From 2007 through 2014, index domestic equity mutual funds and ETFs received $1 trillion in new net cash, including reinvested dividends. Index-based domestic equity ETFs have grown particularly quickly, attracting almost twice the flows of index domestic equity mutual funds since 2007. In contrast, actively managed domestic equity mutual funds experienced a net outflow of $659 billion, including reinvested dividends, from 2007 to 2014.

The Efficient Market Hypothesis and CAPM support indexing, as does Bill Sharpe's "Arithmetic of Active Management." Investors cannot collectively beat the market. For one strategy to win, another must lose.

As indexing gained assets, performance that differed from the benchmark has been taken as evidence of sloppy implementation. "Buy High, Sell Low With Index Funds" shows that, in fact, matching the index is sloppy. But, any indexer that deliberately seeks to add value now loses business.

What is needed is an improved computer-implemented financial object portfolio construction system and method that overcomes shortcomings of conventional index based construction and electronic portfolio construction computer-based solutions.

SUMMARY OF THE INVENTION

According to an exemplary embodiment of the invention, a system, method and/or computer program product may be provided setting forth various exemplary features.

According to one exemplary embodiment, a system, method or computer program product for electronically constructing data indicative of an index and data indicative of a portfolio of financial objects based on the index may include a method of constructing data indicative of an investible risk factor portfolio of financial objects, which may include: electronically constructing, by at least one electronic computer processor, data indicative of an index, which may include: electronically receiving, by the at least one electronic computer processor, a plurality of accounting-based data about a plurality of companies in a starting universe; electronically determining, by the at least one electronic computer processor, a relative non-market capitalization metric-based size of each of the plurality of the companies in the starting universe using a plurality of non-market capitalization-based metrics of the plurality of the accounting-based data about the plurality of the companies in the starting universe; electronically creating, by the at least one electronic computer processor, a plurality of geographic market regions; electronically selecting, by the at least one electronic computer processor, a first threshold top percentage based on a cumulative non-capitalization metric-based weight of the relative non-market capitalization metric-based size of each of the plurality of the companies, the cumulative non-market capitalization metric-based weight computed based upon a weighted average of the plurality of non-market capitalization-based metrics of the plurality of the accounting-based data about the plurality of the plurality of companies in the starting universe, to obtain an electronic list indicative of electronic index constituents of the plurality of geographic market regions; electronically weighting, by the at least one electronic computer processor, the electronic list indicative of the electronic index constituents by: electronically combining, by the at least one electronic computer processor, for the plurality of geographic market regions, the electronic list indicative of the electronic index constituents obtained by the selecting of the first threshold top percentage based on the cumulative non-capitalization metric-based weight of the accounting-based non-market capitalization-based data about the plurality of the companies in the starting universe; and electronically weighting, by the at least one electronic computer processor, within each of the plurality of geographic market regions, financial objects of the electronic list indicative of the electronic index constituents, by a float-adjusted market capitalization weight to obtain electronic data indicative of an index of the financial objects may include the electronic list indicative of the electronic index constituents and the float-adjusted market capitalization weights; electronically constructing, by the at least one electronic computer processor, electronic data indicative of at least one investible portfolio based on the electronic data indicative of the index of the financial objects; and electronically providing the electronic data indicative of the index of the financial objects, and the electronic data indicative of the at least one investible portfolio based on the index of the financial objects.

According to one example embodiment, the system, method or computer program product may include where the weighted average of the plurality of non-market capitalization-based metrics may include: electronically weighting, by the at least one electronic computer processor, a weighted average of: electronic data indicative of adjusted sales; electronic data indicative of adjusted cash flow; electronic data indicative of dividends and buybacks; and electronic data indicative of book value and intangibles.

According to one example embodiment, the system, method or computer program product may include where the weighted average may include: equally weighting, by the at least one electronic computer processor, each of the electronic data indicative of adjusted sales; the electronic data indicative of adjusted cash flow; the electronic data indicative of dividends and buybacks; and the electronic data indicative of book value and intangibles.

According to one example embodiment, the system, method or computer program product may further include: constructing, by the at least one computer, an investible capitalization-weighted global index portfolio based on the electronic data indicative of said index of said financial objects and said electronic data indicative of said at least one investible portfolio based on said index of said financial objects.

According to one example embodiment, the system, method or computer program product may include where the top threshold percentage may include a top 86% by the cumulative non-capitalization metric-based weight.

According to one example embodiment, the system, method or computer program product may include where the top threshold percentage may include the top 86% by the cumulative non-capitalization metric-based weight may include a large company portfolio, and a small company portfolio.

According to one example embodiment, the system, method or computer program product may include where the plurality of geographic regions may include: a US geographic region; a Japan geographic region; a UK geographic region; a Europe except UK geographic region; an Other Developed geographic region; and an emerging markets geographic region.

According to one example embodiment, the system, method or computer program product may include where the electronically weighting and the electronically combining may include at least one or more of: electronically computing an average; electronically computing a weighted average; electronically computing a mean; or electronically calculating a median.

According to one example embodiment, the system, method or computer program product may further include rebalancing or reconstituting the at least one investible portfolio.

According to one example embodiment, the system, method or computer program product may include where the rebalancing or the reconstituting may include rebalancing or reconstituting on a periodic basis.

According to one example embodiment, the system, method or computer program product may include where the rebalancing periodically, or the reconstituting periodically may include at least one or more of: rebalancing or reconstituting annually; rebalancing or reconstituting by accounting period; rebalancing or reconstituting monthly; rebalancing or reconstituting quarterly; or rebalancing or reconstituting biannually.

According to one example embodiment, the system, method or computer program product may include where the rebalancing or the reconstituting, may include at least one more one of: rebalancing or reconstituting upon reaching a threshold; rebalancing or reconstituting the at least one investible portfolio as at least one investible portfolio changes over time; or rebalancing or reconstituting the at least one investible portfolio to match the index as it changes over time.

According to one example embodiment, the system, method or computer program product may include where the weighting may include: equally weighting across the plurality of non-market capitalization metrics.

According to one example embodiment, the system, method or computer program product may include where the rebalancing or the reconstituting may include rebalancing or reconstituting annually on a third Friday of March.

According to one example embodiment, the system, method or computer program product may include at least one or more of the following: wherein the electronic data indicative of adjusted sales may include a mathematical multiplicative product of electronic data indicative of company sales, multiplied by electronic data indicative of company equity to assets ratio, and averaged over a past five (5) years period; wherein the electronic data indicative of adjusted cash flow may include a mathematical sum of an average of five (5) years of electronic data indicative of company operating cash flow, added to company research and development (R&D) expenses averaged over a past five (5) years period by electronic data indicative of company equity to assets ratio, and averaged over a past five (5) years period; wherein the electronic data indicative of dividends and buybacks may include a mathematical average of electronic data indicative of dividends paid and electronic data indicative of share buybacks over the past five (5) years period; or wherein the electronic data indicative of book value and intangibles may include a mathematical sum of electronic data indicative of most recent company book value, added to electronic data indicative of research capital, wherein the electronic data indicative of research capital may include accumulation of depreciated research and development (R&D) expenses over a past six (6) years period.

According to one example embodiment, a system, method or computer program product may include a computer program product embodied on at least one computer accessible storage medium, may include a plurality of instructions, which when executed by at least one electronic computer processor performs a method of constructing data indicative of an investible risk factor portfolio of financial objects, the method may include: electronically constructing, by at least one electronic computer processor, data indicative of an index may include: electronically receiving, by the at least one electronic computer processor, a plurality of accounting-based data about a plurality of companies in a starting universe; electronically determining, by the at least one electronic computer processor, a relative non-market capitalization metric-based size of each of the plurality of the companies in the starting universe using a plurality of non-market capitalization-based metrics of the plurality of the accounting-based data about the plurality of the companies in the starting universe; electronically creating, by the at least one electronic computer processor, a plurality of geographic market regions; electronically selecting, by the at least one electronic computer processor, a first threshold top percentage based on a cumulative non-capitalization metric-based weight of the relative non-market capitalization metric-based size of each of the plurality of the companies, the cumulative non-capitalization metric-based weight computed based upon a weighted average of the plurality of non-market capitalization-based metrics of the plurality of the accounting-based data about the plurality of the plurality of companies in the starting universe, to obtain an electronic list indicative of electronic index constituents of the plurality of geographic market regions; electronically weighting, by the at least one electronic computer processor, the electronic list indicative of the electronic index constituents by: electronically combining, by the at least one electronic computer processor, for the plurality of geographic market regions, the electronic list indicative of the electronic index constituents obtained by the selecting of the first threshold top percentage based on the cumulative non-capitalization metric-based weight of the accounting-based non-market capitalization-based data about the plurality of the companies in the starting universe; and electronically weighting, by the at least one electronic computer processor, within each of the plurality of geographic market regions, financial objects of the electronic list indicative of the electronic index constituents, by a float-adjusted market capitalization weight to obtain electronic data indicative of an index of the financial objects may include the electronic list indicative of the electronic index constituents and the float-adjusted market capitalization weights; electronically constructing, by the at least one processor, electronic data indicative of at least one investible portfolio based on the electronic data indicative of the index of the financial objects; and electronically providing the electronic data indicative of the index of the financial objects, and the electronic data indicative of the at least one investible portfolio based on the index of the financial objects.

According to yet another example embodiment, a system, method or computer program product may include where the system of constructing data indicative of an investible risk factor portfolio of financial objects may include: at least one network subsystem; a selection filter electronic subsystem coupled to at least one universe company accounting data database, at least one equally weighted non-market capitalization metric weighted relative size database, and at least one constituents database, which may include: at least one electronic computer processor; at least one electronic storage device; and at least one electronic communications interface coupled to the at least one network subsystem; a weighting filter electronic subsystem coupled to the at least one universe company accounting data database, the at least one equally weighted non-market capitalization metric weighted relative size database, the at least one constituents database, and at least one weightings database, which may include: at least one electronic computer processor; at least one electronic storage device; and at least one electronic communications interface coupled to the at least one network subsystem; an index management and portfolio rebalancing electronic subsystem coupled to the selection filter electronic subsystem, and the weighting filter electronic subsystem, which may include: at least one electronic computer processor; at least one electronic storage device; and at least one electronic communications interface coupled to the at least one network subsystem; wherein the system is configured to electronically construct by one of the at least one electronic computer processors, data indicative of an index may include wherein the system is configured to: electronically receive by one of the at least one electronic computer processors, a plurality of accounting-based data about a plurality of companies in a starting universe; electronically determine by one of the at least one electronic computer processors, a relative non-market capitalization metric-based size of each of the plurality of the companies in the starting universe using a plurality of non-market capitalization-based metrics of the plurality of the accounting-based data about the plurality of the companies in the starting universe; electronically create, by one of the at least one electronic computer processors, a plurality of geographic market regions; electronically select, by one of the at least one electronic computer processors, a first threshold top percentage based on a cumulative non-capitalization metric-based weight of the relative non-market capitalization metric-based size of each of the plurality of the companies, the cumulative non-capitalization metric-based weight computed based upon a weighted average of the plurality of non-market capitalization-based metrics of the plurality of the accounting-based data about the plurality of the plurality of companies in the starting universe, to obtain an electronic list indicative of electronic index constituents of the plurality of geographic market regions; electronically weight, by one of the at least one electronic computer processors, the electronic list indicative of the electronic index constituents by wherein the system is configured to: electronically combine, by one of the at least one electronic computer processors, for the plurality of geographic market regions, the electronic list indicative of the electronic index constituents obtained by the select of the first threshold top percentage based on the cumulative non-capitalization metric-based weight of the accounting-based non-market capitalization-based data about the plurality of the companies in the starting universe; and electronically weight, by one of the at least one electronic computer processor, within each of the plurality of geographic market regions, financial objects of the electronic list indicative of the electronic index constituents, by a float-adjusted market capitalization weight to obtain electronic data indicative of an index of the financial objects may include the electronic list indicative of the electronic index constituents and the float-adjusted market capitalization weights; electronically construct, by one of the at least one electronic computer processors, electronic data indicative of at least one investible portfolio based on the electronic data indicative of the index of the financial objects; and electronically provide the electronic data indicative of the index of the financial objects, and the electronic data indicative of the at least one investible portfolio based on the index of the financial objects.

BRIEF DESCRIPTION OF THE DRAWINGS

The foregoing and other features and advantages of the invention will be apparent from the following, more particular description of exemplary embodiments of the invention, as illustrated in the accompanying drawings. In the drawings, like reference numbers generally indicate identical, functionally similar, and/or structurally similar elements. The drawing in which an element first appears is indicated by the leftmost digits in the corresponding reference number. A preferred exemplary embodiment is discussed below in the detailed description of the following drawings:

The FIG. 1 illustrates an example buy-high/sell-low pattern observed of the S&P 500 over the period October 1989-June 2021, according to an example embodiment;

FIG. 9 depicts another example illustration of an example embodiment of actual simulation results depicting example excess return observed, example tracking error, example turnover by selection by Capitalization, and example turnover by selection by RAFI, illustrating evidence of consistent outperformance, minimal tracking error, and a slight reduction in turnover, according to an example embodiment;

FIG. 11 depicts another example illustration of an example embodiment of regression results by region, according to an example embodiment; and FIGS. 12A, 12B, and 12C (collectively FIG. 12) together depict important disclosure language with respect to simulation data, according to an example embodiment.

DETAILED DESCRIPTION OF VARIOUS EXEMPLARY EMBODIMENTS OF THE INVENTION

Introduction to Indexing

Figure 1:
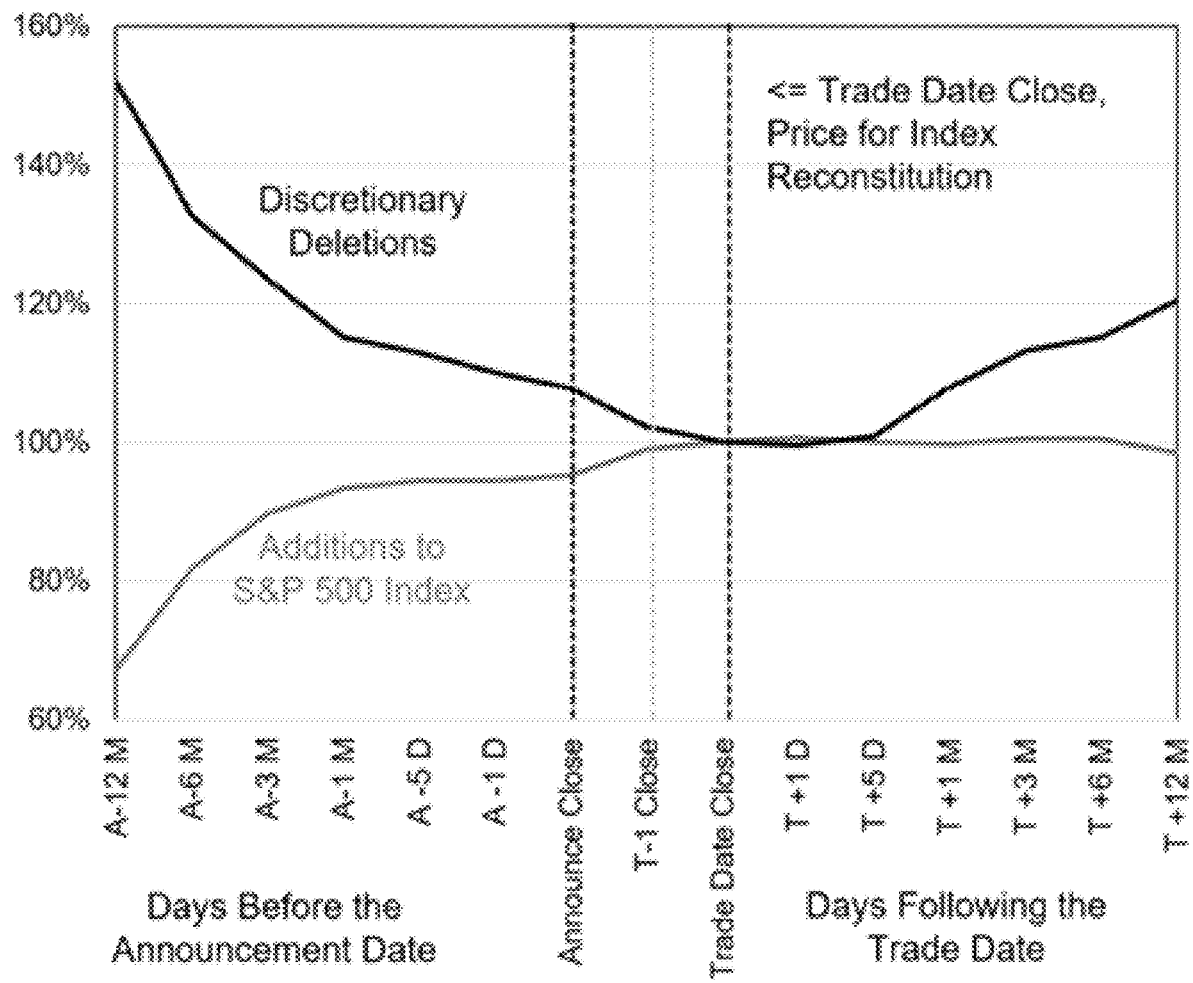

As indexers crowd trading into an "effective date" for any index change, they move share prices . . . a lot, from the increased volume associated with that trading, according to an example embodiment. Additions beat deletions by over 8% between announcement and effective date. Then, over the subsequent year, discretionary deletions beat additions by over 20%.

Any indexer who wants to beat the market, and hence their peers, can do so with some surprisingly simple expedients, but with some challenges, according to an example embodiment. To win, one must accept modest tracking error, hence periods of modest underperformance, according to an example embodiment. Any indexer who pursues these expedients needs patience from time to time, as will the indexer's clients, according to an example embodiment.

How Index Funds Buy High and Sell Low (not Good!)

Classifying Index Additions and Deletions

Using data from Siblis Research, a sample of S&P 500 historical component changes was constructed and analyzed, according to an example embodiment.

Additions and deletions were classified, according to an example embodiment, in two ways, see Table A-1 below:

1) Non-discretionary: change due to merger, spin-off, or acquisition, and

2) Discretionary: change chosen by the committee.

It was found that 94% of additions and 38% of deletions were discretionary.

TABLE A-1

| Date Range | Discretionary Additions | Non-Discretionary Additions | Total Additions | Discretionary Deletions | Non-Discretionary Deletions | Total Deletions |
|---|---|---|---|---|---|---|
| 1970-October 1989 | 417 | 26 | 443 | 165 | 278 | 443 |
| October 1989-2017 March | 590 | 73 | 663 | 256 | 410 | 666 |
| October 1989-2003 December | 306 | 33 | 339 | 133 | 213 | 346 |
| 2004 January-2017 March | 284 | 40 | 324 | 123 | 197 | 320 |
| 2010 January-2017 March | 130 | 25 | 155 | 66 | 84 | 150 |
| 1970-2017 March | 1007 | 99 | 1106 | 421 | 688 | 1109 |

Source: Research Affiliates, LLC, using Siblis Research and CRSP. Used with permission.

Cap-Weighting Causes Valuation Headwinds

See Table A-2 below, where one sees that in the year prior to a constituent change, additions outperform discretionary deletions by nearly 65%!

TABLE A-2

| Days Before Announcement | Additions | Discretionary Deletions | Non-Discretionary Deletions | Additions minus Discretionary Deletions |
|---|---|---|---|---|
| 252 (1 year) | 36.17% | −28.48% | 22.69% | 64.65% |
| 63 (1 Quarter) | 4.72% | −13.19% | 1.54% | 17.91% |
| 21 (1 Month) | 1.96% | −7.29% | 1.63% | 9.25% |
| 5 (1 Week) | 0.92% | −5.04% | −1.08% | 5.96% |
| 1 Day | 0.18% | −1.24% | −0.56% | 1.42% |

As illustrated in Table A-3 below, one may see that additions also trade at two to four times the valuations of deletions, where example ratios are analyzed, price to book (P/B), Price to Earnings (P/E), Price to Cash Flow (P/CF), Price to Sales (P/S), and Price to Dividends (P/D), as well as averages of the ratios.

TABLE A-3

| Type | Count | P/B | P/E | P/CF | P/S | P/D | Average |
|---|---|---|---|---|---|---|---|
| Additions | 1106 | 2.02 | 2.25 | 2.70 | 2.94 | 3.34 | 2.71 |
| Deletions | 1109 | 0.94 | 1.33 | 1.09 | 0.97 | 1.37 | 1.12 |
| Discretionary | 449 | 0.68 | 1.11 | 0.86 | 0.65 | 1.05 | 0.84 |
| Non-Discretionary | 660 | 1.38 | 1.71 | 1.50 | 1.49 | 1.81 | 1.61 |
| Additions Relative to Discretionary Deletions | | 2.99 | 2.04 | 3.15 | 4.53 | 3.17 | 3.22 |

Buying high and selling low, indeed! So, are they worth the premium?

Additions Outperform after the Announcement of an Index Change but Quickly Fall Behind Deletions As illustrated in Table A-4 below, it may be seen that during "grace period," additions beat discretionary deletions by 8.7%, according to an example embodiment.

Relative Performance, October 1989-December 2017

TABLE A-4

| Cumulative from Announcement to Rebalancing Date | Additions | Discretionary Deletions | Non-Discretionary Deletions | Additions minus Discretionary Deletions |
|---|---|---|---|---|
| Exclusive of rebalancing date | 4.34% | −1.34% | 3.03% | 5.68% |
| Inclusive of rebalancing date | 5.13% | −3.60% | 1.96% | 8.73% |

TABLE A-5

| Days after Rebalancing | Additions | Discretionary Deletions | Non-Discretionary Deletions | Additions minus Discretionary Deletions |
|---|---|---|---|---|
| 1 Day | 0.71% | −0.73% | — | 1.45% |
| 5 (1 week) | 0.05% | 0.42% | — | −0.37% |
| 21 (1 month) | −1.13% | 5.79% | — | −6.93% |
| 63 (1 quarter) | −1.37% | 11.75% | — | −13.12% |
| 252 (1 year) | −1.29% | 21.19% | — | −22.48% |

However, as shown in Table A-5, within a week, the average discretionary deletion is outpacing the average addition, according to an example embodiment.

We can Quantify the Cost of Buy-High, Sell-Low

Additions outperform the market and discretionary deletions lag the market between announcement date and effective date and for one additional day (final catch-up trading?), according to an example embodiment.

This performance reverses about a week after the effective date, according to an example embodiment.

The FIG. 1 illustrates an example diagram 100, depicting an example buy-high/sell-low pattern observed of the S&P 500 over the period October 1989-June 2021, according to an example embodiment.

Figure 2:
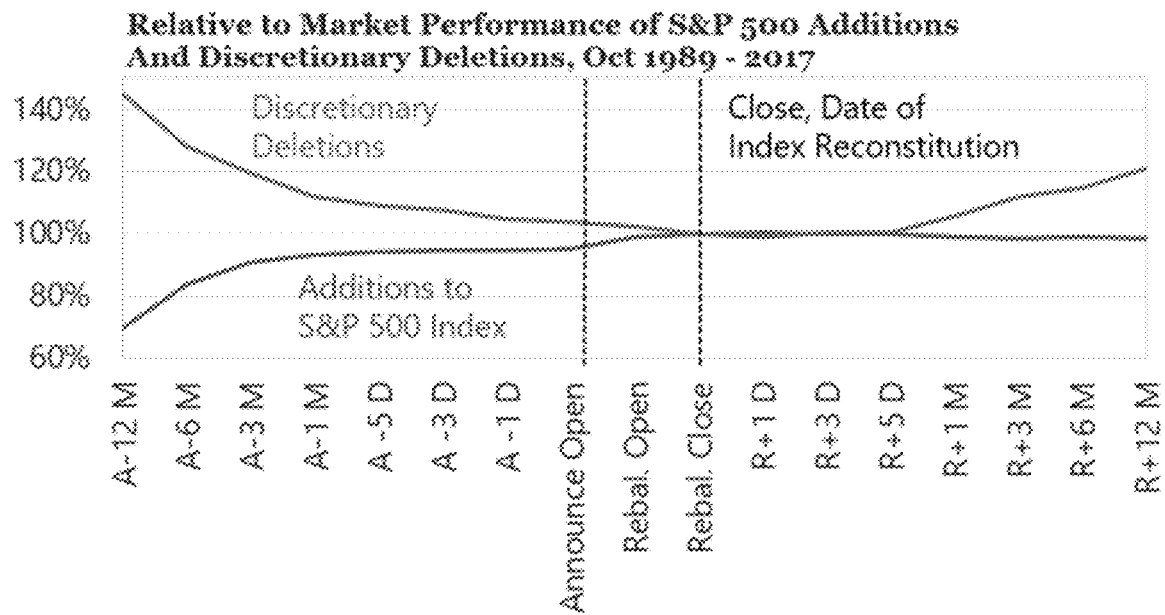
FIG. 2 depicts an exemplary flow diagram illustrating an exemplary embodiment of an exemplary hardware system and executing an exemplary database system and methodology according to an embodiment of the present invention.

FIG. 2 depicts an exemplary flow diagram 200 illustrating an exemplary embodiment of an exemplary hardware system and executing an exemplary database system and methodology according to an embodiment of the present invention.

See FIG. 2 depicting Relative to Market Performance of S&P 500 Additions and Discretionary Deletions, October 1989-2017.

Deletions beat additions by over 20% in the year after an index change.

Figure 3:
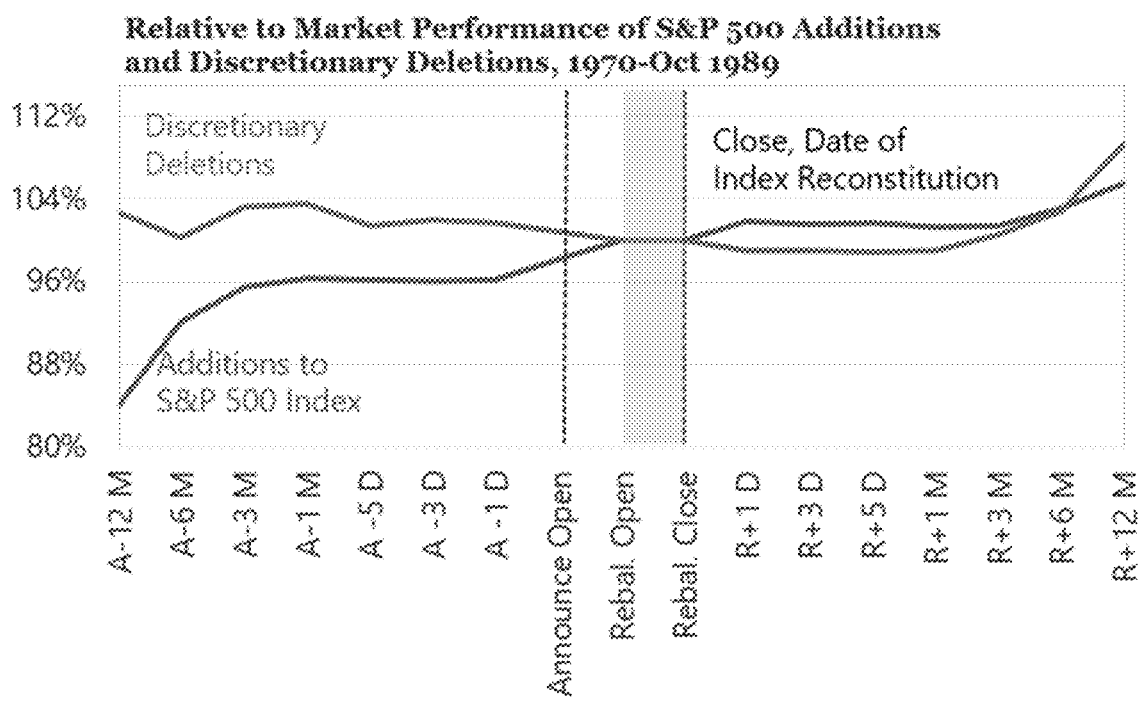
FIG. 3 depicts another exemplary flow diagram illustrating an exemplary embodiment of an exemplary hardware system and network coupling various exemplary subsystems and illustrating an exemplary database system and methodology according to an embodiment of the present invention.

FIG. 3 depicts another exemplary flow diagram 300 illustrating an exemplary embodiment of an exemplary hardware system and network coupling various exemplary subsystems and illustrating an exemplary database system and methodology according to an embodiment of the present invention.

See FIG. 3 depicting Relative to Market Performance of S&P 500 Additions and Discretionary Deletions, 1970-October 1989.

This Pattern Was Much Weaker Before 1989!

Note the very different scale of FIG. 3 compared to FIG. 2. The moves are far smaller than after 1989.

Perhaps before 1989 there was less pressure from index fund managers and customers to include glamour stocks, and the index was created to minimize buy-high, sell-low impacts.

Addressing Indexing's Buy-High, Sell-Low Travails

Figure 4A:
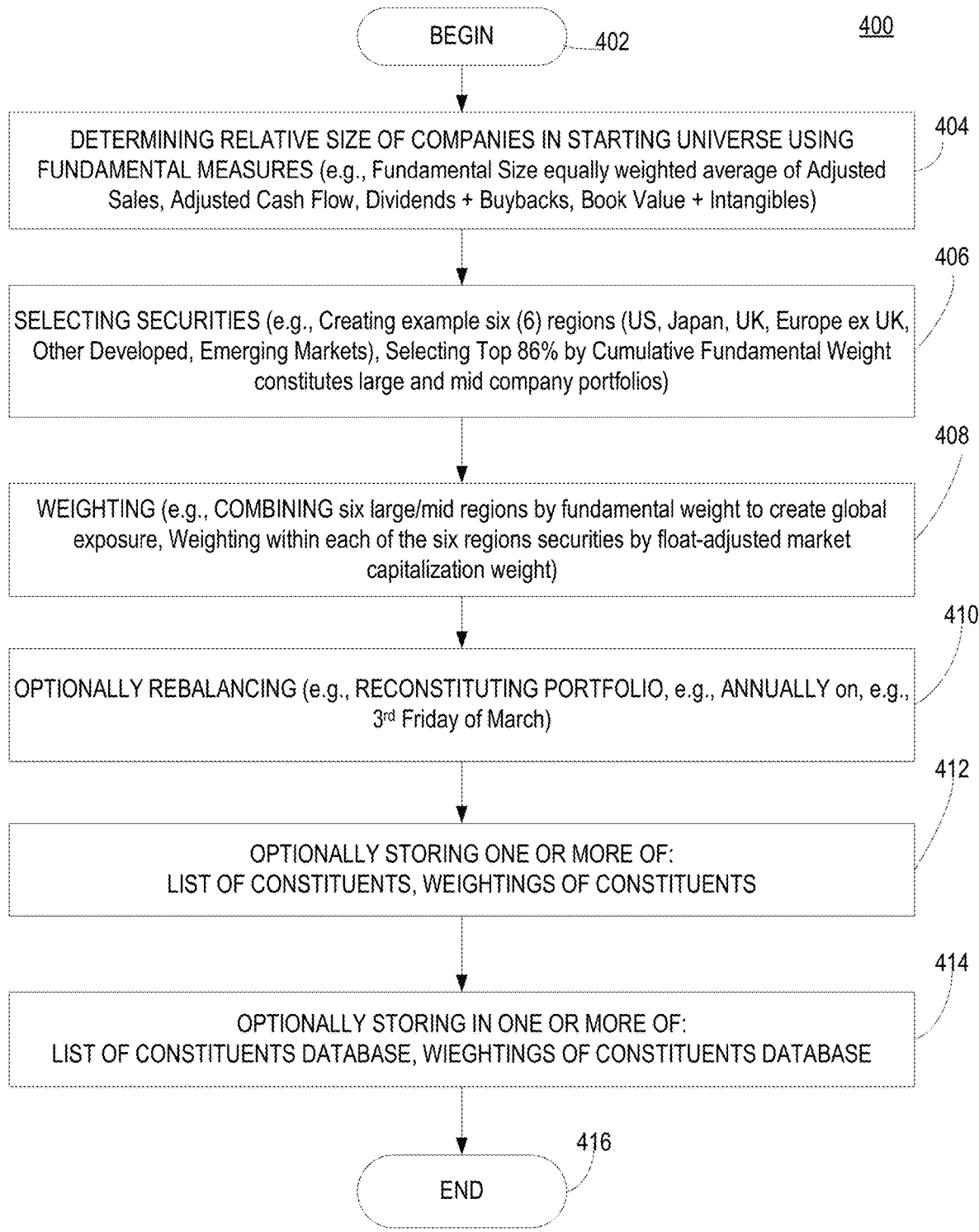
FIG. 4A depicts an illustration of an example embodiment of an example flow diagram for an example RACWI methodology electronic process for creating example electronic data indicative of an example RACWI index and portfolio, according to an example embodiment.

FIG. 4A depicts an illustration of an example embodiment of an example flow diagram 400 for an example RACWI methodology electronic process for creating example electronic data indicative of an example RACWI index and portfolio, according to an example embodiment.

Figure 4B:
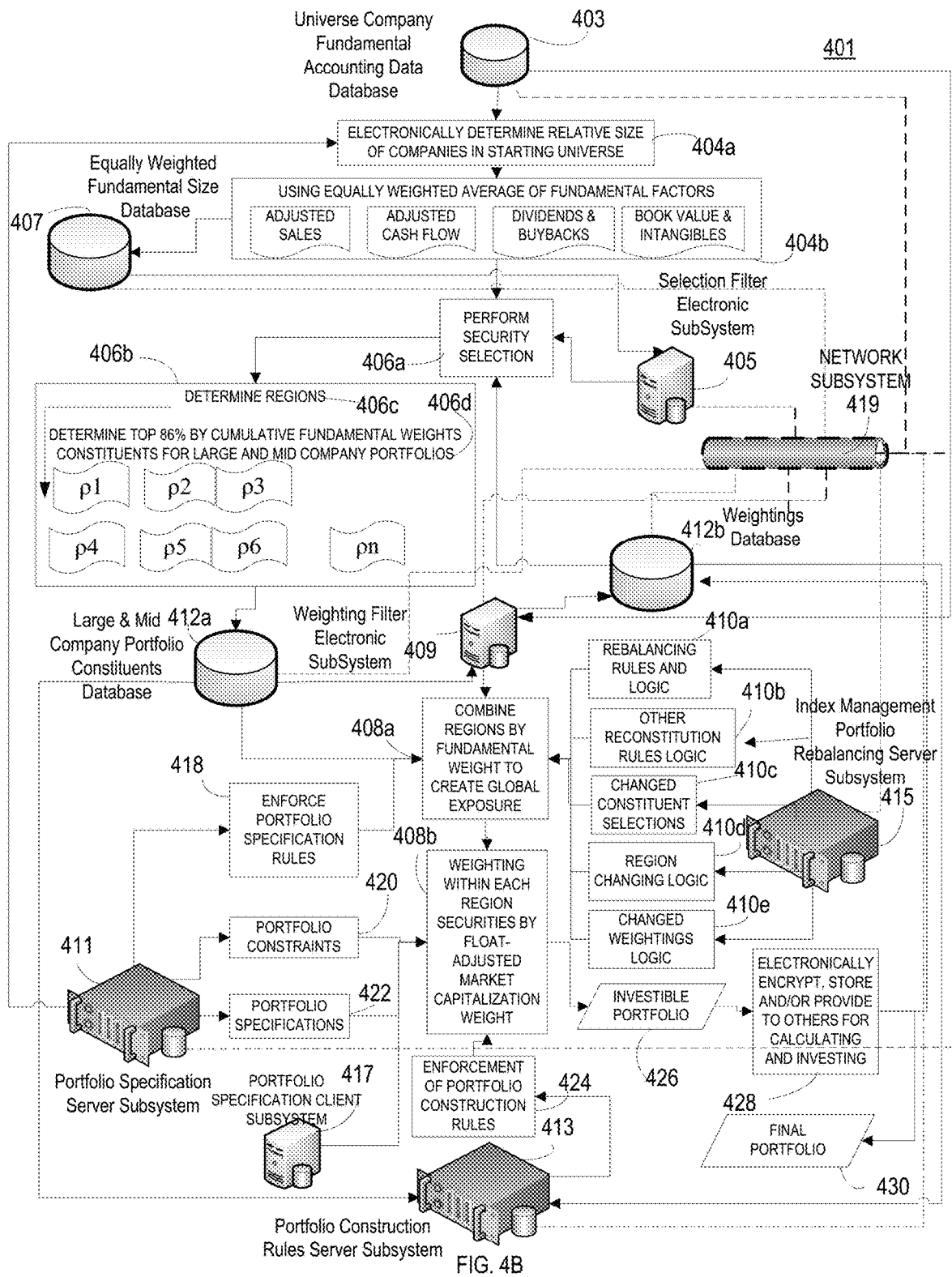
FIG. 4B depicts an example electronic index portfolio specification, construction, and management system, according to an example embodiment.

FIG. 4B depicts an example diagram 401 illustrating an example electronic index portfolio specification, construction, and management system, according to an example embodiment.

Figure 4C:
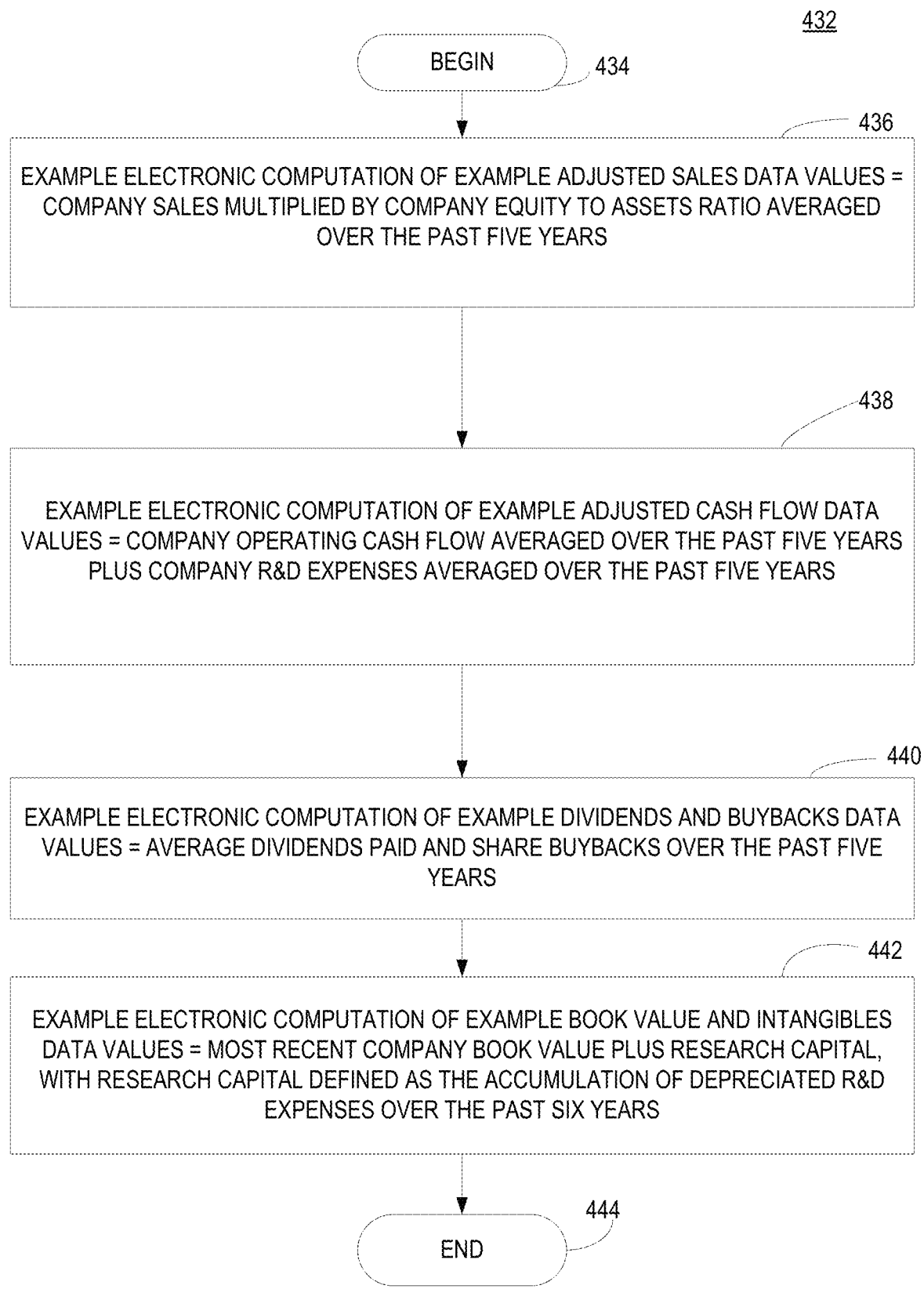
FIG. 4C depicts an illustration of an example embodiment of an example flow diagram for an example electronic computation of example electronically calculated adjusted sales, adjusted cash flow, average dividends and buybacks, and book value and intangibles values, according to an example embodiment.

FIG. 4C depicts an illustration of an example embodiment of an example flow diagram 432 for an example electronic computation of example electronically calculated adjusted sales 436, adjusted cash flow 438, average dividends and buybacks 440, and book value and intangibles values 442, according to an example embodiment.

Figure 4D:
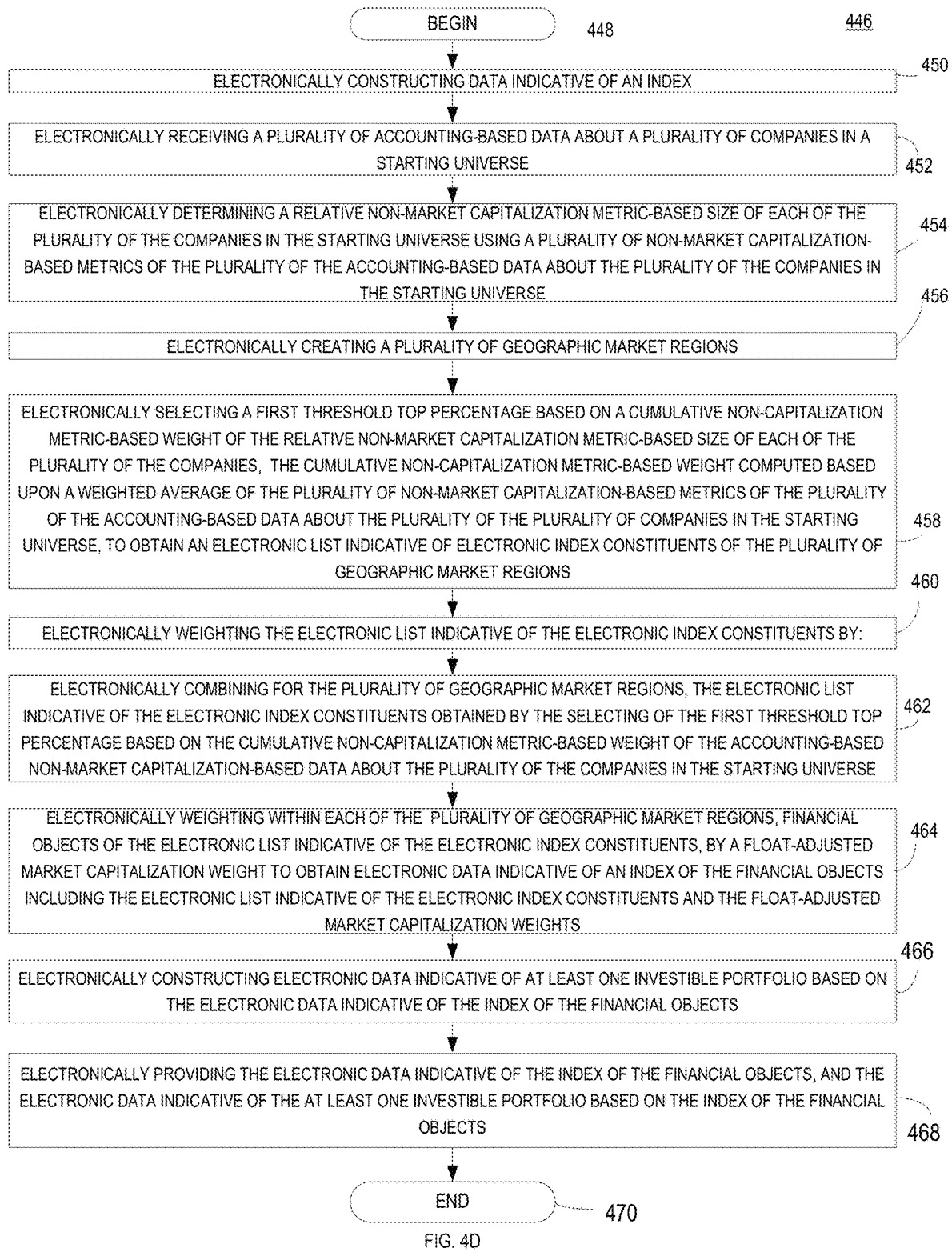
FIG. 4D depicts an illustration of an example embodiment of an example flow diagram for an example index construction methodology, according to an example embodiment.

FIG. 4D depicts an illustration of an example embodiment of an example flow diagram 446 for an example index construction methodology, according to an example embodiment. Flow diagram 446 begins with 448 and may continue immediately with 450.

In 450, flow diagram 446 may include electronically constructing data indicative of an index. From 450, flow diagram 446 may continue with 452.

In 452, flow diagram 446 may include electronically receiving a plurality of accounting-based data about a plurality of companies in a starting universe. From 452, flow diagram 446 may continue with 454.

In 454, flow diagram 446 may include electronically determining a relative non-market capitalization metric-based size of each of the plurality of the companies in the starting universe using a plurality of non-market capitalization-based metrics of the plurality of the accounting-based data about the plurality of the companies in the starting universe. From 454, flow diagram 446 may continue with 456.

In 456, flow diagram 446 may include electronically creating a plurality of geographic market regions. From 456, flow diagram 446 may continue with 458.

In 458, flow diagram 446 may include electronically selecting a first threshold top percentage based on a cumulative non-capitalization metric-based weight of the relative non-market capitalization metric-based size of each of the plurality of the companies, the cumulative non-capitalization metric-based weight computed based upon a weighted average of the plurality of non-market capitalization-based metrics of the plurality of the accounting-based data about the plurality of the plurality of companies in the starting universe, to obtain an electronic list indicative of electronic index constituents of the plurality of geographic market regions. From 458, flow diagram 446 may continue with 460.

In 460, flow diagram 446 may include electronically weighting the electronic list indicative of the electronic index constituents by: the following steps. From 460, flow diagram 446 may continue with 462.

In 462, flow diagram 446 may include electronically combining for the plurality of geographic market regions, the electronic list indicative of the electronic index constituents obtained by the selecting of the first threshold top percentage based on the cumulative non-capitalization metric-based weight of the accounting-based non-market capitalization-based data about the plurality of the companies in the starting universe. From 462, flow diagram 446 may continue with 464.

In 464, flow diagram 446 may include electronically weighting within each of the plurality of geographic market regions, financial objects of the electronic list indicative of the electronic index constituents, by a float-adjusted market capitalization weight to obtain electronic data indicative of an index of the financial objects including the electronic list indicative of the electronic index constituents and the float-adjusted market capitalization weights. From 464, flow diagram 446 may continue with 466.

In 466, flow diagram 446 may include electronically constructing electronic data indicative of at least one investible portfolio based on the electronic data indicative of the index of the financial objects. From 466, flow diagram 446 may continue with 468.

In 468, flow diagram 446 may include electronically providing the electronic data indicative of the index of the financial objects, and the electronic data indicative of the at least one investible portfolio based on the index of the financial objects. From 468, flow diagram 446 may continue with 470, and may immediately end.

Figure 5:
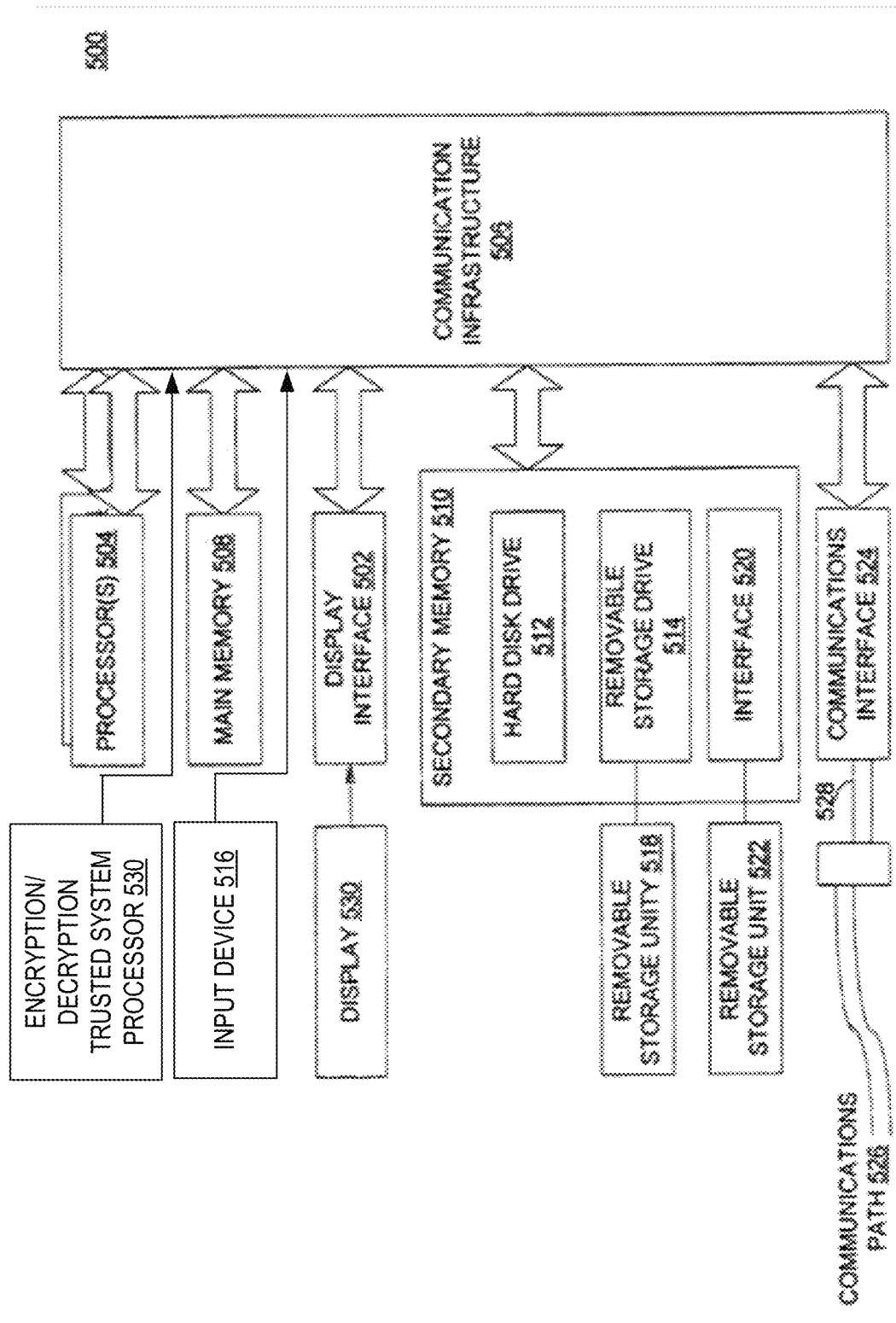
FIG. 5 depicts an exemplary computer system that may be used in implementing various example components of example hardware architecture of FIG. 4B, according to an example embodiment of the present invention.

FIG. 5 depicts an exemplary computer system that may be used in implementing various example components of example hardware architecture of FIG. 4B, according to an example embodiment of the present invention, discussed in greater detail below.

Figure 6:
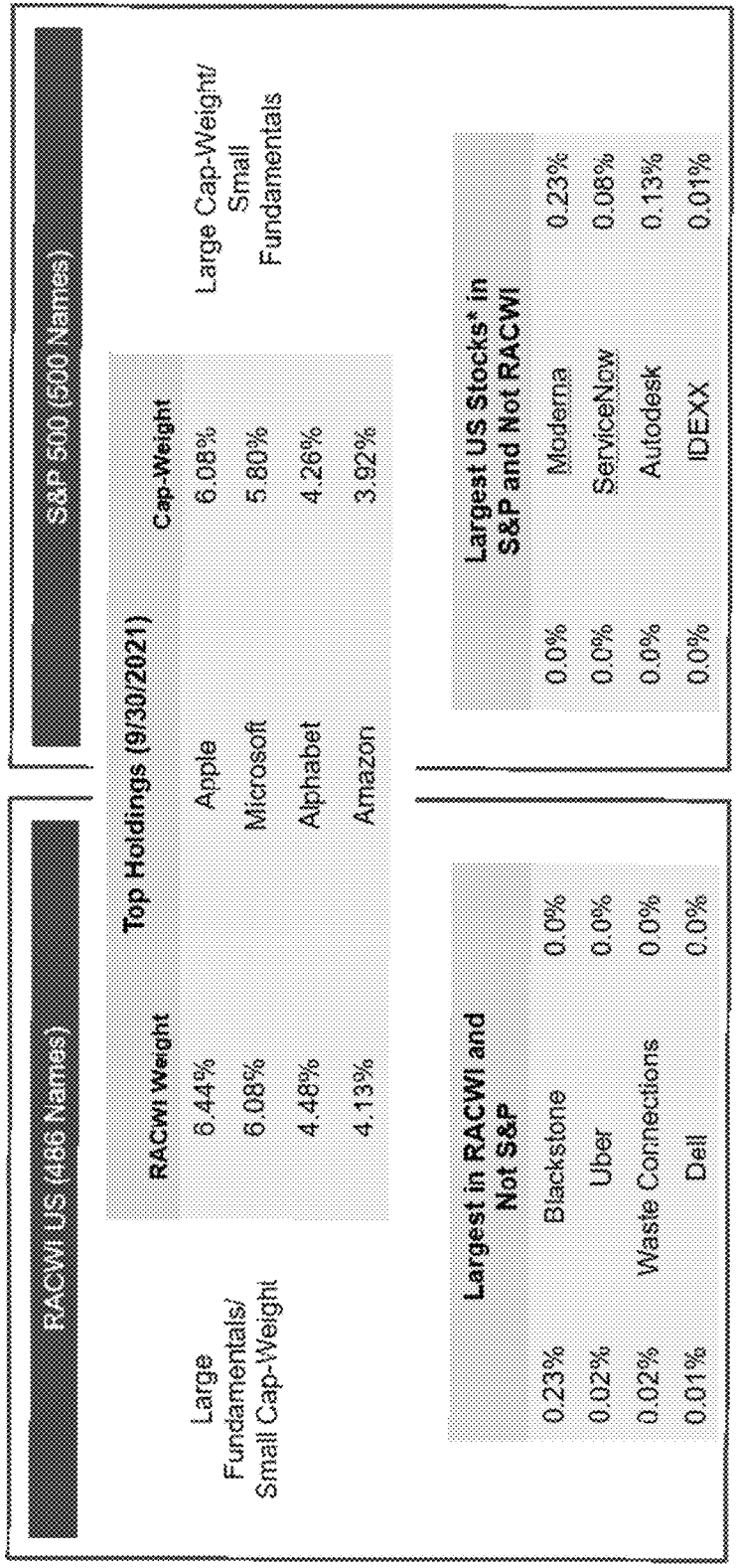
FIG. 6 depicts an illustration of an example chart showing a comparison between traditional capitalization-weight benchmarks which buy high and selling low, as compared to disclosed example embodiment of improved RACWI index, and relative differences between the disclosed example RACWI index methodology and conventional S&P 500 Capitalization weighted index, and demonstrating example differences in example constituents and example weights, according to an example embodiment.

FIG. 6 depicts an illustration of an example chart showing a comparison between traditional capitalization-weight benchmarks which buy high and selling low, as compared to disclosed example embodiment of improved RACWI index, and relative differences between the disclosed example RACWI index methodology and conventional S&P 500 Capitalization weighted index, and demonstrating example differences in example constituents and example weights, according to an example embodiment.

Figure 7:
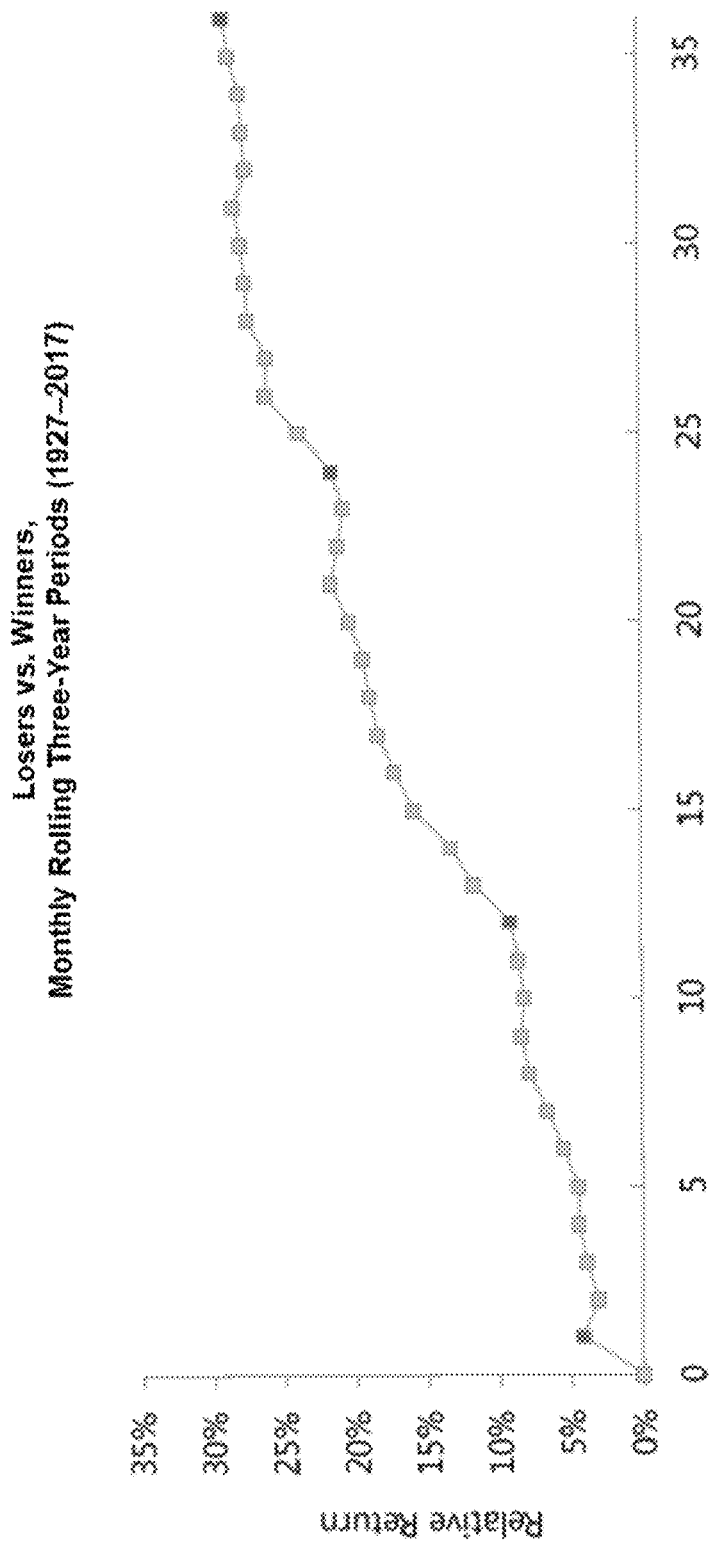
FIG. 7 depicts an illustration of an example embodiment of an example chart of example recent losers consistently outperforming recent winners, graphing losers vs. winners in an example monthly rolling three-year periods from 1927 through 2017, charting on the x-axis months after portfolio formation in 5 months increments from 0 to 35 months after portfolio formation, and and the y-axis, Relative return graphed in 5% increments from 0% to 35% for an example index construction methodology, according to an example embodiment.

FIG. 7 depicts an illustration of an example embodiment of an example chart of example recent losers consistently outperforming recent winners, graphing losers vs. winners in an example monthly rolling three-year periods from 1927 through 2017, charting on the x-axis months after portfolio formation in 5 months increments from 0 to 35 months after portfolio formation, and and the y-axis, Relative return graphed in 5% increments from 0% to 35% for an example index construction methodology, according to an example embodiment.

Figure 8:
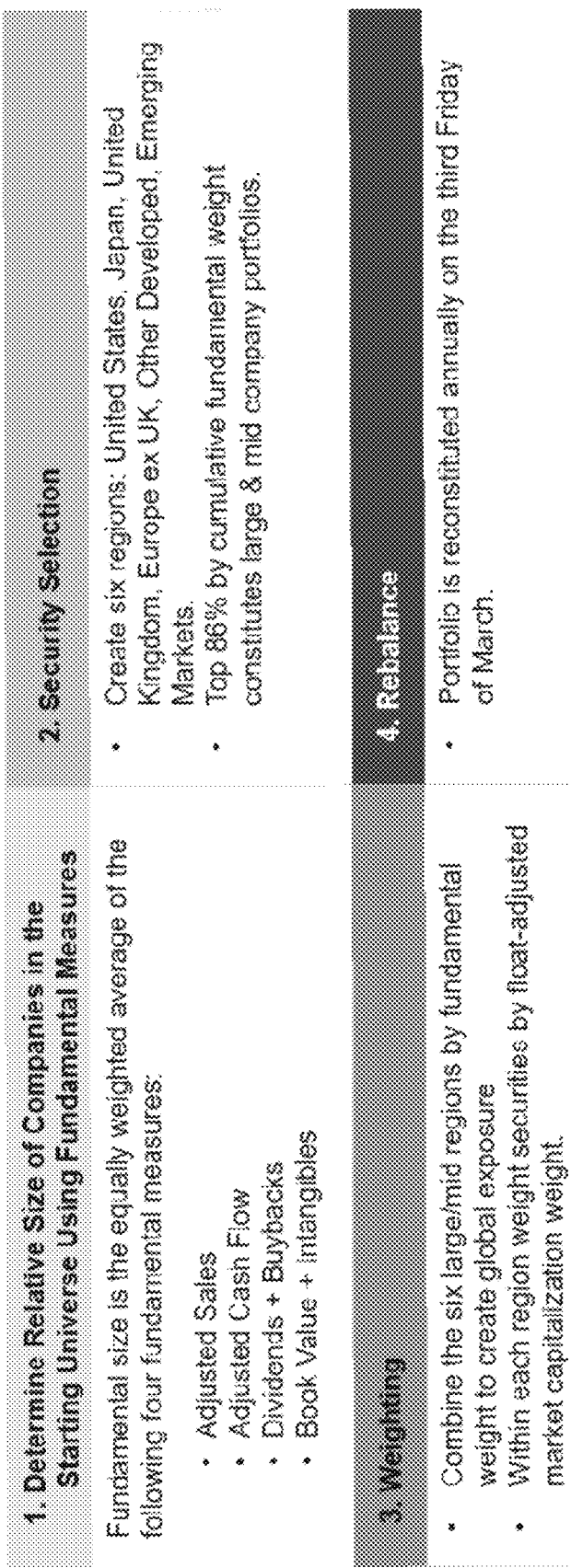
FIG. 8 depicts another example illustration of an example embodiment of an an example RACWI methodology electronic process for creating example electronic data indicative of an example RACWI index and portfolio by initially determining a relative size of companies in starting universe using example fundamental measures, selecting securities using an example selection criterion using an example plurality of regions, weighting constituents by example combining of regions by example fundamental weight to create global exposure, within each example region weighting securities by float-adjusted market capitalization weight; and optionally example rebalancing of portfolio by example reconstitution rules, according to an example embodiment.

FIG. 8 depicts another example illustration of an example embodiment of an an example RACWI methodology electronic process for creating example electronic data indicative of an example RACWI index and portfolio by initially determining a relative size of companies in starting universe using example fundamental measures, selecting securities using an example selection criterion using an example plurality of regions, weighting constituents by example combining of regions by example fundamental weight to create global exposure, within each example region weighting securities by float-adjusted market capitalization weight; and optionally example rebalancing of portfolio by example reconstitution rules, according to an example embodiment.

FIG. 9 depicts another example illustration of an example embodiment of actual simulation results depicting example excess return observed, example tracking error, example turnover by selection by Capitalization, and example turnover by selection by RAFI, illustrating evidence of consistent outperformance, minimal tracking error, and a slight reduction in turnover, according to an example embodiment.

Figure 10:
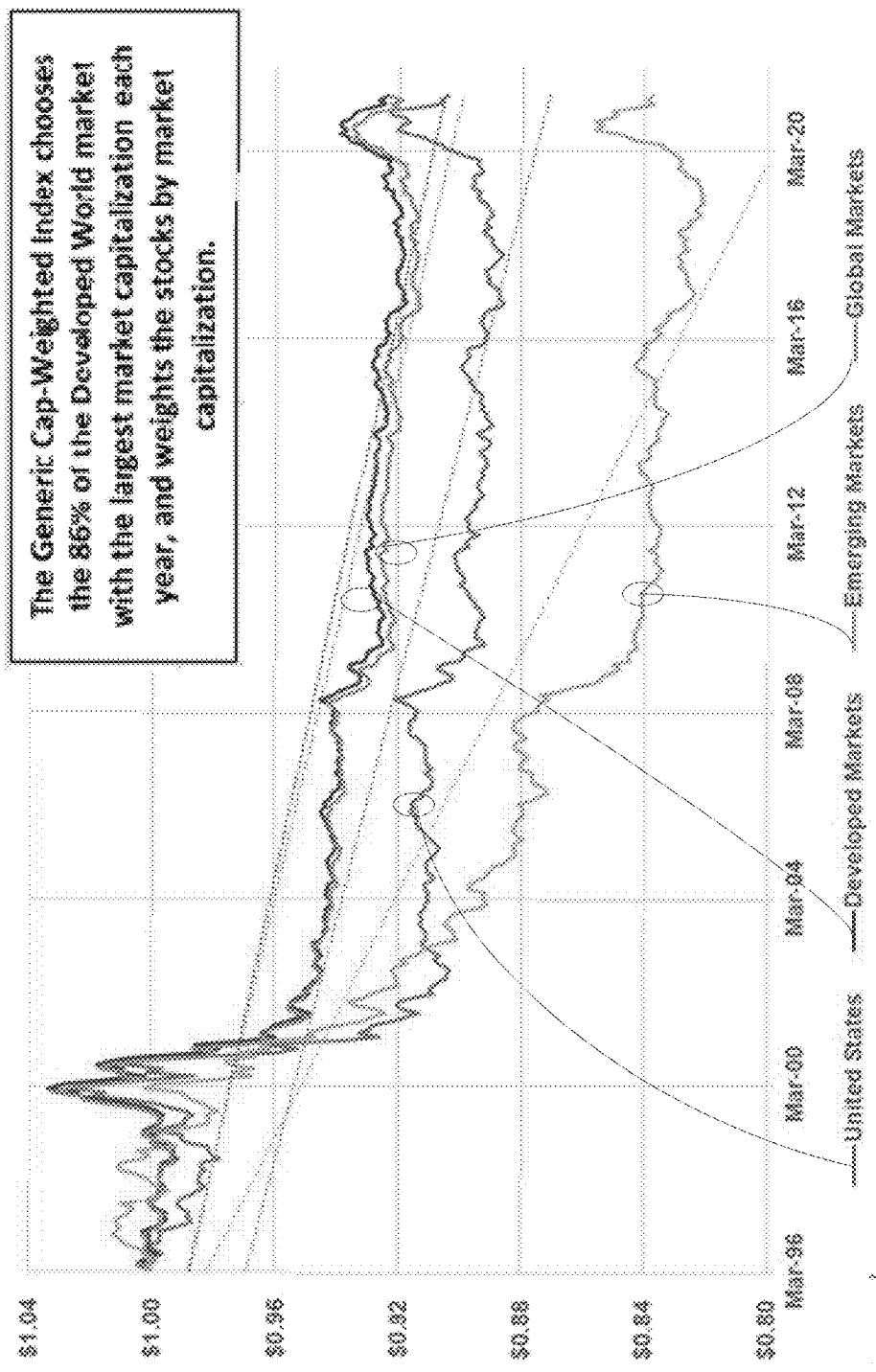
FIG. 10 depicts another example illustration of an example embodiment of how much Capitalization-weighted indices forfeit relative to an example disclosed RACWI methodology, according to an example embodiment.

FIG. 10 depicts another example illustration of an example embodiment of how much Capitalization-weighted indices forfeit relative to an example disclosed RACWI methodology, according to an example embodiment.

FIG. 11 depicts another example illustration of an example embodiment of regression results by region, according to an example embodiment.

FIGS. 12A, 12B, and 12C (collectively FIG. 12) together depict important disclosure language with respect to simulation data, according to an example embodiment.

An Example Improved Capitalization-Weighted Index, which May Include Increased Global Influence in Certain Example Embodiments Our research uncovers the hidden costs associated with a buy-high, sell-low dynamic in traditional index implementation, according to an example embodiment. Acknowledging the limitations of mean reversion, turnover, and selection bias, we seek ways for investors to recapture the avoidable performance slippage in the indexing process, according to an example embodiment. We show how cap-weighted index providers can construct better-performing indices that are less prone to chasing recent performance and that have lower turnover, according to an example embodiment. Until index providers adopt such a construction approach, our research suggests several expedients to help investors and index fund managers earn modest above-market returns, according to an example embodiment.

Achilles' Heel of Index Funds

The momentum-chasing selection bias of cap-weighted index funds (buying expensive, popular stocks and selling cheap, out-of-favor stocks) causes investors to lose, on average, tens of basis points (bps) annually in performance, according to an example embodiment. This may seem modest, but is quite vast in the real world of index fund investing, according to an example embodiment. With annual index-fund turnover averaging about 4.4%, smarter trading can add 12-46 bps a year in performance for index fund managers, according to an example embodiment.

The FIG. 1 illustrates the buy-high/sell-low pattern of the S&P 500 over the period October 1989-June 2021, according to an example embodiment. The stock additions outperform the market, on average, by 46.5% in the 12-month period before the announcement until the stocks are actually added to the index, whereas the discretionary deletions lag the market by 36.3% over the same period, according to an example embodiment. In the year after the trade date, the situation reverses and the deletions outperform the additions by over 22%, with the lion's share of the difference coming from the deletions, according to an example embodiment.

Varying Days for Index Reconstitution

To assess the value forfeited by a conventional S&P Index-fund investor, we compare a replicated S&P 500 Index with three alternative strategies that make the same trades as the S&P 500 but at different trading dates, according to an example embodiment. These include a replicated trade-on-announcement S&P 500 (effectively, a clairvoyant trading strategy), a replicated trade-day-after-announcement S&P 500, and a replicated S&P 500 with delayed rebalancing, according to an example embodiment. We call this last trading strategy a "lazy" replication and show results for index rebalancing trades both 3 and 12 months after the actual S&P 500 trades occur, according to an example embodiment. The replicated S&P 500 loses 12-23 bps a year relative to all of the simulated strategies, according to an example embodiment. Note the table below numbered as Table 4.

TABLE 4

Performance of Various Replicated S&P 500 Capitalization-Weighted Indices, October 1989-June 2021
Panel A. Risk and Return Characteristics

| Index | Return | Volatility | Sharpe Ratio | Excess Return vs. Replicated S&P 500 | Tracking Error vs. Replicated S&P 500 | Information Ratio vs. Replicated S&P 500 | t-statistic on Excess Return |
|---|---|---|---|---|---|---|---|
| Replicated S&P | 10.48% | 14.42% | 0.54 | 0.00% | 0.00% | 0.00 | — |
| Trade-on-Announcement S&P | 10.68% | 14.36% | 0.56 | 0.20% | 0.31% | 0.64 | 3.63** |
| Trade-on-Announcement S&P t + 1 | 10.61% | 14.37% | 0.55 | 0.12% | 0.29% | 0.42 | 2.37* |
| Lazy S&P, Trades Delayed by 3 Month | 10.61% | 14.34% | 0.56 | 0.13% | 0.33% | 0.39 | 2.17* |
| Lazy S&P, Trades Delayed by 12 Months | 10.71 | 14.29% | 0.56 | 0.23% | 0.51% | 0.46 | 2.57* |

The lazy replication strategy, according to an example embodiment, is actually good for index fund management! Whereas the clairvoyant, or trade-on-announcement, replication outperforms the replicated S&P 500 by 20 bps a year, the 12-month delayed trading strategy outperforms the replicated W&P 500 by 23 bps a year—and each reduces volatility by a small but statistically significant margin, according to an example embodiment.

Which 500 Stocks to Cap-Weight?

Beyond the lazy trading approach is an even more effective way to alleviate the return drag of traditional index fund managers, according to an example embodiment. To demonstrate how simple index construction techniques can reduce the negative consequences associated with the buy-high/sell-low dynamic and the turnover costs of cap-weighted indices, we simulated six index strategies and compared them to the S&P 500, according to an example embodiment. The top 500 stocks are selected as actual market-cap (although the aim is to hold the true top 500 stocks by market capitalization, the S&P Index Committee does not rigidly adhere to this stipulation), according to an example embodiment; five-year-average market-cap, according to an example embodiment; fundamental size Yes, all six of these hypothetical 500-stock index fund portfolios change the composition of the index and creating an entirely different index, according to an example embodiment. That's the point! The S&P 500 is not, and has never been, an index of the 500 largest market-cap stocks trading in the US market. It has, on average, about 380 stocks that are among the 500 US stocks with the largest market value and 120 stocks that are not, including a handful of companies that are not US-domiciled businesses, according to an example embodiment.

When we select the 500 companies based on the fundamental size of the company's business, the result is about 370 stocks, on average, nearly identical to the S&P 500's selecting based on market capitalization, according to an example embodiment. If choosing index constituents based on the fundamental size of the business has essentially identical representation among the 500 largest market-cap stocks, when compared with the choices made by the S&P Index Committee, how can a critic persuasively say that one construction technique is correct and the other, according to an example embodiment, is not? Note the table below numbered as Table 5.

TABLE 5

Performance of Variations in Index Selection of Top 500 Stocks, October 1989-June 2021

| Index | Return | Volatility | Sharpe Ratio | Value-Add vs. S&P 500 | Tracking Error vs. S&P 500 | Information Ratio vs. S&P 500 | Annual Turnover |
|---|---|---|---|---|---|---|---|
| S&P 500 | 10.54% | 14.57% | 0.54 | — | — | — | 4.4% |
| Top 500 by Market-Cap | 10.78 | 14.64 | 0.56 | 0.25 | 1.12 | 0.22 | 5.4 |
| Top 500 by Five-Year Avg. Market-Cap | 10.92 | 14.42 | 0.57 | 0.38 | 0.75 | 0.51 | 4.5 |
| Top 500 by Fundamental Size | 11.00 | 14.25 | 0.59 | 0.46 | 0.99 | 0.47 | 4.4 |
| Top 500 by Market Cap. With Banding & Seasoning at 20% | 10.81 | 14.58 | 0.56 | 0.27 | 0.92 | 0.29 | 4.4 |
| Top 500 by Five-Year Avg Market-Cap. With Banding & Seasoning at 20% | 10.94 | 14.32 | 0.58 | 0.41 | 0.76 | 0.54 | 4.0 |
| Top 500 by Paudamental Size, With Bonding & Seasoning at 20% | 10.99 | 14.23 | 0.59 | 0.46 | 1.01 | 0.45 | 4.1 | measured as a blend of company book value adjusted for intangibles, past five-year-average sales adjusted for company debt-to-asset ratio, past five-year-average cash flow adjusted for company R&D expenses, and past five-year-average of dividends plus share repurchases, each as a percentage of the publicly traded universe, according to an example embodiment; and each of the preceding methods with banding and seasoning at 20%, according to an example embodiment.

All six alternative selection methods for the S&P 500 index's constituents outperform the actual index, according to an example embodiment. The fundamental-size selection method, which is then cap-weighted, has the highest magnitude of outperformance of the six variations we tested, according to an example embodiment. The inclusion of banding and seasoning benefited the simulated index by lowering turnover below that of the actual S&P 500, according to an example embodiment.

Putting the Pieces Together

Traditional cap-weighted indices have what we call a selection problem, which creates a drag on returns, according to an example embodiment. The problem arises from three sources, according to an example embodiment: mean reversion, when newly expensive index additions mean revert downward in price; turnover, when the associated costs are hidden by delaying index changes until after index funds have had opportunity to trade them; and selection bias, when the choice of stocks to add or delete is tacitly based on current valuation multiples and recent momentum. The preannouncement of trades by index providers, which offers fund managers a grace period to complete trades before the official index change occurs, hides all three of these components.

Overview of Various Exemplary Embodiments of the Present Invention

An exemplary embodiment of the present invention set forth a flexible and robust and/or objective methodology for Research Affiliates Capitalization-weighted Index Global, RA Cap-wtd Index Global: (RACWI Global) RACWI Global is a RAFI defined Large/Mid constituents selection & cap-weighted Index, according to an example embodiment.

Universe Constituents & Size Bucketing

According to an example embodiment, one may begin with a universe of PSU RAFI Large & Mid constituents, according to an example embodiment. That is, according to one embodiment, one may use RAFI weights for size bucketing, according to an example embodiment.

Index Weighting

Free-float adjusted cap weights.

Product Carveout

No carveout, according to an example embodiment. The Index, according to an example embodiment, is the full starting PSU universe of RAFI Large/Mid companies, according to an example embodiment.

Constraints

According to an example embodiment, a liquidity constraint may be applied of: 4× volume weight, according to an example embodiment. To be considered as a potential constitutent then, according to an example embodiment, an investment may not be greater than four (4) times volume weight, according to an example embodiment.

Rebalance Frequency

Annual rebalance of the index may be set, according to an example embodiment, at a 3rd Friday of March, for reconstitution and rebalancing, according to an example embodiment. No qualified special representative (QSR) is required since the index is set for an annual rebalance only, according to an example embodiment.

Corporate Actions Handling

Default to standard cap-weighted corporate actions (C/A) handling by Solactive, according to an example embodiment. RAFI's C/A handling is identical to Solactive's General Corporate Actions handling except for the treatment of Spin-Offs, according to an example embodiment. See RACWI, RAFI and Solactive Rulebooks for details, according to an example embodiment.

Launch Effective Date

September 2021, 3rd Friday
  Confirmations from Solactive
    17th September 2021-launch date
      RA Cap-wtd Index TR—RMCGLBT—Published on BBG (levels only)
      NTR and PR version to be setup internal only
    Solactive standard CA treatment
    Annual rebalancing
    No backtest Some internal testing stats as of Aug. 13, 2021 build date, according to an example embodiment: RCAP vs MCAP Active Share (One-Side)

AW RCAP LM vs MCAP LM: 12.37%.
  DEVxUS RCAP LM vs MCAP LM: 13.94%
  EM RCAP LM vs MCAP LM: 17.49%.
  US RCAP LM vs MCAP LM: 10.41%.
  AW RCAP LM vs RACWI LM: 0.17% (this is the difference due to volume weight constraint)
  AW RCAP LMS vs MCAP LMS: 5.62%
  DEVxUS RCAP LMS vs MCAP LMS: 5.88%
  EM RCAP LMS vs MCAP LMS: 6.85%.
  US RCAP LMS vs MCAP LMS: 5.22%

Parent Starting Universe (PSU)

Introduction

The parent universe for the RACWI index is the Research Affiliates (RA) investable universe of companies which is used to construct model portfolios for all RA strategies, according to an example embodiment. This section about PSU describes a process for selecting this investible universe of companies, according to an example embodiment.

Overview: Parent Starting Universe Companies (PSUC)

Part I: Universe Constituents Selection Module

According to an example embodiment, one may begin with electronically selecting a set of universe constituent primary securities (defined in the example GEIU process below) trading on an eligible market identifier code (MIC) electronic securities market.

Minimum mcap (top 99% within each country selected) may be used as a market capitalization (mcap) selection of electronically accessible data, according to an example embodiment.

DM & EM adjustment (e.g., after the previous step, within the Developed Markets (DM) group, adding additional companies from larger market capitalization (mcap) countries, and removes companies from smaller capitalization (smallercap) emerging markets (EM) group countries) may be used to adjust an example embodiment.

Minimum float data within each country criteria may be used to filter an example embodiment.

Minimum liquidity data requirement criteria may be used to filter an example embodiment.

The resulting combination of these example selection steps may=PSU constituents, according to an example embodiment.

Part II: Universe Size Bucketing Module

According to an example embodiment, one may begin with electronically calculating RAFI weights for all PSU constituents electronically accessible electronic list, according to an electronic RAFI weighting methodology, according to an example embodiment.

Next, within each country, define RAFI size, according to an example embodiment:

a. Large=Top 68%
  b. Mid=86%-68%
  c. Small=98%-86%
  d. "Micro"=bottom 2% is not assigned a RAFI size Countries outside of RA eligible list (23 developed markets (DMs) and 24 emerging markets (EMs)) are not assigned a RAFI size, according to an example embodiment.

PSUC and PSUR

The PSUC built is created annually at reconstitution in March, according to an example embodiment. The PSUR build is created monthly using the month-end price date (T). PSUR is typically available T+1 or T+2, according to an example embodiment.

PSUC

The PSUC is the parent starting universe of companies (PSUC) created at reconstitution (recon) each year, according to an example embodiment. PSUC is a process where PSU constituents are determined annually in March (end of February build date) based on the PSU methodology described above, according to an example embodiment. Constituents determined at PSUC stay unchanged until the next recon with the exceptions described below, according to an example embodiment.

Data
GEIU

The data source for parent universe is the company attributes data derived from the GEIU process, according to an example embodiment. See GEIU (https://www.rafi.com/content/dam/rafi/documents/index-notices/RAFI%20Indices%20Starting%20Universe.pdf).

Introduction

The RAFI Global Equity Investable Universe (GEIU) is the starting point for all index strategies available through RAFI Indices, according to an example embodiment.

Data Source

The data source for the GEIU is derived from Bloomberg Back Office, according to an example embodiment.

Eligible Exchanges and Equity Security Types

The eligible exchanges for developed and emerging markets are shown in Appendix A: Eligible Exchanges, according to an example embodiment. Eligible securities consist of all common equity securities traded on primary eligible exchanges, and preferred shares in countries where preferred shares are economically equivalent to common, issued by companies that are assigned to countries classified by RAFI Indices as developed and emerging markets, according to an example embodiment. See Tables 1 noted below.

TABLE 1

Eligible Developed and Emerging Market Countries

| DEVELOPED MARKETS* | | | EMERGING MARKETS* | | |
|---|---|---|---|---|---|
| Americas | Europe | Asia | Latin America | EMEA | Asia |
| Canada | Austria | Australia | Brazil | Czech Rep | China |
| United States | Belgium | Hong Kong | Chile | Egypt | India |
| | Denmark | Japan | Colombia | Greece | Indonesia |
| | Finland | New Zealand | Mexico | Hungary | South Korea |
| | France | Singapore | Peru | Kuwait | Malaysia |
| | Germany | | | Poland | Philippines |
| | Ireland | | | Qatar | Taiwan |
| | Israel | | | Saudi Arabia | Thailand |
| | Italy | | | South Africa | |
| | Netherlands | | | Turkey | |
| | Norway | | | UAE | |
| | Portugal | | | | |
| | Spain | | | | |
| | Sweden | | | | |
| | Switzerland | | | | |
| | United Kingdom | | | | |

&As of March 2022, there are 24 developed marketcountries and 24 emerging market countries eligible for inclusion.

Post Brexit:

TABLE 1

| DEVELOPED MARKETS | | | | | EMERGING MARKETS |
|---|---|---|---|---|---|
| United States | Japan | United Kingdom | Developed Europe, ex UK | Other Developed Markets | Emerging Markets |
| US | Japan | UK | Austria | Australia | Brazil |
| | | | Belgium | Canada | China |
| | | | Denmark | Asia Pacific | India |
| | | | Finland | Israel | South Africa |
| | | | France | Hong Kong | South Korea |
| | | | Germany | New Zealand | Taiwan |
| | | | Ireland | Singapore | Americas |
| | | | Italy | | Chile |
| | | | Netherlands | | Colombia |
| | | | Norway | | Mexico |
| | | | Portugal | | Peru |
| | | | Spain | | EMEA |
| | | | Sweden | | Czech Republic |
| | | | Switzerland | | Egypt |
| | | | | | Greece |
| | | | | | Hungary |
| | | | | | Kuwait |
| | | | | | Poland |
| | | | | | Qatar |
| | | | | | Saudi Arabia |
| | | | | | Turkey |
| | | | | | UAE |
| | | | | | Asia Pacific |
| | | | | | Indonesia |
| | | | | | Malaysia |
| | | | | | Philippines |
| | | | | | Thailand |

As of March 2022, there are 23 developed market countries and 24 emerging market countries eligible for inclusion.

Country Assignment

RAFI assigns companies to countries and promulgates that assignment to securities. The country assignments are based on country of primary listing, domicile, and incorporation, according to an example embodiment. If a company's primary listing is on a stock exchange in the same country as the company is domiciled and incorporated, then the company is assigned to that country, according to an example embodiment. If the country of domicile is different from the country of incorporation and the primary listing is in the country of domicile, then the company is assigned to the country of primary listing and domicile, according to an example embodiment. If the country of primary listing is different from the country of domicile and the country of primary listing is in the country of incorporation, then the company is assigned to the country of primary listing and incorporation, according to an example embodiment. If the country of domicile is the same as the country of incorporation, but is different from the country of primary listing, then the company is assigned to the country of domicile and incorporation. If the country of primary listing, domicile, and incorporation all differ, and for exceptions to these rules, country assignment is based on other factors including domicile of parent company, management location, source of sales, trading volume, and reporting currency, according to an example embodiment.

Eligible Investible Equity Securities

Securities and companies are eligible to be included in the GEIU by meeting certain criteria defined below, according to an example embodiment:

1. An initial investibility screen is applied to remove companies with zero volume, zero shares outstanding, and zero price, according to an example embodiment.

2. Eligible companies must meet the required minimum market capitalization in order to be included in the universe. For the purpose of determining a company's market capitalization, all security lines for that company are aggregated. Minimum market capitalization rules are as follows, according to an example embodiment:

a. Minimum Cumulative Weight-Within each country defined in Table 1, companies are sorted in descending order by unadjusted market capitalization, according to an example embodiment. For each company, a free float-adjusted market capitalization weight is then calculated, according to an example embodiment. Companies with cumulative free float-adjusted market capitalization weight greater than 99% are excluded from the starting universe, according to an example embodiment.

b. Minimum Unadjusted Market Capitalization-A minimum unadjusted market capitalization range is defined by RAFI Indices for developed and emerging markets, according to an example embodiment. The range will ensure the size of the smallest companies are comparable among countries in developed and emerging markets, according to an example embodiment.

c. Minimum Adjusted Market Capitalization-Companies with adjusted market capitalization that is less than 50% of the unadjusted market capitalization of the smallest company within its country that passes the minimum unadjusted market capitalization threshold defined in Section 2.b are excluded from the universe, according to an example embodiment.

3. Liquidity Threshold—To be eligible in the universe, a company must meet the liquidity screen as defined below, according to an example embodiment:

Company Daily Volume/Adjusted Company Market Capitalization >=0.05%

Where company Daily Volume is the maximum of the 30-day and 90-day median daily traded value in USD and company daily volume must be greater than or equal to $100,000 USD, according to an example embodiment.

RAFI Weights for Each Company

Company weights are calculated using the Fundamental Index™ methodology and are referred to herein as "RAFI Weights" for a given company, according to an example embodiment. This process breaks the price-size link and instead weights companies by four fundamental measures of company size, according to an example embodiment:

1. Adjusted Sales-Company Sales multiplied by company equity to assets ratio averaged over the past five years, according to an example embodiment.

2. Adjusted Cash Flow-Company operating cash flow averaged over the past five years plus company R&D expenses averaged over the past five years, according to an example embodiment.

3. Dividends+Buybacks—Dividends paid and share buybacks averaged over the past five years, according to an example embodiment.

4. Book Value+Intangibles—Most recent company book value plus research capital, with research capital defined as the accumulation of R&D expenses over the past six years, according to an example embodiment.

An aggregate fundamental weight is calculated for each company by averaging the normalized accounting measures for each of the four accounting measures, according to an example embodiment. This is the fundamental weight of the company, according to an example embodiment.

Region & Size Classification

Within each country listed in Table 1, eligible companies are sorted in descending order by unadjusted RAFI weights, according to an example embodiment. Companies are classified as large, mid, small and micro depending on their rankings as outlined in Table 2, according to an example embodiment. In order to reduce turnover from companies moving back and forth between size classifications each year, a banding approach is also applied to companies in order to move from one size classification to another, according to an example embodiment. For example, if a company became eligible for the GEIU in year t and ranked in the top 68% of cumulative fundamental weight within its assigned country, it would be classified as large company, according to an example embodiment. If in year t+1 that company ranked in the top 68.5% by cumulative fundamental weight, it would continue to be classified as large company in year t+1, according to an example embodiment. If in year t+2 it ranked in the top 69.5% by cumulative fundamental weight, it would then be reclassified as mid company in year t+2, according to an example embodiment. See Tables 2 noted below showing example cumulative fundamental weighting ranks and example size bands and example regional index portfolios.

TABLE 2

Size Classification and Size Bands

| Size Classificication | Cumulative Fundamental Weight Rank | Size Band |
|---|---|---|
| Large Company | 0%-68% | +1% (69%) |
| Mid Company | 68%-88% | −/+1% (67%-87%) |
| Small Company | 88%-98% | −1%/+0.5% (85%-98.5%) |
| Micro | 98%-100% | −0.5% (97.5%) |

Post-Brexit:

TABLE 2

RAFI Global Universe

| RAFI Fundamental Indices | Regions | Company Size |
|---|---|---|
| RAFI Fundamental Global Index | US, Japan, UK, Developed Europe excluding UK, Other Developed Markets, and Emerging Markets | Large/Mid |
| RAFI Fundamental Developed Index | US, Japan, UK, Developed Europe excluding UK, and Other Developed Markets | Large/Mid |
| RAFI Fundamental Developed Small Company Index | US, Japan, UK, Developed Europe excluding UK, and Other Developed Markets | Small |
| RAFI Fundamental Developed ex US index | Japan, UK, Developed Europe excluding UK, and Other Developed Markets | Large/Mid |
| RAFI Fundamental Emerging Markets Index | Emerging Markets | Large/Mid |
| RAFI Fundamental UK All Company Index | UK | Large/Mid/Small |
| RAFI Fundamental US Index | US | Large/Mid |
| RAFI Fundamental US Small Company Index | US | Small |

Note:
Refer to section 2.6 for rules on eligible companies for the RAFI Fundamental Australia 200 Index and RAFI Fundamental Australia Small Company Index.

Companies are then assigned to region/size buckets according to country and size classification, according to an example embodiment. Table 3 outlines the region assignment for each country, according to an example embodiment. The total global large/mid universe is the union of all companies classified as large and mid company in each of the six regions, according to an example embodiment. The global small universe is the union of all companies classified as small company in each of the six regions, according to an example embodiment. See Table labeled as Table 3 below with example regions as may be used in an example embodiment.

TABLE 3

Region Classification

| States | Japan | United Kingdom | Developed Europe, ex UK | Other Developed Markets | Emerging Markets |
|---|---|---|---|---|---|
| US | Japan | UK | Austria | Australia | Brazil |
| | | | Belgium | Canada | China |
| | | | Denmark | Asia Pacific | India |
| | | | Finland | Israel | South Africa |
| | | | France | Hong Kong | South Korea |
| | | | Germany | New Zealand | Taiwan |
| | | | Ireland | Singapore | Americas |
| | | | Italy | | Chile |
| | | | Netherlands | | Colombia |
| | | | Norway | | Mexico |
| | | | Portugal | | Peru |
| | | | Spain | | EMEA |
| | | | Sweden | | Czech Republic |
| | | | Switzerland | | Egypt |
| | | | | | Greece |
| | | | | | Hungary |
| | | | | | Poland |
| | | | | | Qatar |
| | | | | | Saudi Arabia |
| | | | | | Turkey |
| | | | | | UAE |
| | | | | | Asia Pacific |
| | | | | | Indonesia |
| | | | | | Malaysia |
| | | | | | Thailand |

As of March 2022, there are 23 developed market countries and 24 emerging market countries eligible for inclusion.

RAFI Global Equity Investable Universe as of March 2022

Table 4 outlines the number of companies within each region/size classification.

TABLE 4

Region/Size Classification

| Region | Large Company | Company | Small Company | Micro | Total |
|---|---|---|---|---|---|
| Developed Europe ex UK | 141 | 198 | 471 | 408 | 1,218 |
| Other Developed | 141 | 177 | 377 | 368 | 1,063 |
| Emerging Markets | 458 | 724 | 1,829 | 1,346 | 4,356 |
| Japan | 148 | 228 | 460 | 274 | 1,108 |
| United Kingdom | 25 | 49 | 157 | 162 | 393 |
| United States | 175 | 310 | 833 | 846 | 2,164 |
| Total | 1,086 | 1,686 | 4,127 | 3,403 | 10,302 |

See Appendix A: Eligible Exchanges below.

APPENDIX A

Eligible Exchanges

| ISO Country Code | MIC | Exchange Name | Country | Developed/ Emerging |
|---|---|---|---|---|
| AU | XASX | Australian Securities Exchange | Australia | Developed |
| AT | XWBO | Wiener Borse | Austria | Developed |
| BE | XBRU | Euronext Brussels | Belgium | Developed |
| CA | XTSE | Toronto Stock Exchange | Canada | Developed |
| DK | XCSE | Copenhagen Stock Exchange | Denmark | Developed |
| FI | XHEL | Helsinki Stock Exchange | Finland | Developed |
| FR | XPAR | Euronext Paris/ European Stock Exchange | France | Developed |
| DE | XETR | XETRA | Germany | Developed |
| HK | XHKG | Hong Kong Exchanges and Clearing | Hong Kong | Developed |
| HK | SHSC | Shanghai-Hong Kong Stock Connect | Hong Kong | Developed |
| HK | SZSC | Shenzhen-Hong Kong Stock Connect | Hong Kong | Developed |
| IE | XDUB | Irish Stock Exchange | Ireland | Developed |
| IL | XTAE | Tel-Aviv Stock Exchange | Israel | Developed |
| IT | MTAA | ELECTRONIC SHARE MARKET | Italy | Developed |
| JP | XJAS | Tokyo Stock Exchange JASDAQ | Japan | Developed |
| JP | XTKS | Tokyo Stock Exchange | Japan | Developed |
| JP | XOSE | OSAKA EXCHANGE | Japan | Developed |
| LU | XLUX | Luxembourg Stock Exchange | Luxembourg | Developed |
| NL | XAMS | Euronext Amsterdam | Netherlands | Developed |
| NZ | XNZE | NZX Limited/New Zealand Exchange | New Zealand | Developed |
| NO | XOSL | Oslo Stock Exchange/ Oslo Bors | Norway | Developed |
| PT | XLIS | Euronext Lisbon | Portugal | Developed |
| SG | XSES | Singapore Exchange | Singapore | Developed |
| ES | XMAD | BOLSA DE MADRID | Spain | Developed |
| SE | XSTO | NASDAQ OMX/ Stockholm Stock Exchange | Sweden | Developed |
| CH | XSWX | SIX Swiss Exchange | Switzerland | Developed |
| GB | XLON | London Stock Exchange | United Kingdom | Developed |
| US | XNYS | NYSE | United States | Developed |
| US | XASE | NYSE MKT LLC | United States | Developed |
| US | XNCM | NASDAQ CAPITAL MARKET | United States | Developed |
| US | XNGS | NASDAQ/ NGS (GLOBAL SELECT MARKET) | United States | Developed |
| US | XNMS | NASDAQ/NMS (GLOBAL MARKET) | United States | Developed |
| BR | BVMF | BM&F BOVESPA | Brazil | Emerging |
| CL | XSGO | Bolsa de Comercio de Santiago | Chile | Emerging |
| CN | XSHE | Shenzhen Stock Exchange | China | Emerging |
| CN | XSHG | Shanghai Stock Exchange | China | Emerging |
| CN | XSEC | Shenzhen Stock Exchange- Hong Kong Connect | China | Emerging |
| CN | XSSC | Shanghai Stock Exchange- Hong Kong Connect | China | Emerging |
| CO | XBOG | Bolsa de Valores de Colombia | Colombia | Emerging |
| CZ | XPRA | PRAGUE STOCK EXCHANGE | Czech Republic | Emerging |
| EG | XGAI | Egyptian Exchange | Egypt | Emerging |

APPENDIX A-continued

Eligible Exchanges

| ISO Country Code | MIC | Exchange Name | Country | Developed/ Emerging |
|---|---|---|---|---|
| GR | XATH | Athens Exchange SA-Cash Market | Greece | Emerging |
| HU | XBUD | Budapest Stock Exchange | Hungary | Emerging |
| IN | XNSE | National Stock Exchange of India | India | Emerging |
| IN | XBOM | BSE India Limited/ Bombay Stock Exchange | India | Emerging |
| ID | XIDX | Indonesia Stock Exchange | Indonesia | Emerging |
| KW | XKUW | Kuwait Stock Exchange | Kuwait | Emerging |
| MY | XKLS | Bursa Malaysia | Malaysia | Emerging |
| MX | XMEX | Bolsa Mexicana de Valores | Mexico | Emerging |
| PE | XLIM | Bolsa de Valores de Lima | Peru | Emerging |
| PH | XPHS | Philippine Stock Exchange | Philippine | Emerging |
| PL | XWAR | Warsaw Stock Exchange | Poland | Emerging |
| QA | DSMD | Qatar Stock Exchange/ Doha Securities Market | Qatar | Emerging |
| SA | XSAU | SAUDI STOCK EXCHANGE | Saudi Arabia | Emerging |
| ZA | XJSE | Johannesburg Stock Exchange (JSE) | South Africa | Emerging |
| KR | XKOS | Korea Exchange (KOSDAQ) | South Korea | Emerging |
| KR | XKRX | Korea Exchange (STOCK MARKET) | South Korea | Emerging |
| TW | XTAI | Taiwan Stock Exchange Corp | Taiwan | Emerging |
| TH | XBKK | Stock Exchange of Thailand | Thailand | Emerging |
| TR | XIST | Borsa Istanbul | Turkey | Emerging |
| AE | XDFM | Dubai Financial Market | UAE | Emerging |
| AE | XADS | Abu Dhabi Securities Exchange | UAE | Emerging |
| AE | DIFX | NASDAQ DUBAI | UAE | Emerging |

The example inputs for an example embodiment may include the following:
    a. Company unadjusted market cap
    b. Company adjusted market cap
    c. Company volume
    d. Country classification
    e. Market Group classification (Dev/EM)
Bloomberg Back Office Example Fundamental data to calculate RAFI weights for PSU size determination, according to an example embodiment, may be used.
Tradeable Companies PSU constituents determination begins with all tradeable companies (see GEIU technical document, discussed further below).
Eligible Exchanges (Market Identifier Code (MIC))

Only securities listed in the eligible exchanges can be included in parent universe, according to an example embodiment. The eligible exchanges market identifier code (MICs) list is compiled by RA for the PSU process. See the Appendix for the list of Eligible MICs, according to an example embodiment.
Primary Security Type and U.S. Country Classification Filtering If a company whose primary security line is DR is mapped to country classification=U.S., then drop this company from the PSU, according to an example embodiment. (This rule went into effect starting with the June 2020 PSUR).

Further, if the primary security line trades outside of a U.S. Exchange (mic_to_country.txt mapping to determine US MICs), then drop this company from PSU, according to an example embodiment.

For example, company is classified as country=US, but its primary security line trades in the UK, according to an example embodiment.

At the time of this rule change, there were only 3 DRs (all ADRs) classified as a U.S. company. Of these, only 1 company (Ternium) was in the top 98% by RAFI Size, according to an example embodiment.
Constituents Selection
Minimum Market Cap by Country A company must meet the required minimum market capitalization in order to be included in the parent universe, according to an example embodiment. Within each country, rank companies in descending order by unadjusted market capitalization, according to an example embodiment. Then, drop companies with cumulative free float-adjusted market capitalization weight greater than 99%, according to an example embodiment.
Minimum Market Cap by Market Group Minimum unadjusted market cap range is defined for developed market and emerging market, according to an example embodiment. The range will ensure size of the smallest companies are comparable among countries in developed market and in emerging market, according to an example embodiment.

Within developed market do the following, according to an example embodiment:
    a. Sort companies in descending order by unadjusted market capitalization.
    b. Calculate free float-adjusted market capitalization.
    c. Calculate cumulative free float-adjusted market capitalization weight.

Set minimum unadjusted market cap range as follows, according to an example embodiment:
    a. High_Developed=the unadjusted market cap of the company with 98% cumulative freefloat-adjusted market capitalization weight in developed market.
    b. Low_Developed=the unadjusted market cap of the company with 99% cumulative freefloat-adjusted market capitalization weight in developed market.
    c. High_Emerging=50% of High_Developed.
    d. Low_Emerging=50% of Low_Developed.

For companies in Developed countries, according to an example embodiment,
    a. If company unadjusted market cap>High_Developed, pass the screen.
    b. If company unadjusted market between High_Developed and Low_Developed and pass minimum cumulative weight threshold, pass the screen.
    c. If company unadjusted market cap<Low_Developed, fail the screen.

For companies in Emerging countries, according to an example embodiment,
    a. If company unadjusted market cap>High_Emerging, pass the screen.
    b. If company unadjusted market between High_Emerging and Low_Emerging and pass minimum cumulative weight threshold, pass the screen.
    c. If company unadjusted market cap<Low_Emerging, fail the screen.
Minimum Free-Float by Country Remove companies with adjusted market cap less than 50% of unadjusted market cap of the smallest company in that country that passed the minimum unadjusted market cap threshold in previous section, according to an example embodiment.

Minimum Liquidity Requirement

To be eligible in the parent universe, a company must meet the liquidity screens (electronic data filters by data value threshold) below, according to an example embodiment:

a. Company daily volume/adjusted company market capitalization >5 bps, and
b. Company daily volume >$100,000

RAFI Size Definition

All securities in the parent universe will get from an electronic computation a full company fundamental score and investible company level fundamental score, and both score values may be stored in an electronic database record associated with each of the securities of the parent universe financial objects, according to an example embodiment. The RAFI size is defined annually at the end of February, according to an example embodiment. The RAFI size of a company can only be redefined intra-year when such company moves its region, according to an example embodiment.

For all companies in parent universe, calculate, according to an example embodiment a. RAFI weights Next, assign PSU size buckets for all PSU constituents, according to an example embodiment a. Size Classification

|  | RAFI Size | Cumulative Percentile |
|---|---|---|
| i. | 1. Large | <68% |
|  | 2. Mid | 68% to 86% |
|  | 3. Small | 86% to 98% |

Size Banding

Size banding is applied to the PSUC size definition to reduce turnover from companies jumping back and forth between size buckets each year, according to an example embodiment.

Each year size definitions are defined per the process explained above, then compared to the prior years size definition, according to an example embodiment. If a company's size has the potential to change banding is applied to check if it qualifies for a size bucket change, according to an example embodiment. Increases in size classification (lower cumulative sum of adjusted rafi weight) have a 1% band applied to enter the large or medium size bucket and a 0.5% band to enter the small bucket, according to an example embodiment. For a decrease in size (higher cumulative sum of adjusted rafi weight) a 1% band is applied to enter the medium or small bucket and a 0.5% band to enter the micro bucket, according to an example embodiment.

| Size | PotentialSize Increase(Cum. % Up) | PotentialSize Decrease (Cum. % down) |
|---|---|---|
| Large | <67% | < 69% |
| Medium | 67%-85% | 69%-87% |
| Small | 85%-97.5% | 87%-98.5% |
| Micro | >97.5% | >98.5% |

Size banding is not applied to companies that change countries between years, according to an example embodiment.

Size banding was first applied in 2022 for the 03/2022 PSUC, according to an example embodiment.

PSUR

After March recon (PSUC), a PSUR build is created each month, according to an example embodiment. PSU constituents and company attributes are evaluated and may be changed at PSUR, according to an example embodiment. Some company attributes are derived at PSUC and stay unchanged until next recon unless certain condition takes place, according to an example embodiment. Other company attributes are evaluated and updated at each PSUR, according to an example embodiment.

PSUR is created in March after PSUC, according to an example embodiment. The PSUR in March has identical constituents and company attributes as the PSUC, according to an example embodiment.

PSU Constituents Intra-Recon Changes

Additions

A company may be added to PSU if it is a new company created through reorg from an existing PSU constituent, according to an example embodiment.

Deletions

An existing constituent may be removed from PSU if it is no longer a tradeable company, according to an example embodiment.

None of its tradeable securities trade on eligible market identifier code (MIC), according to an example embodiment.

Stable Company Attributes

Company Free Float: If the weight impact by the change of free float exceeds threshold described in Stable Free-Float section, according to an example embodiment.

RAFI Size: If a company changes its region due to change in country classification, according to an example embodiment. For example, a company's country moves from US to Netherland. Its region will be changed from US to DevEuropeExUK, according to an example embodiment.

Primary Security: The primary security selected at PSUC becomes inactive or delisted, according to an example embodiment. A new primary security will be picked based on primary security selection methodology. Please refer to GEIU tech doc, according to an example embodiment.

Updated Company Attributes

Country Classification
PU Sector
Company Volume
Company Market Cap (unadjusted and adjusted)

Stable Free Float

A company free float is determined annually at PSUC and stays unchanged if its weight change impact is within the threshold specified below, according to an example embodiment. If weight change impact >threshold, set the company float to current free float, according to an example embodiment. If weight change impact <threshold, then set the company float to free float from last PSUR.

Weight change Impact=ABS((current free float-free float from previous PSUR)*RAFI weight within region)

| Region | Example Weight Change Impact Threshold |
|---|---|
| US | 0.02% |
| UK | 0.05% |
| Japan | 0.05% |
| DevEuropeExUK | 0.05% |
| DevOther | 0.05% |
| Emerging | 0.05% |

Market Cap Benchmarks

For internal analytics purpose, benchmarks are created for region/size as needed in production and in test, according to an example embodiment. Any cap benchmark can be created by any combination of region and size, according to an example embodiment.

Size Definition

All companies in parent universe have gross company market cap and free float adjusted company market cap, according to an example embodiment. Cap size of a company is defined annually at end of February (should consider evaluate cap size semi-annually), according to an example embodiment. The cap size of a company can only be redefined intra-year when such company moves its country, according to an example embodiment.

For all companies in parent universe, according to an example embodiment, do the following:

Within each country, sort all companies in descending order by gross company market cap, according to an example embodiment.

Gross company market cap is adjusted by free float factor to get free float adjusted company market cap, according to an example embodiment.

Calculate cumulative free float adjusted cap weight for each company, according to an example embodiment.

Within each country, all companies are assigned to a cap size bucket based on their free float adjusted cumulative cap weights, according to an example embodiment:

| Mcap Size | Cumulative Percentile |
|---|---|
| Large | <68% |
| Mid | 68% to 86% |
| Small | 86% to 98% |

Eligible Countries in EM

There are two hurdles that must be met for inclusion in an Index or Product. First, the country must be included in the opportunity set, according to an example embodiment. Second, the country's RAFI weight within the RAFI EM Index must exceed 50 bps, according to an example embodiment. If a country was held in RAFI EM in the previous year, the country continues to be banded-in if the weight exceeds 20 bps, according to an example embodiment.

Opportunity Set Decision

The Index Committee analyzes whether a country is to be included in the universe, as well as for promotions or demotions from DM to EM, according to an example embodiment. For example, Saudi Arabia inclusion decision, or Greece demotion decision to EM from DM. Typically a client consultation is conducted to guide these decisions, according to an example embodiment.

If country fails this decision, it will not be included in the PSU, according to an example embodiment.

Annual 50 Bps Screening, with 20 Bps Retention

In June, after the GEU financial data review process, countries classified as Emerging Markets are reviewed for inclusion to RAFI and RAE portfolios, according to an example embodiment. This review process is performed annually and is designed to minimize turnover and transaction cost. (See RAFI Meta Tech Doc for details), according to an example embodiment.

If a country fails this threshold, while they are in the opportunity set, they are screened out at the Build level, as they are not part of the eligible country group (e.g., screened out thru 2021-UAE, Qatar, Egypt, Colombia, so forth), according to an example embodiment.

If a country was held in RAFI EM in the previous year, the country continues to be banded-in if the weight exceeds 20 bps. (e.g. Greece in 2019, 2020, 2021, . . . ), according to an example embodiment.

Appendix

Appendix I: Market Classification and Region

APPENDIX II

| | | Eligible Exchanges (MICS) | |
|---|---|---|---|
| ISO Country Code | MIC | Exchange Name | Country |
| AU | XASX | Australian Securities Exchange | Australia |
| AT | XWBO | Wiener Borse | Austria |
| BE | XBRU | Euronext Brussels | Belgium |
| CA | XTSE | Toronto Stock Exchange | Canada |
| DK | XCSE | Copenhagen Stock Exchange | Denmark |
| FI | XHEL | Helsinki Stock Exchange | Finland |
| FR | XPAR | Euronext Paris/European Stock Exchange | France |
| DE | XETR | XETRA | Germany |
| HK | XHKG | Hong Kong Exchanges and Clearing | Hong Kong |
| HK | SHSC | Shanghai-Hong Kong Stock Connect | Hong Kong |
| HK | SZSC | Shenzhen-Hong Kong Stock Connect | Hong Kong |
| IE | XDUB | Irish Stock Exchange | Ireland |
| IL | XTAE | Tel-Aviv Stock Exchange | Israel |
| IT | MTAA | ELECTRONIC SHARE MARKET | Italy |
| JP | XJAS | Tokyo Stock Exchange JASDAQ | Japan |
| JP | XTKS | Tokyo Stock Exchange | Japan |
| JP | XOSE | OSAKA EXCHANGE | Japan |
| LU | XLUX | Luxembourg Stock Exchange | Luxembourg |
| NL | XAMS | Euronext Amsterdam | Netherlands |
| NZ | XNZE | NZX Limited/New Zealand Exchange | New Zealand |
| NO | XOSL | Oslo Stock Exchange/Oslo Bors | Norway |
| PT | XLIS | Euronext Lisbon | Portugal |
| SG | XSES | Singapore Exchange | Singapore |
| ES | XMAD | BOLSA DE MADRID | Spain |
| ES | XMCE | MERCADO CONTINUO ESPANOL | Spain |
| SE | XSTO | NASDAQ OMX/Stockholm Stock Exchange | Sweden |
| CH | XSWX | SIX Swiss Exchange | Switzerland |
| CH | XVTX | SIX SWISS EXCHANGE-BLUE CHIPS SEGMENT | Switzerland |
| GB | XLON | London Stock Exchange | UnitedKingdom |
| US | XNYS | NYSE | United States |
| US | XASE | NYSE MKT LLC | United States |
| US | XNCM | NASDAQ CAPITAL MARKET | United States |
| US | XNGS | NASDAQ/NGS (GLOBAL SELECT MARKET) | United States |
| US | XNMS | NASDAQ/NMS (GLOBAL MARKET) | United States |
| BR | BVMF | BM&F BOVESPA | Brazil |
| CL | XSGO | Bolsa de Comercio de Santiago | Chile |
| CN | XSHE | Shenzhen Stock Exchange | China |
| CN | XSHG | Shanghai Stock Exchange | China |
| CN | XSEC | ShenzhenStockExchange-HongKong Connect | China |
| CN | XSSC | Shanghai Stock Exchange-HongKong Connect | China |
| CO | XBOG | Bolsa de Valores de Colombia | Colombia |
| CZ | XPRA | PRAGUE STOCK EXCHANGE | Czech Republic |
| EG | XCAI | Egyptian Exchange | Egypt |
| GR | XATH | Athens Exchange SA-Cash Market | Greece |
| HU | XBUD | Budapest Stock Exchange | Hungary |
| IN | XNSE | National Stock Exchange of India | India |
| IN | XBOM | BSE India Limited/Bombay Stock Exchange | India |
| ID | XIDX | Indonesia Stock Exchange | Indonesia |
| MY | XKLS | Bursa Malaysia | Malaysia |
| MX | XMEX | Bolsa Mexicana de Valores | Mexico |
| PE | XLIM | Bolsa de Valores de Lima | Peru |
| PH | XPHS | Philippine Stock Exchange | Philippine |
| PL | XWAR | Warsaw Stock Exchange | Poland |

APPENDIX II-continued

Eligible Exchanges (MICS)

| ISO Country Code | MIC | Exchange Name | Country |
|---|---|---|---|
| QA | DSMD | QatarStock Exchange/Doha SecuritiesMarket | Qatar |
| RU | MISX | Moscow Exchange | Russia |
| ZA | XJSE | Johannesburg Stock Exchange (JSE) | South Africa |
| KR | XKON | Korea New Exchange | South Korea |
| KR | XKOS | Korea Exchange (KOSDAQ) | South Korea |
| KR | XKRX | Korea Exchange (STOCK MARKET) | South Korea |
| SA | XSAU | Tadawul Exchange | Saudi Arabia |
| TW | XTAI | Taiwan Stock Exchange Corp | Taiwan |
| TH | XBKK | Stock Exchange of Thailand | Thailand |
| TR | XIST | Borsa Istanbul | Turkey |
| AE | XDFM | Dubai Financial Market | UAE |
| AE | XADS | Abu Dhabi Securities Exchange | UAE |

APPENDIX III

Benchmark Region

| Region Name | Region Code |
|---|---|
| All World | DevEM |
| All World ex Switzerland | DevEM-CH |
| Developed | Dev |
| Developed ex US | Dev-US |
| Developed ex Japan | Dev-JP |
| Developed Europe | Dev.Europe |
| Emerging | Em |
| Emerging ex KR | Em-KR |
| Australia | +AU |
| Japan | +JP |
| South Africa | +ZA |
| Sweden | +SE |
| UK | +GB |
| US | +US |

1. Introduction

Portions of this document are to be used as a guideline with regard to the composition, calculation, and management of the Index, according to an example embodiment. Any changes made to the guideline are initiated by the Oversight Committee specified in Decision Making Bodies, according to an example embodiment. The Index is calculated and published for RAFI Indices by Solactive AG, according to an example embodiment.

Index Specifications

The Index is owned by RAFI Indices, a wholly owned subsidiary of Research Affiliates Global Holdings, according to an example embodiment. Solactive AG is the index calculator and Benchmark Administrator, according to an example embodiment.

| RACWI Index Name | Global | | | | Index Information | | |
|---|---|---|---|---|---|---|---|
| | Total Return Ticket | Price Return Ticker | Net Return Ticker | Market Hours | Currency | Base Date | Launch Date |
| RACWI Global Index | PACWIGLT | N/A | N/A | Global | USD | Aug. 12, 2021 | Mar. 17, 2021 | is information on the available indices and their return calculations (price, total return, and net return) and published currency.

The index listed may be referred to herein as the "Index," or more detailed as, according to an example embodiment, "RACWI Global Index."

1.1 Short Name and Identifier

See above for the Index name and identifiers, according to an example embodiment.

1.2 Initial Value

The Index is based on an index level of 1,000 at the close of trading on the base date. Please see Appendix 5.1 for a complete list of indices and base dates, according to an example embodiment.

1.3 Distribution

The Index is published on the website of the Benchmark Administrator https://www.solactive.com and is, in addition, available via the price marketing services of Boerse Stuttgart GmbH and may be distributed to all of its affiliated vendors. Each vendor decides on an individual basis as to whether it will distribute or display the Index via its information systems.

Any publication in relation to the Index (e.g. notices, amendments to the Guideline) will be available at the website of the Index Administrator: https://www.solactive.com/news/announcements/.

1.4 Levels and Calculation Frequency

The levels of the Index is calculated on each Business Day during the market hours specified above (Global) based on the Trading Prices on the Exchanges on which the Index Components are listed, according to an example embodiment. Trading Prices of Index Components not listed in the Index Currency are converted using the current Intercontinental Exchange (ICE) spot foreign exchange rate, according to an example embodiment. Should there be no current Trading Price for an Index Component, the later of: (i) the most recent Closing Price; or (ii) the last available Trading Price for the preceding Trading Day is used in the calculation. In addition to the intraday calculation, a closing level of the Index for each Business Day is also calculated, according to an example embodiment. This closing level is based on the Closing Prices for the Index Components on the respective Exchanges on which the Index Components are listed, according to an example embodiment. The Closing Prices of Index Components not listed in the Index Currency are converted using the 04:00 p.m. London time WM Fixing quoted by Reuters, according to an example embodiment. If there is no 04:00 p.m. London time WM Fixing for the relevant Business Day, the last available 04:00 p.m. London time WM Fixing will be used for the closing level calculation, according to an example embodiment.

1.5 Decision-Making Bodies

An oversight committee composed of staff from Solactive and its subsidiaries (the "Oversight Committee") is responsible for decisions regarding any amendments to the rules of the Index, provided that the starting universe for the composition of the Index and its relevant specifications are established by RAFI Indices, according to an example embodiment. Any such amendment, which may result in an amendment of the guideline, must be submitted to the Oversight Committee for prior approval and will be made in compliance with the Methodology Policy, which is available on the Solactive website, according to an example embodiment: Methodology Policy (https://www.solactive.com/documents/methodology-policy/).

Internal quality controls are performed in constructing the model portfolios used by RAFI Indices, according to an example embodiment. In the event that it is determined that an alternative data source is required as a result of data integrity concerns, the Oversight Committee shall be informed to determine both the appropriateness of the data source and the materiality of the change, according to an example embodiment. The Oversight Committee, in this regard, shall approve all changes, according to an example embodiment.

1.6 Publication

All specifications and information relevant for calculating the Index are made available on the https://www.solactive.com web page and sub-pages, according to an example embodiment.

1.7 Historical Data

Historical data prior to the index base date (outlined in table 5.1) is based on simulated past performances derived using the Index rules outlined in this manual, according to an example embodiment. The backtested index levels have been calculated by reinvesting dividends paid by index components using the standard formula instead of the Laspeyres formula as stated in this Index manual (the calculation formulas are explained on the Solactive website under https://www.solactive.com/news/documents/), according to an example embodiment. Simulated past performances rely on data by third party data vendors, which may have been adjusted, restated, or corrected ex post, according to an example embodiment. The backtested index levels are not adjusted for any ex post adjustments, according to an example embodiment.

2. Construction Methodology 2.1 Starting Universe

The model portfolio construction process starts with the RAFI Global Equity Investable Universe (GEIU), according to an example embodiment. Constituents of this universe must meet and pass minimum liquidity and investability (capacity) requirements. The GEIU consists of all common equity securities traded on primary exchanges, and preferred shares in countries where preferred shares are economically equivalent to common, issued by companies that are assigned to countries classified by RAFI Indices as developed and emerging markets, according to an example embodiment. Eligible developed and emerging market countries are assigned to one of six regions as defined in Table 1, according to an example embodiment.

TABLE 1

| DEVELOPED MARKETS | | | | | EMERGING MARKETS |
|---|---|---|---|---|---|
| United States | Japan | United Kingdom | Developed Europe, ex UK | Other Developed Markets | Emerging Markets |
| US | Japan | UK | Austria<br>Belgium<br>Denmark | Australia<br>Canada<br>Asia Pacific | Brazil<br>China<br>India |
| | | | Finland<br>France<br>Germany<br>Ireland | Israel<br>Hong Kong<br>New Zealand<br>Singapore | South Africa<br>South Korea<br>Taiwan<br>Americas |
| | | | Italy<br>Netherlands<br>Norway<br>Portugal | | Chile<br>Colombia<br>Mexico<br>Peru |

TABLE 1-continued

| DEVELOPED MARKETS | | | | | EMERGING MARKETS |
|---|---|---|---|---|---|
| United States | Japan | United Kingdom | Developed Europe, ex UK | Other Developed Markets | Emerging Markets |
| | | | Spain | | EMEA |
| | | | Sweden<br>Switzerland | | Czech Republic<br>Egypt<br>Greece<br>Hungary<br>Kuwait<br>Poland<br>Qatar<br>Saudi Arabia<br>Turkey<br>UAE<br>Asia Pacific |
| | | | | | Indonesia<br>Malaysia<br>Philippines<br>Thailand |

*As of March 2022, there are 23 developed market countries and 25 emerging market countries eligible for inclusion.

2.2 Country Assignment & Size Classification

Country assignment and size classifications are determined based on the GEIU (https://www.rafi.com/content/dam/rafi/documents/index-notices/RAFI%20Indices%20Starting%20Universe.pdf) guideline, according to an example embodiment. RAFI Indices assigns companies to countries and promulgates that assignment to securities, according to an example embodiment, according to an example embodiment. Eligible securities are assigned to one of three size classifications; large company, mid company and small company based on fundamental weight, according to an example embodiment, according to an example embodiment.

2.3 Fundamental Weights

Fundamental weights are calculated using four accounting measures from company financial statements, according to an example embodiment:

1. Adjusted sales is calculated as company sales multiplied by company equity to assets ratio averaged over the past five years, according to an example embodiment.

2. Adjusted cash flow is calculated as company operating cash flow averaged over the past five years plus company R&D expenses averaged over the past five years, according to an example embodiment.

3. Dividend plus buybacks are calculated using the average dividends paid and share buybacks over the past five years, according to an example embodiment.

4. Book value plus intangibles is calculated as the most recent company book value plus research capital, with research capital defined as the accumulation of depreciated R&D expenses over the past six years, according to an example embodiment. An aggregate fundamental weight is calculated for each company by averaging the normalized accounting measures for each of the four accounting measures, according to an example embodiment. This is the fundamental weight of the company, according to an example embodiment.

2.4 Emerging Market Country Eligibility Rule

A country classified by RAFI Indices as emerging markets in Section 2.1 is eligible for the Index if the adjusted fundamental country weight in a fundamentally weighted Emerging Markets large and midcompany portfolio as described in Section 2.3 is equal to or greater than 0.50%, according to an example embodiment. Countries that were eligible in the previous year and have an adjusted fundamental country weight above 0.20% in the current year are still considered eligible, according to an example embodiment. The emerging market country eligibility is determined annually, according to an example embodiment.

2.5 Market Capitalization Weights

Market capitalization weights are calculated by multiplying a company's closing price and shares outstanding on the Selection Date, according to an example embodiment.

2.5.1 Free-Float Adjustment

The entire stock in any given company is not always available to equity investors. Therefore, a company free-float factor is calculated, according to an example embodiment. The company free-float factor is defined as the ratio of the total market capitalization of the shares of the company in free float to the total market capitalization of the company, according to an example embodiment. This measure of free float is equivalent to the aggregation of the security level free-float factors across all the security lines of the company's stock, according to an example embodiment. The company level free-float factor is applied as an adjustment to the company's market capitalization weight, according to an example embodiment. Adjusted market capitalization weight is calculated by aggregating the free-float adjusted market capitalization weight for each company and renormalizing, according to an example embodiment.

2.6 RACWI Global Index Construction

Region and size classifications for the RACWI Global Index is outlined in Table 2, according to an example embodiment. Eligible companies are selected based on their Fundamental Weight as outlined Section 2.3 and weighted based on their free-float adjusted market capitalization weight as outlined in Section 2.5 subject to the application of liquidity limit Rule 2.7, according to an example embodiment.

TABLE 2

| RAFI Global Universe | | |
| --- | --- | --- |
| RAFI Fundamental Indices | Regions | Company Size |
| RACWI Global | US, Japan, UK, Developed Europe excluding UK, Other Developed Markets, and Emerging Markets | Large/Mid |

The index is reconstituted and rebalanced annually on the third Friday of March, according to an example embodiment.

2.7 Application of Liquidity Limit

The following liquidity limits are applied to the eligible securities. Let MCi be the market capitalization value of the $i^{th}$ company, according to an example embodiment. The free-float adjusted market capitalization weight, as defined in Section 2.5.1, $MW_i$ for company i is, according to an example embodiment:

$$MW_i = (MC_i * \text{Free\_Float}_i) / \sum_{i=1}^{N}(MC_i * \text{Free\_Float}_i)$$

Let $ADTV_i$ be the maximum of the 30-day and 90-day median daily traded value in USD at each rebalance. The liquidity weight $LW_i$ for company i is, according to an example embodiment:

$$LW_i = ADTV_i / \sum_{i=1}^{N} ADTV_i$$

The 30-day median traded value will be used where there is less than 90 days of historical data, according to an example embodiment. Where there is less than 30 days of historical data, the stock will have a value of zero, according to an example embodiment. Where there are multiple lines of equity capital in a company, the traded value will be the aggregation of all lines in the aforementioned company, according to an example embodiment.

The liquidity ratio (LR) is defined as the ratio of adjusted market capitalization weight to liquidity weight, according to an example embodiment.

The liquidity ratio for company i is, according to an example embodiment:

$$LR_i = MW_i / LW_i$$

Where the liquidity ratio is more than four, the new market capitalization value is calculated as, according to an example embodiment:

$$\hat{MV}_i = 4 \times LW_i \times \sum_{i=1}^{N} MV_i$$

After the market capitalization values are updated for all companies using the above formula, new adjusted fundamental weights and liquidity ratios are calculated, according to an example embodiment. The process is repeated until all liquidity ratios attain a value not exceeding four, according to an example embodiment. Note that this process will only modify the fundamental values of stocks that exceed the liquidity limit, according to an example embodiment.

2.8 Extraordinary Adjustment

An extraordinary adjustment, if applicable, is triggered and applied in compliance with the rules set forth in the Solactive Equity Index Methodology, (except for rules outlined in Sections 3.4 and 3.5), which can be found here: Equity Index Methodology (https://www.solactive.com/documents/equity-index-methodology/), according to an example embodiment, excerpt included below. Per Solactive, extraordinary events such as, e.g., ad-hoc delistings, unspecified listing dates for spun-off companies, or undisclosed, incomplete or mismatched transaction terms require a high level of flexibility and fast reaction times. In the case an extraordinary event is not outlined as mentioned above, the Solactive Oversight Committee reserves the right to make index adjustments in an appropriate way on a best-efforts basis.

Symbols adjP$_p$ Corporate Action adjusted close price parent company at ex-date-1
aS Adjusted Total Number of Shares
ap Adjusted Price
aw Adjusted Weight
ax Adjusted Fraction of Shares
CF Correction Factor
CFI Conduit Foreign Income
CP Cash Pocket
d Dividend Amount
DEL Index Component which is deleted from the Index due to Index Rebalance
DOP Index Delta Dividend Points DWC Daily Weight Change of an Index Component in Multiday Index Rebalance
D Divisor
DP Index Dividend Point
EX Ex-date
f Foreign Exchange Rate
$fx_p$ Exchange rate parent instrument's currency into index currency at ex-date-1
$fx_s$ Exchange rate spin off instrument's currency into index currency at ex-date-1
FFF Free Float Factor
g Number for Calendar Days for Adjusted Return Calculation
i=1, 2, . . . N Count for index Members
Index Index Level
ID Implementation Date
IN Indicative
n Number of index Components on Business Day t
m Number of index Components on Business Day t+1
MCAP Index Market Capitalization
NAD Number of Adjustment: Days in Multiday Index Reactance
p Price of index Component
$P_p$ Open price parent company at ex-date
$P_s$ Open price spin-off company at ex-date
PAF Price Adjustment Factor
S Total Number of Shares of the Index Component
SAR Share Adjustment Ratio
SP Subscription Price
ST Stock Terms
t=1, 2, . . . N Count for Index Calculation Days
T Issue Term/Spin-Off Terms
TG Target
TGW index Target Weights after Rebalance
Withholding Tax Rate
WCF Weighting Cap Factor
x Fraction of Shares of the Index Component
α Pre-defined Divisor for Adjusted Return Calculation
ΔDelta
μ Pre-defined Rebalance Fee actor
g Pre-defined Decrement Factor
$\omega_p$ Old target weight of the parent company
$\omega_s$ Old target weight of the spin-off company Index Calculation This section details the general calculation methodology for Solactive Indices, elaborating on the index types and the calculation formulas applied for the different cash reinvestment approaches. An overview of the rounding, settlement conventions and index adjustment rules used by Solactive for index calculation as well as the index data distribution process is also provided.

Index Types

Based on the client's objective and in line with industry standards, Solactive offers equity index calculation in Price Return, Gross Total Return, Net Total Return and Adjusted Return versions.

A Price Return Index reflects the market price movements of the Index Components, disregarding any payments made in respect of the Index Components, such as ordinary Cash Dividends whereas Special Cash Dividends are reinvested. A Price Return Index aims to reflect the price performance of a specific market, or a particular segment.

A Net Total Return Index seeks to replicate the overall return from holding a portfolio consisting of the Index Components. In order to achieve this aim, a Net Total Return Index considers payments, such as dividends, after the deduction of any withholding tax or other amounts an investor holding the Index Components would typically be exposed to.

A Gross Total Return Index seeks to replicate the overall return from holding a portfolio consisting of the Index Components. In order to achieve this aim, a Gross Total Return Index considers payments made in respect of the Index Components, such as dividends, without the deduction of any withholding tax or other amounts an investor holding the Index Components would typically be exposed to.

An Adjusted Return Index is an index which has a pre-defined Decrement deducted in either absolute or percentage terms at a predefined frequency.

Example Calculation Formula

With respect of dividend reinvestment logic, Solactive follows different index calculation methodologies. Based on whether the dividend reinvestment affects only the dividend paying stock or the entire portfolio of Index, Solactive Indices can be calculated with any of various formulas outlined in the Equity Index Methodology.

Example Standard Index

The index level is the sum overall Index Components of the products of the Fraction of Shares of the Index Component and the price of the Index Component at the respective Exchange. If the currency of an Index Component is different from the currency in which the Index is calculated, the foreign exchange rate is used to convert the price into the currency in which the Index is calculated.

$$\text{Index}_t = \sum_{i=1}^{n} x_{i,t} * p_{i,t} * f_{i,t}$$

Dividend payments cause an adjustment in the Fraction of Shares. Due to the dividend payment, the Fraction of Shares of the dividend paying stock increases by an adjustment factor. Due to dividend reinvestment, the Fraction of Shares of other Index Components remains constant.

3. Calculation of the Index 3.1 Index Formula

The Index Value on a Business Day at the relevant time is calculated in accordance with the following formula, according to an example embodiment:

$$\text{Index}_t = \sum_{i=1}^{n} \frac{(x_{i,t} \times p_{i,t} \times f_{i,t})}{D_t}$$

With:
$x_{i,t}$=Number of Index Shares of the Index Component i on Trading Day t
$p_{i,t}$=Price of Index Component i on Trading Day t
$f_{i,t}$=Foreign exchange rate to convert the Price of Index Component i on Trading Day t into the Index Currency
$D_t$=Divisor on Trading Day t The initial Divisor on the Base Date is calculated according to the following formula, according to an example embodiment:

$$D_t = \frac{\sum_{i=1}^{n} (p_{i,t} \times f_{i,t} \times x_{i,t})}{100}$$

After the close of trading on each Rebalancing Day t the new Divisor is calculated as follows, according to an example embodiment:

$$D_{t+1} = \frac{\sum_{i=1}^{n}(p_{i,t} \times f_{i,t} \times x_{i,t+1})}{Index_t}$$

This Divisor is valid starting the immediately following Business Day, according to an example embodiment.

3.2 Accuracy

The value of the Index will be rounded to 12 decimal places, according to an example embodiment.

Trading Prices and foreign exchange rates will be rounded to 6 decimal places, according to an example embodiment.

Divisors will be rounded to 6 decimal places, according to an example embodiment.

3.3 Adjustments

Under certain circumstances, an adjustment of the Index may be necessary between two regular Rebalance Days, according to an example embodiment. Such adjustment has to be made if a corporate action (as specified in Section 5.5 below) in relation of an Index Component occurs, according to an example embodiment. Such adjustment may have to be done in relation to an Index Component and/or may also affect the number of Index Components and/or the weighting of certain Index Components, according to an example embodiment.

Solactive will announce the Index adjustment giving a notice period of at least two Trading Days (with respect to the affected Index Component) on the Solactive website under the Section "Announcements", which is available at https://www.solactive.com/news/announcements/, according to an example embodiment. The Index adjustments will be implemented on the effective day specified in the respective notice, according to an example embodiment.

3.4 Dividends and Other Distributions

Dividend payments and other distributions are included in the Index. They cause an adjustment of the Divisor, according to an example embodiment. The new Divisor is calculated as follows, according to an example embodiment:

$$D_{t+1} = D_t \times \frac{\sum_{i=1}^{n}(p_{i,t} \times f_{i,t} \times x_{i,t}) - (x_{i,t} \times y_{i,t} \times g_{i,t})}{\sum_{i=1}^{n}(p_{i,t} \times f_{i,t} \times x_{i,t})}$$

With:
$p_{i,t}$=Price of Index Component i on Trading Day t
$f_{i,t}$=Foreign exchange rate to convert the Price of Index Component i on Trading Day t into the Index Currency
$x_{i,t}$=Number of Index Shares of the Index Component i on Trading Day t
$y_{i,t}$=Distribution of Index Component/with ex date t+1 multiplied by the Dividend Correction Factor
$g_{i,t}$=Foreign exchange rate to convert the amount of the distribution of Index Component i on Trading Day t into the Index Currency
$D_t$=Divisor on Trading Day t
$D_{t+1}$=Divisor on Trading Day t+1

3.5 Corporate Actions 3.5.1 Principles

As part of the Index maintenance Solactive will consider various events—also referred to as corporate actions— which result in an adjustment to the Index between two regular Rebalance Days, according to an example embodiment. Such events have a material impact on the price, weighting or overall integrity of Index Components, according to an example embodiment. Therefore, they need to be accounted for in the calculation of the Index, according to an example embodiment. Corporate actions will be implemented from the cum-day to the ex-day of the corporate action, so that the adjustment to the Index coincides with the occurrence of the price effect of the respective corporate action, according to an example embodiment.

Adjustments to the Index to account for corporate actions are outlined in this section, according to an example embodiment. Additional corporate action events not outlined below will be made in compliance with the Equity Index Methodology (https://www.solactive com/documents/equity-index-methodology/), which is available on the Solactive website, according to an example embodiment. This document contains for each corporate action a brief definition and specifies the relevant adjustment to the Index variables, according to an example embodiment.

While Solactive aims at creating and maintaining its methodology for treatment of corporate actions as generic and transparent as possible and in line with regulatory requirements, it retains the right in accordance with the Equity Index Methodology to deviate from these standard procedures in case of any unusual or complex corporate action or if such a deviation is made to preserve the comparability and representativeness of the Index over time, according to an example embodiment.

3.5.2 Share Splits

In the case of share splits with ex date on Trading Day t+1, it is assumed that the prices change in ratio of the terms of the split, according to an example embodiment. The new Number of Index Shares is calculated as follows, according to an example embodiment:

$$x_{i,t+1} = x_{i,t} \times B$$

With:
$x_{i,t+1}$=Number of Index Shares of the affected Index Component on Trading Day t+1
$x_{i,t}$=Number of Index Shares of the affected Index Component on Trading Day t
B=Shares after the share split for every share held before the split 3.5.3 Stock Distributions In the case of stock distributions with ex date on Trading Day t+1 it is assumed that the prices change according to the terms of the distribution, according to an example embodiment. The new Number of Index Shares is calculated as follows, according to an example embodiment:

$$x_{i,t+1} = x_{i,t} \times (1+B)$$

With:
$x_{i,t+1}$=Number of Index Shares of the affected Index Component on Trading Day t+1
$x_{i,t}$=Number of Index Shares of the affected Index Component on Trading Day t
B=Shares received for every share held 3.5.4 Spin-Off A spun-off company is eligible for inclusion if its security line is traded on an exchange of any country that is currently in the index, (for example, in a Developed Index, a spin-off of a UK company that is traded on a US exchange would be eligible for the index), according to an example embodiment. The spunoff company is added, the market will adjust the price of the parent company such that the sum of the parent and spun-off company's weight is approximately equal to the weight of the parent prior to spin-off, according to an example embodiment. Based on the transaction terms on the ex-date, the shares of the spun-off company is calculated as follows, according to an example embodiment:

$$\text{Shares of Spun-Off Company} = \text{Shares of Parent Company} * \text{Transaction Terms}$$

The parent company and spun-off company will remain in the Index with unchanged calculation parameters, according to an example embodiment.

The spun-off company will be added to the Index file with a price of zero prior to the exdate, according to an example embodiment. If the spun-off company does not start to trade on the ex-date, a theoretical price for the spun-off company will be implemented as a fixed price until it commences trading, from which time official prices will be used, according to an example embodiment. The price of the spun-off company is calculated as follows, according to an example embodiment:

$$\text{Price of Spun-off Company} = [(\text{Close Price Parent Company Prior to Ex-Date}) - (\text{Open Price Parent Company on Ex-Date})] * \text{Transaction Terms}$$

If the first trading day of the spun-off company is unknown on the ordinary rebalancing date, the spun-off company will be removed from the Index with a price of zero, according to an example embodiment.

In case the spun-off company is already an index constituent, the additional shares demerged from the parent company will be added to the spun-off company (share increase of the index member) on the ex-date, according to an example embodiment.

If a spun-off company is not eligible (for example, the spun-off company is traded OTC or on an ineligible country's exchange), that company's shares are not added to the Index but instead, the weight of the spun-off company is redistributed as a special cash distribution on the ex-date, according to an example embodiment.

3.5.5 Mergers and Acquisitions

In case of an Index Component subject to mergers and acquisitions, the acquired entity will be removed from the Index on the ex-date, according to an example embodiment. The Index is subject to further adjustments in accordance with the following cases, according to an example embodiment:

1. Merger or Acquisition of an Index Component with/by another Index Component, according to an example embodiment.
    Cash Terms: The weight of the target company based on its last close price will be distributed pro-rata across the remaining Index Components, according to an example embodiment.
    Stock Terms: The shares of the acquiring/surviving company will be increased according to the stock terms, according to an example embodiment.
    Cash and Stock Terms: The cash portion will be reinvested pro-rata across the remaining Index Components, according to an example embodiment. The shares of the acquiring/surviving company will be increased according to the stock terms, according to an example embodiment.

2. Merger or Acquisition of an Index Component with/by a non-Index Component, according to an example embodiment.
    Cash Terms: The weight of the target company based on its last close price will be distributed pro-rata across the remaining Index Components, according to an example embodiment.
    Stock Terms: The weight of the target company based on its last close price will be distributed pro-rata across the remaining Index Components, according to an example embodiment.
    Cash and Stock Terms: The weight of the target company based on its last close price will be distributed pro-rata across the remaining Index Components, according to an example embodiment.

3.6 Calculation of the Index in the Event of a Market Disruption 3.6.1 Recalculation Solactive makes the greatest possible efforts to accurately calculate and maintain the indices, according to an example embodiment. However, errors in the determination process may occur from time to time for variety reasons (internal or external) and therefore, cannot be completely ruled out, according to an example embodiment. Solactive endeavors to correct all errors that have been identified within a reasonable period of time, according to an example embodiment. The understanding of "a reasonable period of time" as well as the general measures to be taken are generally depending on the underlying and is specified in the Correction Policy (https://www.solactive.com/documents/correction-policy/), according to an example embodiment.

3.6.2 Changes in Calculation Method

The application by the Benchmark Administrator of the method described in this document is final and binding, according to an example embodiment. The Benchmark Administrator shall apply the method described above for the composition and calculation of the Index, according to an example embodiment. However, it cannot be excluded that the market environment, supervisory, legal and financial or tax reasons may require changes to be made to this method, according to an example embodiment. The Benchmark Administrator may also make changes to the terms and conditions of the Index and the method applied to calculate the Index that it deems to be necessary and desirable in order to prevent obvious or demonstrable error or to remedy, correct or supplement incorrect terms and conditions, according to an example embodiment. The Benchmark Administrator is not obliged to provide information on any such modifications or changes, according to an example embodiment. Despite the modifications and changes, the Benchmark Administrator will take the appropriate steps to ensure a calculation method is applied that is consistent with the method described above, according to an example embodiment.

3.6.3 Termination

Solactive makes the greatest possible efforts to ensure the resilience and continued integrity of the indices over time, according to an example embodiment. Where necessary, Solactive follows a clearly defined and transparent procedure to adapt Index methodologies to changing underlying markets in order to maintain continued reliability and comparability of the indices, according to an example embodiment. The methodology of the Index Series is subject to regular review, at least annually, according to an example embodiment. In case a need of a change of the methodology has been identified within such review (e.g. if the underlying market or economic reality has changed since the launch of the Index Series, i.e. if the present methodology is based on obsolete assumptions and factors and no longer reflects the reality as accurately, reliably and appropriately as before), such change will be made in accordance with the Solactive Methodology Policy, which is incorporated by reference and available on the Solactive website: Methodology Policy (https://www.solactive.com/documents/methodology-policy/), according to an example embodiment.

Such change in the methodology will be announced on the Solactive website under the Section "Announcement", which is available at, according to an example embodiment https://www.solactive.com/news/announcements/. The date of the last amendment of this Index Series is contained in this guideline, according to an example embodiment.

Nevertheless, if no other options are available the orderly cessation of the Index may be indicated, according to an example embodiment. This is usually the case when the underlying market or economic reality, which an index is set to measure or to reflect, changes substantially and in a way not foreseeable at the time of inception of the index, the index rules, and particularly the selection criteria, can no longer be applied coherently or the index is no longer used as the underlying value for financial instruments, investment funds and financial contracts, according to an example embodiment. Solactive has established and maintains clear guidelines on how to identify situations in which the cessation of an index is unavoidable, how stakeholders are to be informed and consulted and the procedures to be followed for a termination or the transition to an alternative index, according to an example embodiment. Details, according to an example embodiment, are specified in the Solactive Termination Policy (https://www.solactive.com/documents/termination-policy/).

3.6.4 Market Disruption

In periods of market stress Solactive calculates the indices following predefined and exhaustive arrangements as described in the Disruption Policy (https://www.solactive.com/documents/disruption-policy/), according to an example embodiment. Such market stress can arise due to a variety of reasons, but generally results in inaccurate or delayed prices for one or more Index Components, according to an example embodiment. The determination of the Index may be limited or impaired at times of illiquid or fragmented markets and market stress, according to an example embodiment.

4. Definitions

"Index Universe" in respect of a Selection Day are companies that fulfill the criteria in Section 2, Construction Methodology, according to an example embodiment.

"Index Component" is each share currently included in an Index, according to an example embodiment.

"Number of Shares" is in respect of an Index Component and any given Business Day the number or fraction of shares included in the Index, according to an example embodiment. It is calculated for any Index Component as the ratio of (A) the Percentage Weight of an Index Component multiplied by the Index value and the Divisor, and (B) its Trading Price (converted into the index currency according to the principles laid out in this document), according to an example embodiment.

"Percentage Weight" of an Index Component is the ratio of its Trading Price multiplied by its Number of Shares divided by the Index value, according to an example embodiment.

"Dividend Correction Factor" is calculated as 1 minus the applicable withholding tax rate and/or other applicable tax rate currently prevalent in the respective country, according to an example embodiment.

In particular an "Extraordinary Event" is, according to an example embodiment,
a merger
a takeover bid
a delisting
the nationalization of a company
insolvency.

The Trading Price for this Index Component, according to an example embodiment, on the day the event came into effect is the last available market price for this Index Component quoted on the Exchange on the day the event came into effect (or, if a market price is not available for the day the event came into effect, the last available market price quoted on the Exchange on a day specified as appropriate by the Index Calculator), as determined by the Index Calculator, and this price is used as the Trading Price of the particular Index Component until the end of the day on which the composition of the Index is next set, according to an example embodiment.

In the event of the insolvency of an issuer of an Index Component the Index Component shall remain in the Index until the next Rebalancing Day, according to an example embodiment. As long as a market price for the affected Index Component is available on a Business Day, this shall be applied as the Trading Price for this Index Component on the relevant Business Day, as determined in each case by the Index Calculator, according to an example embodiment. If a market price is not available on a Business Day the Trading Price for this Index Component is set to zero, according to an example embodiment. The Committee may also decide to eliminate the respective Index Component at an earlier point in time prior to the next Rebalancing Day, according to an example embodiment. The procedure in this case is identical to an elimination due to and Extraordinary Event, according to an example embodiment.

An Index Component is "delisted" if the Exchange announces pursuant to the Exchange regulations that the listing of, the trading in or the issuing of public quotes on the Index Component at the Exchange has ceased immediately or will cease at a later date, for whatever reason (provided delisting is not because of a Merger or a Takeover bid), and the Index Component is not immediately listed, traded or quoted again on an exchange, trading, or listing system, acceptable to the Index Calculator, according to an example embodiment.

"Insolvency" occurs with regard to an Index Component if (A) all shares of the respective issuer must be transferred to a trustee, liquidator, insolvency administrator, or a similar public officer as result of a voluntary or compulsory liquidation, insolvency or winding-up proceedings, or comparable proceedings affecting the issuer of the Index Components, or (B) the holders of the shares of this issuer are legally enjoined from transferring the shares, according to an example embodiment.

A "Takeover Bid" is a bid to acquire, an exchange offer or any other offer or act of a legal person that results in the related legal person acquiring as part of an exchange or otherwise more than 10% and less than 100% of the voting shares in circulation from the issuer of the Index Component or the right to acquire these shares, as determined by the Index Calculator based on notices submitted to public or self-regulatory authorities or other information considered by the Index Calculator to be relevant, according to an example embodiment.

With regard to an Index Component a "Merger" is, according to an example embodiment
1. a change in the security class or a conversion of this share class that results in a transfer or an ultimate definite obligation to transfer all the shares in circulation to another legal person, according to an example embodiment;
2. a merger (either by acquisition or through forming a new structure) or a binding obligation on the part of the issuer to exchange shares with another legal person (except in a merger or share exchange under which the issuer of this Index Component is the acquiring or remaining company and which does not involve a change in security class or a conversion of all the shares in circulation), according to an example embodiment;

3. a takeover offer, exchange offer, other offer or another act of a legal person for the purposes of acquiring or otherwise obtaining from the issuer 100% of the shares issued that entails a transfer or the irrevocable obligation to transfer all shares (with the exception of shares which are held and controlled by the legal person), according to an example embodiment; or 4. a merger (either by acquisition or through forming a new structure) or a binding obligation on the part of the issuer of the share or its subsidiaries to exchange shares with another legal person, whereby the issuer of the share is the acquiring or remaining company and it does not involve a change in the class or a conversion of the all shares issued, but the shares in circulation directly prior to such an event (except for shares held and controlled by the legal person) represent in total less than 50% of the shares in circulation directly subsequent to such an event, according to an example embodiment.

The "Merger Date" is the date on which a Merger is concluded or the date specified by the Index Calculator if such a date cannot be determined under the law applicable to the Merger, according to an example embodiment.

"Nationalisation" is a process whereby all shares or the majority of the assets of the issuer of the shares are nationalised or are expropriated or otherwise must be transferred to public bodies, authorities, or institutions, according to an example embodiment.

"Exchange" is, in respect of Index and every Index Component, the respective primary exchange where the Index Component has its primary listing. The Committee may decide to declare a different stock exchange the "Exchange" for trading reasons, even if the company is only listed there via a Stock Substitute, according to an example embodiment.

"Stock Substitute" includes in particular American Depository Receipts (ADR) and Global Depository Receipts (GDR), according to an example embodiment. With regard to an Index component (subject to the provisions given above under "Extraordinary Events") the "Trading Price" in respect of a Trading Day is the closing price on this Trading Day determined in accordance with the Exchange regulations, according to an example embodiment. If the Exchange has no closing price for an Index Component, the Index Calculator shall determine the Trading Price and the time of the quote for the share in question in a manner that appears reasonable to him, according to an example embodiment.

A "Trading Day" is in relation to the Index or an Index Component a Trading Day on the Exchange (or a day that would have been such a day if a market disruption had not occurred), excluding days on which trading may be ceased prior to the normal Exchange closing time, according to an example embodiment. The Index Calculator is ultimately responsible as to whether a certain day is a Trading Day with regard to the Index or an Index Component or in any other connection relating to this document, according to an example embodiment.

The "Closing Price" in respect of an Index Component and a Trading Day is a security's final regular hours Trading Price published by the Exchange and determined in accordance with the Exchange regulations, according to an example embodiment. If the Exchange has no or has not published a Closing Price in accordance with the Exchange rules for an Index Component, the last Trading Price will be used, according to an example embodiment.

A "Business Day" is defined as Monday through Friday, including holidays, according to an example embodiment.

The "Index Calculator" is Solactive AG or any other appropriately appointed successor in this function, according to an example embodiment.

The "Benchmark Administrator" is Solactive AG or any other appropriately appointed successor in this function, according to an example embodiment. The "Index Currency" is defined in Section 5.1. "Market Capitalization" is with regard to each of the shares in the Index Universe on a Selection Day or Rebalancing Day the value published as the Market Capitalization for this day, according to an example embodiment. As at the date of this document Market Capitalization is defined as the value of a company calculated by multiplying the number of shares outstanding of the company by its share price, according to an example embodiment.

"Rebalancing Day" is provided by the Index Sponsor (see Section 2, Construction Methodology), according to an example embodiment.

"Selection Day" is the second Friday of February, May, August, and November where the Index Sponsor provides the new constituents and weights of the Index (see Construction Methodology), according to an example embodiment.

"Index Sponsor" is RAFI Indices, LLC, according to an example embodiment.

An "Affiliated Exchange" is with regard to an Index Component an exchange, a trading or quotation system on which options and futures contracts on the Index Component in question are traded, as specified by the Index Calculator, according to an example embodiment.

A "Market Disruption Event" occurs if, according to an example embodiment 1. one of the following events occurs or exists on a Trading Day prior to the opening quotation time for an Index Component, according to an example embodiment:
    a. Trading is suspended or restricted (due to price movements that exceed the limits allowed by the Exchange or an Affiliated Exchange, or for other reasons):
        i. across the whole Exchange, according to an example embodiment; or
        ii. in options or futures contracts on or with regard to an Index Component or an Index Component that is quoted on an Affiliated Exchange, according to an example embodiment; or
        iii. on an Exchange or in a trading or quotation system (as determined by the Index Calculator) in which an Index Component is listed or quoted, according to an example embodiment; or
    b. An event that (in the assessment of the Index Calculator) generally disrupts and affects the opportunities of market participants to execute on the Exchange transactions in respect of a share included in the Index or to determine market values for a share included in the Index or to execute on an Affiliated Exchange transaction with regard to options and futures contracts on these shares or to determine market values for such options or futures contracts, according to an example embodiment; or 2. trading on the Exchange or an Affiliated Exchange is ceased prior to the usual closing time (as defined below), according to an example embodiment, unless the early cessation of trading is announced by the Exchange or Affiliated Exchange on this Trading Day at least one hour before
   a. the actual closing time for normal trading on the Exchange or Affiliated Exchange on the Trading Day in question or, if earlier, according to an example embodiment.
   b. the closing time (if given) of the Exchange or Affiliated Exchange for the execution of orders at the time the quote is given. "Normal exchange closing time" is the time at which the Exchange or an Affiliated Exchange is normally closed on working days without taking into account after-hours trading or other trading activities carried out outside the normal trading hours; or a general moratorium is imposed on banking transactions in the country in which the Exchange is resident if the above-mentioned events are material in the assessment of the Index Calculator, whereby the Index Calculator makes its decision based on those circumstances that he considers reasonable and appropriate, according to an example embodiment.

INDEX STRATEGIES—Research Affiliates™ Cap-Weighted Index Series

The Research Affiliates Cap-Weighted Index strategy offers investors a thoughtful cap-weighted index construction.

The Research Affiliates Cap-Weighted Index strategy selects companies using the Fundamental Index™ approach and weights them by market capitalization. The strategy takes a contrarian tilt by avoiding overpriced companies with small fundamentals and large market capitalization.

Evidence suggests that anchoring the selection of companies by fundamental measures of firm size and weighting them by market capitalization should consistently outperform a cap-weighted benchmark. This strategy aims to deliver excess returns in a manner that results in minimal tracking error while retaining benefits associated with the Fundamental Index approach, such as transparency and low cost.

Thoughtfully Designed to Deliver for Investors

The Research Affiliates Cap-Weighted Index Series (RACWI)
   a. Selects stocks by fundamental size measures.
      i. The index strategy anchors the selection of companies to fundamental measures of firm size, namely, adjusted sales, adjusted cash flow, dividends plus buybacks, and book value plus intangibles.
   b. Displays minimal tracking error.
      i. The strategy seeks to deliver consistent outperformance in a way that results in minimal tracking-error levels.
   c. Includes thoughtful design and implementation.
      i. The index strategy is transparent and low cost and offers a slight reduction in turnover compared to a cap-weighted index. Each of these characteristics is designed to benefit investors.

RAFI™ Global Equity Investable Universe: Methodology

Introduction

The RAFI Global Equity Investable Universe (GEIU) is the starting point for all index strategies available through RAFI Indices.

Data Source

The data source for the GEIU is derived from Bloomberg Back Office.

Eligible Exchanges and Equity Security Types

The eligible exchanges for developed and emerging markets are shown in Appendix A: Eligible Exchanges. Eligible securities consist of all common equity securities traded on primary eligible exchanges, and preferred shares in countries where preferred shares are economically equivalent to common, issued by companies that are assigned to countries classified by RAFI Indices as developed and emerging markets.

TABLE 1

Eligible Developed and Emerging Market Countries

| DEVELOPED MARKETS* | | | EMERGING MARKETS* | | |
| --- | --- | --- | --- | --- | --- |
| Americas | Europe | Asia | Latin America | EMEA | Asia |
| Canada | Austria | Australia | Brazil | Czech Rep | China |
| United States | Belgium | Hong Kong | Chile | Egypt | India |
| | Denmark | Japan | Colombia | Greece | Indonesia |
| | Finland | New Zealand | Mexico | Hungary | South Korea |
| | France | Singapore | Peru | Kuwait | Malaysia |
| | Germany | | | Poland | Philippines |
| | Ireland | | | Qatar | Taiwan |
| | Italy | | | Saudi Arabia | Thatland |
| | Netherlands | | | South Africa | |
| | Norway | | | Turkey | |
| | Portugal | | | UAE | |
| | Spain | | | | |
| | Sweden | | | | |
| | Switzerland | | | | |
| | United Kingdom | | | | |

*As of March 2022, there are 23 developed market countries and 24 emerging market countries eligible for inclusion.

Country Assignment

RAFI assigns companies to countries and promulgates that assignment to securities. The country assignments are based on country of primary listing, domicile, and incorporation. If a company's primary listing is on a stock exchange in the same country as the company is domiciled and incorporated, then the company is assigned to that country. If the country of domicile is different from the country of incorporation and the primary listing is in the country of domicile, then the company is assigned to the country of primary listing and domicile. If the country of primary listing is different from the country of domicile and the country of primary listing is in the country of incorporation, then the company is assigned to the country of primary listing and incorporation. If the country of domicile is the same as the country of incorporation, but is different from the country of primary listing, then the company is assigned to the country of domicile and incorporation. If the country of primary listing, domicile, and incorporation all differ, and for exceptions to these rules, country assignment is based on other factors including domicile of parent company, management location, source of sales, trading volume, and reporting currency.

Eligible Investible Equity Securities

Securities and companies are eligible to be included in the GEIU by meeting certain criteria defined below:

1. An initial investibility screen is applied to remove companies with zero volume, zero shares outstanding, and zero price.

2. Eligible companies must meet the required minimum market capitalization in order to be included in the universe. For the purpose of determining a company's market capitalization, all security lines for that company are aggregated. Minimum market capitalization rules are as follows:
   a. Minimum Cumulative Weight-Within each country defined in Table 1, companies are sorted in descending order by unadjusted market capitalization. For each company, a free float-adjusted market capitalization weight is then calculated. Companies with cumulative free float-adjusted market capitalization weight greater than 99% are excluded from the starting universe.

b. Minimum Unadjusted Market Capitalization-A minimum unadjusted market capitalization range is defined by RAFI Indices for developed and emerging markets. The range will ensure the size of the smallest companies are comparable among countries in developed and emerging markets.

c. Minimum Adjusted Market Capitalization Companies with adjusted market capitalization that is less than 50% of the unadjusted market capitalization of the smallest company within its country that passes the minimum unadjusted market capitalization threshold defined in Section 2.b are excluded from the universe.

3. Liquidity Threshold—To be eligible in the universe, a company must meet the liquidity screen as defined below:

Company Daily Volume/Adjusted Company Market Capitalization >=0.05%

Where company Daily Volume is the maximum of the 30-day and 90-day median daily traded value in USD and company daily volume must be greater than or equal to $100,000 USD RAFI Weights for Each Company Company weights are calculated using the Fundamental Index™ methodology. This process breaks the price-size link and instead weights companies by four fundamental measures of company size:

1. Adjusted Sales—Company Sales multiplied by company equity to assets ratio averaged over the past five years.

2. Adjusted Cash Flowα-Company operating cash flow averaged over the past five years plus company R&D expenses averaged over the past five years.

3. Dividends+Buybacks—Dividends paid and share buybacks averaged over the past five years.

4. Book Value+Intangibles—Most recent company book value plus research capital, with research capital defined as the accumulation of R&D expenses over the past six years.

An aggregate fundamental weight is calculated for each company by averaging the normalized accounting measures for each of the four accounting measures. This is the fundamental weight of the company.

Region & Size Classification

Within each country listed in Table 1, eligible companies are sorted in descending order by unadjusted RAFI weights. Companies are classified as large, mid, small and micro depending on their rankings as outlined in Table 2. In order to reduce turnover from companies moving back and forth between size classifications each year, a banding approach is also applied to companies in order to move from one size classification to another. For example if a company became eligible for the GEIU in year t and ranked in the top 68% of cumulative fundamental weight within its assigned country, it would be classified as large company. If in year t+1 that company ranked in the top 68.5% by cumulative fundamental weight, it would continue to be classified as large company in year t+1. If in year t+2 it ranked in the top 69.5% by cumulative fundamental weight, it would then be reclassified as mid company in year t+2.

TABLE 2

Size Classification and Size Bands

| Size Classification | Cumulative Fundamental Weight Rank | Size Band |
|---|---|---|
| Large Company | 0%-68% | +1% (69%) |
| Mid Company | 68%-88% | -/+1% (67%-87%) |
| Small Company | 86%-98% | -1%/+0.5% (65%-88.5%) |
| Micro | 98%-100% | -0.5% (97.5%) |

Companies are then assigned to region/size buckets according to country and size classification. Table 3 outlines the region assignment for each country. The total global large/mid universe is the union of all companies classified as large and mid company in each of the six regions. The global small universe is the union of all companies classified as small company in each of the six regions.

TABLE 3

Region Classification

| United States | Japan | United Kingdom | Europe, ex UK Developed | Other Developed Markets | Emerging Markets |
|---|---|---|---|---|---|
| US | Japan | UK | Austria Belgium Denmark | Australia Canada Asia Pacific | Brazil China India |
| | | | Finland France Germany Ireland | Israel Hong Kong New Zealand Singapore | South Africa South Korea Taiwan Americas |
| | | | Italy Netherlands Norway Portugal Spain | | Chile Colombia Mexico Peru EMEA |
| | | | Sweden Switzerland | | Czech Republic Egypt Greece Hungary Kuwait Poland Qatar Saudi Arabia Turkey UAE Asia Pacific |
| | | | | | Indonesia Malaysia Philippines Thailand |

As of March 2022, there are 23 developed market countries and 24 emerging market countries eligible for inclusion.

RAFI Global Equity Investable Universe as of March 2022

Table 4 outlines the number of companies within each region/size classification.

TABLE 4

Region/Size Classification

| Region | Large Company | Mid Company | Small Company | Micro | Total |
|---|---|---|---|---|---|
| Developed Europe ex UK | 141 | 198 | 471 | 408 | 1,218 |
| Other Developed | 141 | 177 | 377 | 388 | 1,063 |

TABLE 4-continued

Region/Size Classification

| Region | Large Company | Mid Company | Small Company | Micro | Total |
|---|---|---|---|---|---|
| Emerging Markets | 458 | 724 | 1,829 | 1,345 | 4,356 |
| Japan | 146 | 228 | 460 | 274 | 1,108 |
| United Kingdom | 25 | 49 | 157 | 162 | 393 |
| United States | 175 | 310 | 833 | 846 | 2,164 |
| Total | 1,086 | 1,686 | 4,127 | 3,403 | 10,302 |

APPENDIX A

Eligible Exchanges

| ISO Country Code | MIC | Exchange Name | Country | Developed/ Emerging |
|---|---|---|---|---|
| AU | XASX | Australian Securities Exchange | Australia | Developed |
| AT | XWBO | Wiener Borse | Austria | Developed |
| BE | XBRU | Euronext Brussels | Belgium | Developed |
| CA | XTSE | Toronto Stock Exchange | Canada | Developed |
| DK | XCSE | Copenhagen Stock Exchange | Denmark | Developed |
| FI | XHEL | Helsinki Stock Exchange | Finland | Developed |
| FR | XPAR | Euronext Paris/ European Stock Exchange | France | Developed |
| DE | XETR | XETRA | Germany | Developed |
| HK | XHKG | Hong Kong Exchanges and Clearing | Hong Kong | Developed |
| HK | SHSC | Shanghai-Hong Kong Stock Connect | Hong Kong | Developed |
| HK | SZSC | Shenzhen-Hong Kong Stock Connect | Hong Kong | Developed |
| IE | XDUB | Irish Stock Exchange | Ireland | Developed |
| IL | XTAE | Tel-Aviv Stock Exchange | Israel | Developed |
| IT | MTAA | ELECTRONIC SHARE MARKET | Italy | Developed |
| JP | XJAS | Tokyo Stock Exchange JASDAQ | Japan | Developed |
| JP | XTKS | Tokyo Stock Exchange | Japan | Developed |
| JP | XOSE | OSAKA EXCHANGE | Japan | Developed |
| LU | XLUX | Luxembourg Stock Exchange | Luxembourg | Developed |
| NL | XAMS | Euronext Amsterdam | Netherlands | Developed |
| NZ | XNZE | NZX Limited/New Zealand Exchange | New Zealand | Developed |
| NO | XOSL | Oslo Stock Exchange/ Oslo Bors | Norway | Developed |
| PT | XLIS | Euronext Lisbon | Portugal | Developed |
| SG | XSES | Singapore Exchange | Singapore | Developed |
| ES | XMAD | BOLSA DE MADRID | Spain | Developed |
| SE | XSTO | NASDAQ OMX/ Stockholm Stock Exchange | Sweden | Developed |
| CH | XSWX | SIX Swiss Exchange | Switzerland | Developed |
| GB | XLON | London Stock Exchange | United Kingdom | Developed |
| US | XNYS | NYSE | United States | Developed |
| US | XASE | NYSE MKT LLC | United States | Developed |
| US | XNCM | NASDAQ CAPITAL MARKET | United States | Developed |
| US | XNGS | NASDAQ/NGS (GLOBAL SELECT MARKET) | United States | Developed |
| US | XNMS | NASDAQ/NMS (GLOBAL MARKET) | United States | Developed |
| BR | BVMF | BM&F BOVESPA | Brazil | Emerging |
| CL | XSGO | Bolsa de Comercio de Santiago | Chile | Emerging |
| CN | XSHE | Shenzhen Stock Exchange | China | Emerging |
| CN | XSHG | Shanghai Stock Exchange | China | Emerging |
| CN | XSEC | Shenzhen Stock Exchange-Hong Kong Connect | China | Emerging |
| CN | XSSC | Shanghai Stock Exchange-Hong Kong Connect | China | Emerging |
| CO | XBOG | Bolsa de Valores de Colombia | Colombia | Emerging |
| CZ | XPRA | PRAGUE STOCK EXCHANGE | Czech Republic | Emerging |
| EG | XCAI | Egyptian Exchange | Egypt | Emerging |
| GR | XATH | Athens Exchange SA-Cash Market | Greece | Emerging |
| HU | XBUD | Budapest Stock Exchange | Hungary | Emerging |
| IN | XNSE | National Stock Exchange of India | India | Emerging |
| IN | XBOM | BSE India Limited/ Bombay Stock Exchange | India | Emerging |
| ID | XIDX | Indonesia Stock Exchange | Indonesia | Emerging |
| KW | XKUW | Kuwait Stock Exchange | Kuwait | Emerging |
| MY | XKLS | Bursa Malaysia | Malaysia | Emerging |
| MX | XMEX | Bolsa Mexicana de Valores | Mexico | Emerging |
| PE | XLIM | Bolsa de Valores de Lima | Peru | Emerging |
| PH | XPHS | Philippine Stock Exchange | Philippine | Emerging |
| PL | XWAR | Warsaw Stock Exchange | Poland | Emerging |
| QA | DSMD | Qatar Stock Exchange/ Doha Securities Market | Qatar | Emerging |
| SA | XSAU | SAUDI STOCK EXCHANGE | Saudi Arabia | Emerging |
| ZA | XJSE | Johannesburg Stock Exchange (JSE) | South Africa | Emerging |
| KR | XKOS | Korea Exchange (KOSDAQ) | South Korea | Emerging |
| KR | XKRX | Korea Exchange (STOCK MARKET) | South Korea | Emerging |
| TW | XTAI | Taiwan Stock Exchange Corp | Taiwan | Emerging |
| TH | XBKK | Stock Exchange of Thailand | Thailand | Emerging |
| TR | XIST | Borsa Istanbul | Turkey | Emerging |
| AE | XDFM | Dubai Financial Market | UAE | Emerging |
| AE | XADS | Abu Dhabi Securities Exchange | UAE | Emerging |
| AE | DIFX | NASDAQ DUBAI | UAE | Emerging |

Important Information

As noted in FIG. 12, the material contained in this document is for information purposes only. This material is not intended as an offer or solicitation for the purchase or sale of any security or financial instrument, nor is it advice or a recommendation to enter into any transaction. RAFI Indices, LLC, its affiliates, agents, and each of their respective officers, directors, employees, agents, representatives and licensors (collectively "RI") does not make any warranties, express or implied, to anyone regarding the information provided herein, including, without limitation, any warranties with respect to the timeliness, sequence, accuracy, completeness, currentness, merchantability, quality or fitness for a particular purpose or any warranties as to the results to be obtained by any third-party in connection with the use of the information. Nothing contained in this material is intended to constitute legal, tax, securities or investment advice, nor an opinion regarding the appropriateness of any investment, nor a solicitation of any type. The general information contained in this material should not be acted upon without obtaining specific legal, tax and investment advice from a licensed professional. Investors should be aware of the risks associated with data sources and quantitative processes used to create the content contained herein or the investment management process. Errors may exist in data acquired from third party vendors, the construction or coding of indices or model portfolios, and the construction of the spreadsheets, results or information provided. RI takes reasonable steps to eliminate or mitigate errors, and to identify data and process errors so as to minimize the potential impact of such errors, however RI cannot guarantee that such errors will not occur. Use of this material is conditioned upon, and evidence of, the user's full release of RI from any liability or responsibility for any loss or damage, direct, indirect or consequential, arising from or related to (i) any inaccuracy or incompleteness in, errors or omissions in the information or (ii) any decision made or action taken by any third party in reliance upon this information. RI shall not be liable to anyone for loss of business revenues, lost profits or any indirect, consequential, special or similar damages whatsoever, whether in contract, tort or otherwise, even if advised of the possibility of such damages. Certain performance information presented represents simulated performance or performance based on combined simulated index data (pre-index launch) and live index data (post-index launch). Hypothetical investor accounts depicted are not representative of actual client accounts. Indexes are unmanaged and cannot be invested in directly. Past simulated performance is no guarantee of future performance and does not represent actual performance of an investment product based on an index. No allowance has been made for trading costs, management fees, or other costs associated with asset management, as the information provided relates only to the index itself. Actual investment results will differ. As such, the simulated data may have under- or over-compensated for the impact, if any, of certain market factors. Simulated returns may not reflect the impact that material economic and market factors might have had on the advisor's decision making if the advisor were actually managing clients' money. Simulated data is subject to the fact that it is designed with the benefit of hindsight. Simulated returns carry the risk that actual performance is not as depicted is not due to inaccurate predictive modeling. Simulated returns cannot predict how an investment strategy will perform in the future. Simulated returns should not be considered indicative of the skill of the advisor. Investors may experience loss of all or some of their investment. Any applicable financial instruments are not sponsored, promoted, sold or supported in any other manner by RAFI Indices, LLC or Solactive AG nor does RAFI Indices, LLC or Solactive AG offer any express or implicit guarantee or assurance either with regard to the results of using the Index and/or Index trade mark or the Index Price at any time or in any other respect. The Index is calculated and published by RAFI Indices, LLC and Solactive AG. RAFI Indices, LLC and Solactive AG use their best efforts to ensure that the Index is calculated correctly. Irrespective of their obligations towards Licensee, neither RAFI Indices, LLC nor Solactive AG has any obligation to point out errors in the Index to third parties including but not limited to Licensee, investors and/or financial intermediaries of the financial instrument. Neither publication of the Index nor the licensing of the Index or Index trade mark for the purpose of use in connection with the financial instrument constitutes a recommendation by RAFI Indices, LLC or Solactive AG to invest capital in said financial instrument nor does it in any way represent an assurance or opinion of RAFI Indices, LLC or Solactive AG with regard to any investment in the financial instrument. The trademarks Fundamental Index™, RAFI™, Research Affiliates Equity™, RAE™ and the Research Affiliates™ trademark and corporate name and all related logos are the exclusive intellectual property of Research Affiliates, LLC and in some cases are registered trademarks in the U.S. and other countries. Various features of the Fundamental Index™ methodology, including an accounting data-based noncapitalization data processing system and method for creating and weighting an index of securities, are protected by various patents, and patent-pending intellectual property of Research Affiliates, LLC. (See all applicable US Patents, Patent Publications, Patent Pending intellectual property and protected trademarks located at https://www.researchaffiliates.com/en_us/about-us/legal.html, which are fully incorporated herein.) Any use of these trademarks, logos, patented or patent pending methodologies without the prior written permission of Research Affiliates, LLC, is expressly prohibited. Research Affiliates, LLC, reserves the right to take any and all necessary action to preserve all of its rights, title, and interest in and to these marks, patents or pending patents. RAFI Indices, LLC is a wholly owned subsidiary of Research Affiliates Global Holdings, LLC and does not offer or provide investment advice or offer or sell any securities, commodities or derivative instruments or products. Any such business may only be conducted through registered or licensed entities and individuals permitted to do so within the respective jurisdiction and only in conjunction with the legally required disclosure documents and subject to all legally required regulatory filings. ©2022 RAFI Indices, LLC. All rights reserved. Duplication or dissemination prohibited without prior written permission According to one exemplary embodiment, a computer data processing system of one or more processors may execute a statistical processing application that may perform an index calculation and selection and weighting application based on, e.g., returns data, market capitalization data, selection criteria data, weighting criteria data, and an asset class universe. An exemplary system may use a statistical computation engine such as, e.g., but not limited to, SAS available from SAS Institute of Cary, NC. According one exemplary embodiment, a computationally intensive matrix algebra system may electronically compute eigenvectors to computationally select and weight data electronically to obtain a novel and nonobvious index of electronically selected list of constituents and associated electronically computed weightings of each constituent of the selected list of constituents.

Example embodiments of the claimed invention may include various electronically implemented improvements including index and/or portfolio data configured to be encrypted and decrypted for storage, and/or transmission via an example network, which may include use of various encryption algorithms disclosed herein, and exchange of one or more trusted encryption keys to ensure trusted transmission which may be performed via a secure connection such as, e.g., but not limited to, a secure socket layer connection, and or one or more trusted computers and/or key exchange algorithms.

Advantageously, data may be stored using at least one relational database, which may be queried using an SQL query language, and/or at least one graph database, which may be queried by graph traversal, using, e.g., a NoSQL graph database, and/or the like.

An enhanced graphical user interface, which may provide an interactive interface with a number of GUI elements to enable an index construction client application to enable a user to interact to customize example index construction specification criterion, rules, and/or various enhanced analysis and customizations to the index constituent and weighting data, and investable portfolio data, according to various example embodiments.

Exemplary Computer System Embodiments

FIG. 5 depicts an exemplary computer system that may be used in implementing an exemplary embodiment of the present invention. Specifically, FIG. 5 depicts an exemplary embodiment of a computer system 500 that may be used in computing devices such as, e.g., but not limited to, a client and/or a server, etc., according to an exemplary embodiment of the present invention. FIG. 5 depicts an exemplary embodiment of a computer system that may be used as client device 500, or a server device 500, etc. The present invention (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 500 may be shown in FIG. 5, depicting an exemplary embodiment of a block diagram of an exemplary computer system useful for implementing the present invention. Specifically, FIG. 5 illustrates an example computer 500, which in an exemplary embodiment may be, e.g., (but not limited to) a personal computer (PC) system running an operating system such as, e.g., (but not limited to) MICROSOFT® WINDOWS® NT/98/2000/XP/CE/ME/VISTA/7/8/10/11, etc. available from MICROSOFT® Corporation of Redmond, WA, U.S.A., MacOS, iOS, or MacOS/X, etc., available from Apple Corporation of CA, U.S.A. However, the invention may not be limited to these platforms. Instead, the invention may be implemented on any appropriate computer system running any appropriate operating system. In one exemplary embodiment, the present invention may be implemented on a computer system operating as discussed herein. An exemplary computer system, computer 500 may be shown in FIG. 5. Other components of the invention, such as, e.g., (but not limited to) a computing device, a communications device, mobile phone, a telephony device, a telephone, a personal digital assistant (PDA), a personal computer (PC), a handheld PC, an interactive television (iTV), a digital video recorder (DVD), client workstations, mobile phones, smartphones, communication devices, Iphone, Ipad, Tablet, thin clients, thick clients, proxy servers, network communication servers, remote access devices, client computers, server computers, routers, web servers, data, media, audio, video, telephony or streaming technology servers, etc., may also be implemented using a computer such as that shown in FIG. 5. Services may be provided on demand using, e.g., but not limited to, an interactive television (iTV), a video on demand system (VOD), and via a digital video recorder (DVR), or other on demand viewing system.

The computer system 500 may include one or more processors, such as, e.g., but not limited to, processor(s) 504. The processor(s) 504 may be connected to a communication infrastructure 506 (e.g., but not limited to, a communications bus, cross-over bar, or network, etc.). Various exemplary software embodiments may be described in terms of this exemplary computer system. After reading this description, it may become apparent to a person skilled in the relevant art(s) how to implement the invention using other computer systems and/or architectures.

Computer system 500 may include a display interface 502 that may forward, e.g., but not limited to, graphics, text, and other data, etc., from the communication infrastructure 506 (or from a frame buffer, etc., not shown) for display on the display unit 530.

The computer system 500 may also include, e.g., but may not be limited to, a main memory 508, random access memory (RAM), and a secondary memory 510, etc. The secondary memory 510 may include, for example, (but not limited to) a hard disk drive 512 and/or a removable storage drive 514, representing a floppy diskette drive, a magnetic tape drive, an optical disk drive, a compact disk drive CD-ROM, etc. The removable storage drive 514 may, e.g., but not limited to, read from and/or write to a removable storage unit 518 in a well known manner. Removable storage unit 518, also called a program storage device or a computer program product, may represent, e.g., but not limited to, a floppy disk, magnetic tape, optical disk, compact disk, etc. which may be read from and written to by removable storage drive 514. As may be appreciated, the removable storage unit 518 may include a nontransitory computer usable storage medium having stored therein computer software and/or data. In some embodiments, a "machine-accessible medium" may refer to any storage device used for storing data accessible by a computer. Examples of a machine-accessible medium may include, e.g., but not limited to: a magnetic hard disk; a floppy disk; an optical disk, like a compact disk read-only memory (CD-ROM) or a digital versatile disk (DVD); a magnetic tape; and/or a memory chip, SDRAM, USB card device, etc.

In alternative exemplary embodiments, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 522 and interfaces 520, which may allow software and data to be transferred from the removable storage unit 522 to computer system 500.

Computer 500 may also include an input device 516 such as, e.g., (but not limited to) a mouse or other pointing device such as a digitizer, and a keyboard or other data entry device (not shown).

Computer 500 may also include output devices, such as, e.g., (but not limited to) display 530, and display interface 502. Computer 500 may include input/output (I/O) devices such as, e.g., (but not limited to) communications interface 524, cable 528 and communications path 526, etc. These devices may include, e.g., but not limited to, a network interface card, and modems (neither are labeled). Communications interface 524 may allow software and data to be transferred between computer system 500 and external devices.

Computer 500 may also advantageously include example encryption/decryption trusted system processor 530, according to an example embodiment. The processor may include its own isolated trusted subsystem, and may be used to perform any of various encryption and decryption functions, according to an example embodiment.

Exemplary embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

According to an exemplary embodiment, the application system can include an electronic decision support system (DSS) (not shown), policy based trust platform systems, which can interact, e.g., but not limited to, with computer database management system (DBMS) 107, and/or electronic interactive, graphical user interface (GUI) system. Each of the exemplary DSS, DBMS and/or EIGUI system, can then, using e.g., but not limited to, a cryptographic processor and/or a crypto chip controller processor 336, or the like, can then encrypt the data using electronic encryptor, which can make use of one or more cryptographic algorithm electronic logic, which can include encryption code, a cryptographic combiner, etc., and may be stored in encrypted form, according to an exemplary embodiment, in a computer database storage facility, from computer database storage device, and from there the process can continue with use of the cryptographic algorithm electronic logic, and electronic decryptor, which can decrypt and/or provide a process for decrypting encrypted data, and/or by providing such data to the DSS, the DBMS, or the EIGUI, if authorized. By using encryption/decryption, certain algorithms can be used, as described herein, including, e.g., but not limited to, checksum, AES encryption, RSA, PKI, TLS, FTPS, SFTP, etc. and/or other cryptographic algorithms and/or protocols, according to exemplary embodiments.

Cryptographic Functions

Cryptographic systems, according to an exemplary embodiment, can provide one or more of the following four example services. It is important to distinguish between these, as some algorithms are more suited to particular tasks, but not to others. To protect patient data, personal data can be encrypted prior to storage and can be decrypted before accessing the data, according to an exemplary embodiment. When analyzing requirements and risks, one needs to decide which of the four functions should be used to protect the proprietary data, according to an exemplary embodiment.

Authentication

Using a cryptographic system, according to an exemplary embodiment, one can establish the identity of a remote user (or system). A typical example is the SSL certificate of a web server providing proof to the user device that user device is connected to the correct server, according to an exemplary embodiment.

The identity is not of the user, but of the cryptographic key of the user. Having a less secure key lowers the trust one can place on the identity, according to an exemplary embodiment.

Non-Repudiation

The concept of non-repudiation is particularly important for financial or e-commerce applications, according to an exemplary embodiment. Often, cryptographic tools are required to prove that a unique user has made a transaction request, according to an exemplary embodiment. It must not be possible for the user to refute his or her actions, according to an exemplary embodiment.

For example, a customer can request a transfer of money from her account to be paid to another account, according to an exemplary embodiment. Later, she claims never to have made the request and demands the money be refunded to the account. If one has non-repudiation through cryptography, one can prove-usually through digitally signing the transaction request, that the user authorized the transaction.

Confidentiality

More commonly, the biggest concern can be to keep information private, according to an exemplary embodiment. Cryptographic systems, according to an exemplary embodiment, have been developed to function in this capacity. Whether it be passwords sent during a log on process, or storing confidential proprietary financial data in a database, encryption can assure that only users who have access to the appropriate key can get access to the proprietary data.

Integrity

One can use cryptography, according to an exemplary embodiment, to provide a means to ensure data is not viewed or altered during storage or transmission. Cryptographic hashes for example, can safeguard data by providing a secure checksum, according to an exemplary embodiment.

Cryptographic Algorithms

Various types of cryptographic systems exist that have different strengths and weaknesses, according to an exemplary embodiment. Typically, the exemplary cryptographic systems can be divided into two classes; 1) those that are strong, but slow to run, and 2) those that are quick, but less secure. Most often a combination of the two approaches can be used, according to an exemplary embodiment (e.g.: secure socket layer (SSL)), whereby we establish the connection with a secure algorithm, and then if successful, encrypt the actual transmission with the weaker, but much faster algorithm.

Symmetric Cryptography

Symmetric Cryptography, according to an exemplary embodiment, is the most traditional form of cryptography. In a symmetric cryptosystem, the involved parties share a common secret (password, pass phrase, or key), according to an exemplary embodiment. Data can be encrypted and decrypted using the same key, according to an exemplary embodiment. These symmetric cryptography algorithms tend to be comparatively fast, but the algorithms cannot be used unless the involved parties have already exchanged keys, according to an exemplary embodiment. Any party possessing a specific key can create encrypted messages using that key as well as decrypt any messages encrypted with the key, according to an exemplary embodiment. In systems involving a number of users who each need to set up independent, secure communication channels, symmetric cryptosystems can have practical limitations due to the requirement to securely distribute and manage large numbers of keys, according to an exemplary embodiment.

Common examples of symmetric algorithms include, e.g., but not limited to, DES, 3DES and/or AES, etc. The 56-bit keys used in DES are short enough to be easily brute-forced by modern hardware and DES should no longer be used, according to an exemplary embodiment. Triple DES (or 3DES) uses the same algorithm, applied three times with different keys giving it an effective key length of 128 bits, according to an exemplary embodiment. Due to the problems using the DES algorithm, the United States National Institute of Standards and Technology (NIST) hosted a selection process for a new algorithm. The winning algorithm was Rijndael and the associated cryptosystem is now known as the Advanced Encryption Standard or AES, according to an exemplary embodiment. For most applications 3DES, according to an exemplary embodiment, is acceptably secure at the current time, but for most new applications it is advisable to use AES, according to an exemplary embodiment.

Asymmetric Cryptography (also called Public/Private Key Cryptography)

Asymmetric algorithms, according to an exemplary embodiment, use two keys, one to encrypt the data, and either key to decrypt. These inter-dependent keys are generated together, according to an exemplary embodiment. One key is labeled the Public key and is distributed freely, according to an exemplary embodiment. The other key is labeled the Private Key and must be kept hidden, according to an exemplary embodiment. Often referred to as Public/Private Key Cryptography, these cryptosystems can provide a number of different functions depending on how they are used, according to an exemplary embodiment.

The most common usage of asymmetric cryptography is to send messages with a guarantee of confidentiality, according to an exemplary embodiment. If User A wanted to send a message to User B, User A would get access to User B's publicly available Public Key, according to an exemplary embodiment. The message is then encrypted with this key and sent to User B, according to an exemplary embodiment. Because of the cryptosystem's property that messages encoded with the Public Key of User B can only be decrypted with User B's Private Key, only User B can read the message, according to an exemplary embodiment.

Another usage scenario is one where User A wants to send User B a message and wants User B to have a guarantee that the message was sent by User A, according to an exemplary embodiment. In order to accomplish this, User A can encrypt the message with their Private Key, according to an exemplary embodiment. The message can then only be decrypted using User A's Public Key, according to an exemplary embodiment. This can guarantee that User A created the message because User A is then the only entity who had access to the Private Key required to create a message that can be decrypted by User A's Public Key, according to an exemplary embodiment. This is essentially a digital signature guaranteeing that the message was created by User A, according to an exemplary embodiment.

A Certificate Authority (CA), whose public certificates are installed with browsers or otherwise commonly available, may also digitally sign public keys or certificates, according to an exemplary embodiment. One can authenticate remote systems or users via a mutual trust of an issuing CA, according to an exemplary embodiment. One can trust their 'root' certificates, according to an exemplary embodiment, which in turn authenticates the public certificate presented by the server.

PGP and SSL are prime examples of systems implementing asymmetric cryptography, using RSA and/or other algorithms, according to an exemplary embodiment.

Hashes

Hash functions, according to an exemplary embodiment, take some data of an arbitrary length (and possibly a key or password) and generate a fixed-length hash based on this input. Hash functions used in cryptography have the property that it can be easy to calculate the hash, but difficult or impossible to re-generate the original input if only the hash value is known, according to an exemplary embodiment. In addition, hash functions useful for cryptography have the property that it is difficult to craft an initial input such that the hash will match a specific desired value, according to an exemplary embodiment.

MD5 and SHA-1 are common hashing algorithms, according to an exemplary embodiment. These algorithms are considered weak and are likely to be replaced in due time after a process similar to the AES selection, according to an exemplary embodiment. New applications should consider using SHA-256 instead of these weaker algorithms, according to an exemplary embodiment.

Key Exchange Algorithms

There are also key exchange algorithms (such as Diffie-Hellman for SSL), according to an exemplary embodiment. These key exchange algorithms can allow use to safely exchange encryption keys with an unknown party, according to an exemplary embodiment.

Algorithm Selection

As modern cryptography relies on being computationally expensive to break, according to an exemplary embodiment, specific standards can be set for key sizes that can provide assurance that with today's technology and understanding, it will take too long to decrypt a message by attempting all possible keys, according to an exemplary embodiment.

Therefore, we need to ensure that both the algorithm and the key size are taken into account when selecting an algorithm, according to an exemplary embodiment.

In this document, the terms "computer program medium" and "computer readable medium" may be used to generally refer to media such as, e.g., but not limited to removable storage drive 514, a hard disk installed in hard disk drive 512, and signals 528, etc. These computer program products may provide software to computer system 500. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it may be appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may may include one or more processors.

Embodiments of the present invention may include apparatuses for performing the operations herein. An apparatus may be specially constructed for the desired purposes, or it may may include a general purpose device selectively activated or reconfigured by a program stored in the device.

In yet another exemplary embodiment, the invention may be implemented using a combination of any of, e.g., but not limited to, hardware, firmware and software, etc.

In one or more embodiments, the present embodiments are embodied in machine-executable instructions. The instructions can be used to cause a processing device, for example a general-purpose or special-purpose processor, which is programmed with the instructions, to perform the steps of the present invention. Alternatively, the steps of the present invention can be performed by specific hardware components that contain hardwired logic for performing the steps, or by any combination of programmed computer components and custom hardware components. For example, the present invention can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present invention can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution).

Exemplary Communications Embodiments

In one or more embodiments, the present embodiments are practiced in the environment of a computer network or networks. The network can include a private network, or a public network (for example the Internet, as described below), or a combination of both. The network includes hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them called interprocess communication pathways.

On these pathways, appropriate communications protocols are used. The distinction between hardware and software may not be easily defined, with the same or similar functions capable of being preformed with use of either, or alternatives.

An exemplary computer and/or telecommunications network environment in accordance with the present embodiments may include node, which include may hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently.

In an exemplary embodiment, the processes may communicate with one another through interprocess communication pathways (not labeled) supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless e-mail devices including BlackBerry™ devices), document processing devices (such as scanners, printers, facsimile machines, or multifunction document machines), or complex entities (such as local-area networks or wide area networks) to which are connected a collection of processors, as described. For example, in the context of the present invention, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present invention, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include BlueTooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

The embodiments may be employed across different generations of wireless devices. This includes 1G-5G according to present paradigms. 1G refers to the first generation wide area wireless (WWAN) communications systems, dated in the 1970s and 1980s. These devices are analog, designed for voice transfer and circuit-switched, and include AMPS, NMT and TACS. 2G refers to second generation communications, dated in the 1990s, characterized as digital, capable of voice and data transfer, and include HSCSD, GSM, CDMA IS-95-A and D-AMPS (TDMA/IS-136). 2.5G refers to the generation of communications between 2G and 3 G. 3G refers to third generation communications systems recently coming into existence, characterized, for example, by data rates of 144 Kbps to over 2 Mbps (high speed), being packet-switched, and permitting multimedia content, including GPRS, 1×RTT, EDGE, HDR, W-CDMA. 4G refers to fourth generation and provides an end-to-end IP solution where voice, data and streamed multimedia can be served to users on an "anytime, anywhere" basis at higher data rates than previous generations, and will likely include a fully IP-based and integration of systems and network of networks achieved after convergence of wired and wireless networks, including computer, consumer electronics and communications, for providing 100 Mbit/s and 1 Gbit/s communications, with end-to-end quality of service and high security, including providing services anytime, anywhere, at affordable cost and one billing. 5G refers to fifth generation and provides a complete version to enable the true World Wide Wireless Web (WWWW), i.e., either Semantic Web or Web 3.0, for example. Advanced technologies may include intelligent antenna, radio frequency agileness and flexible modulation are required to optimize ad-hoc wireless networks.

As noted, each node 102-108 may include one or more processes 112, 114, executable by processors 110 incorporated into the nodes. In a number of embodiments, the set of processes 112, 114, separately or individually, can represent entities in the real world, defined by the purpose for which the invention is used.

Furthermore, the processes and processors need not be located at the same physical locations. In other words, each processor can be executed at one or more geographically distant processor, over for example, a LAN or WAN connection. A great range of possibilities for practicing the embodiments may be employed, using different networking hardware and software configurations from the ones above mentioned.

CONCLUSION

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. An electronic computer-implemented method of electronically constructing electronic data indicative of an investible risk factor portfolio of financial objects comprising:

electronically constructing, by at least one electronic computer processor, electronic data indicative of an index comprising:
  electronically receiving, by said at least one electronic computer processor, a plurality of accounting-based data about a plurality of companies in a starting investable universe;
  electronically determining, by said at least one electronic computer processor, a relative cumulative non-market capitalization metric-based size score of each of said plurality of said companies in said starting investable universe using a plurality of non-market capitalization-based metrics of said plurality of said accounting-based data about said plurality of said companies in said starting investable universe;
  electronically ranking by said relative cumulative non-market capitalization metric-based size score, by said at least one electronic computer processor, a ranked plurality of said plurality of said companies in said starting investable universe within a given at least one geographic market regions;
  electronically selecting, by said at least one electronic computer processor, a first threshold top percentage range of a float-adjusted relative cumulative non-capitalization metric-based size score of each of said ranked plurality of said plurality of said companies in said starting investable universe within said given at least one geographic market region, wherein said relative cumulative non-capitalization metric-based size score is computed based upon a weighted average of said plurality of non-market capitalization-based metrics of said plurality of said accounting-based data about said plurality of said plurality of companies in said starting universe, to electronically obtain an electronic list indicative of selected electronic index constituents of said given at least one geographic market region; and
  electronically weighting, by said at least one electronic computer processor, said electronic list indicative of said electronic index constituents by:
    electronically carving out and assigning a float-adjusted market capitalization-based weight, by said at least one electronic computer processor, to each of said selected electronic index constituents for each of said given at least one geographic market regions, said selected electronic list indicative of said electronic index constituents electronically obtained by said electronically selecting of said first threshold top percentage range of said float-adjusted relative cumulative non-capitalization metric-based size score, and electronically normalizing said float-adjusted market capitalization-based weight of each of said selected electronic index constituents within each of said given at least one geographic market region, to electronically obtain electronic data indicative of an index of said financial objects comprising said electronic list indicative of said selected electronic index constituents and said float-adjusted market capitalization-based weights;
electronically constructing, by said at least one electronic computer processor, electronic data indicative of at least one investible portfolio based on said electronic data indicative of said index of said financial objects; and electronically providing, by said at least one electronic computer processor, at least one or more of: said electronic data indicative of said index of said financial objects, or said electronic data indicative of said at least one investible portfolio based on said index of said financial objects.

2. The method of claim 1, wherein said a-weighted average of said plurality of non-market capitalization-based metrics comprises:

electronically weighting, by the at least one electronic computer processor, a weighted average of:
electronic data indicative of adjusted sales;
electronic data indicative of adjusted cash flow;
electronic data indicative of dividends and buybacks; and
electronic data indicative of book value and intangibles.

3. The method of claim 2, comprising at least one or more of the following:

wherein said electronic data indicative of adjusted sales comprises a mathematical multiplicative product of electronic data indicative of company sales, multiplied by electronic data indicative of company equity to assets ratio, and averaged over a past five (5) years period;

wherein said electronic data indicative of adjusted cash flow comprises a mathematical sum of an average of five (5) years of electronic data indicative of company operating cash flow, added to company research and development (R&D) expenses averaged over a past five (5) years period by electronic data indicative of company equity to assets ratio, and averaged over a past five (5) years period;

wherein said electronic data indicative of dividends and buybacks comprises a mathematical average of electronic data indicative of dividends paid and electronic data indicative of share buybacks over the past five (5) years period; or wherein said electronic data indicative of book value and intangibles comprises a mathematical sum of electronic data indicative of most recent company book value, added to electronic data indicative of research capital, wherein said electronic data indicative of research capital comprises accumulation of depreciated research and development (R&D) expenses over a past six (6) years period.

4. The method of claim 1, wherein said weighted average comprises:

electronically equally weighting, by the at least one electronic computer processor, each of said electronic data indicative of adjusted sales; said electronic data indicative of adjusted cash flow; said electronic data indicative of dividends and buybacks; and said electronic data indicative of book value and intangibles.

5. The method of claim 1, further comprising:
electronically constructing, by the at least one electronic computer processor, an investible capitalization-weighted global index portfolio based on said electronic data indicative of said index of said financial objects, and said electronic data indicative of said at least one investible portfolio based on said index of said financial objects.

6. The method of claim 1, wherein said first top-threshold top percentage range calculated comprises a top 86%-98% of said float-adjusted relative cumulative non-capitalization metric-based size score.

7. The method of claim 6, wherein said first top-threshold top percentage range calculated comprising said top 86%-98% of said float-adjusted relative cumulative non-capitalization metric-based size score comprises a large company portfolio, and a mid-size company portfolio.

8. The method of claim 1, wherein said at least one plurality of geographic market regions comprises at least one or more of:
at least one country geographic market region;
a US geographic market region;
a Japan geographic market region;
a UK geographic market region;
an at least one country of Europe except UK geographic market region;
an at least one country Other Developed geographic market region; or
an at least one country emerging markets geographic market region.

9. The method of claim 1, wherein said electronically weighting and said electronically combining comprise at least one or more of:
electronically computing an average;
electronically computing a weighted average;
electronically computing a mean; or
electronically calculating a median.

10. The method of claim 1, further comprising:
electronically rebalancing or electronically reconstituting, by said at least one electronic computer processor, said at least one investible portfolio.

11. The method of claim 10, wherein said electronically rebalancing or said electronically reconstituting comprises electronically rebalancing or electronically reconstituting, by said at least one electronic computer processor, on a periodic basis.

12. The method of claim 11, wherein said electronically rebalancing periodically, or said electronically reconstituting periodically comprises, by said at least one electronic computer processor, at least one or more of:
electronically rebalancing or electronically reconstituting annually;
electronically rebalancing or electronically reconstituting by accounting period;
electronically rebalancing or electronically reconstituting monthly;
electronically rebalancing or electronically reconstituting quarterly; or
electronically rebalancing or electronically reconstituting biannually.

13. The method of claim 10, wherein said electronically rebalancing or said electronically reconstituting, comprises at least or more one of:
electronically rebalancing or electronically reconstituting upon reaching a threshold;
electronically rebalancing or electronically reconstituting said at least one investible portfolio as at least one investible portfolio changes over time; or
electronically rebalancing or electronically reconstituting said at least one investible portfolio to match said index as it changes over time.

14. The method of claim 10, wherein said electronically rebalancing or said electronically reconstituting comprises rebalancing or reconstituting annually on a third Friday of March.

15. The method of claim 1, wherein said computed weighted average comprises:
  equally weighting across said plurality of non-market capitalization metrics.

16. The method of claim 1, wherein said at least one geographic market regions comprises at least one or more of:
  at least one country geographic market region;
  a US geographic market region;
  a Japan geographic market region;
  a UK geographic market region;
  an at least one country of Europe except UK geographic market region;
  an Other Developed geographic market region;
  an emerging markets (EM) geographic market region except China; or
  a China market region.

17. The method of claim 1, wherein said at least one plurality of geographic market regions comprises at least one or more of:
  at least one country geographic market region;
  a US geographic market region;
  a Japan geographic market region;
  a UK geographic market region;
  an at least one country of Europe except UK geographic market region;
  an at least one country Other Developed geographic market region;
  an at least one country emerging markets (EM) geographic market region except China;
  a China market region; or
  another geographic market region.

18. The method according to claim 1, wherein said first threshold top percentage range calculated comprises:
  a top about 86% of said float-adjusted relative cumulative non-capitalization metric-based size score; and
  wherein said electronically providing comprises electronically providing by an electronic graphical user interface (GUI) decision support system, executed on said at least one computer processor, electronically displaying said electronic data indicative of said at least one investible portfolio based on the electronic data indicative of the electronic index of financial objects, via said GUI decision support system.

19. A computer program product embodied on at least one computer accessible storage medium, comprising a plurality of instructions, which when executed by at least one electronic computer processor performs a method of electronically constructing electronic data indicative of an investible risk factor portfolio of financial objects, the method comprising:
  electronically constructing, by at least one electronic computer processor, electronic data indicative of an index comprising:
    electronically receiving, by said at least one electronic computer processor, a plurality of accounting-based data about a plurality of companies in a starting universe;
    electronically determining, by said at least one electronic computer processor, a relative cumulative non-market capitalization metric-based size score of each of said plurality of said companies in said starting investable universe using a plurality of non-market capitalization-based metrics of said plurality of said accounting-based data about said plurality of said companies in said starting investable universe;
    electronically ranking by said relative cumulative non-market capitalization metric-based size score, by said at least one electronic computer processor, a ranked plurality of said plurality of said companies in said starting investable universe within a given at least one geographic market region;
    electronically selecting, by said at least one electronic computer processor, a first threshold top percentage range of a float-adjusted relative cumulative non-capitalization metric-based size score of each of said ranked plurality of said plurality of said companies in said starting investable universe within said given at least one geographic market region, wherein said relative cumulative non-capitalization metric-based size score is computed based upon a weighted average of said plurality of non-market capitalization-based metrics of said plurality of said accounting-based data about said plurality of said plurality of companies in said starting universe, to electronically obtain an electronic list indicative of selected electronic index constituents of said given at least one geographic market regions; and
    electronically weighting, by said at least one electronic computer processor, said electronic list indicative of said electronic index constituents by:
      electronically carving out and assigning a float-adjusted market capitalization-based weight, by said at least one electronic computer processor, to each of said selected electronic index constituents for each of said given at least one geographic market regions, said selected electronic list indicative of said electronic index constituents electronically obtained by said electronically selecting of said first threshold top percentage range of said float-adjusted relative cumulative non-capitalization metric-based size score, and electronically normalizing said float-adjusted market capitalization-based weight of each of said selected electronic index constituents within each of said given at least one geographic market region, to electronically obtain electronic data indicative of an index of said financial objects comprising said electronic list indicative of said selected electronic index constituents and said float-adjusted market capitalization-based weights;
  electronically constructing, by the at least one processor, electronic data indicative of at least one investible portfolio based on said electronic data indicative of said index of said financial objects; and
  electronically providing, by said at least one electronic computer processor, at least one or more of: said electronic data indicative of said index of said financial objects, or said electronic data indicative of said at least one investible portfolio based on said index of said financial objects.

20. An electronic system of electronically constructing electronic data indicative of an investible risk factor portfolio of financial objects comprising:
  at least one electronic network subsystem;
  a selection filter electronic subsystem coupled to at least one universe company accounting data database, at least one equally weighted non-market capitalization metric weighted relative size database, and at least one constituents database, comprising:
    at least one electronic computer processor;
    at least one electronic storage device; and at least one electronic communications interface coupled to said at least one network subsystem;

a weighting filter electronic subsystem coupled to said at least one universe company accounting data database, said at least one equally weighted non-market capitalization metric weighted relative size database, said at least one constituents database, and at least one weightings database, comprising:
  at least one electronic computer processor;
  at least one electronic storage device; and
  at least one electronic communications interface coupled to said at least one network subsystem;

an index management and portfolio rebalancing electronic subsystem coupled to said selection filter electronic subsystem, and said weighting filter electronic subsystem, comprising:
  at least one electronic computer processor;
  at least one electronic storage device; and
  at least one electronic communications interface coupled to said at least one network subsystem;

wherein the electronic system is configured to electronically construct by one of said at least one electronic computer processors, electronic data indicative of an index comprising wherein the system is configured to:
  electronically receive by one of said at least one electronic computer processors, a plurality of accounting-based data about a plurality of companies in a starting investable universe;
  electronically determine by one of said at least one electronic computer processors, a relative cumulative non-market capitalization metric-based size score of each of said plurality of said companies in said starting investable universe using a plurality of non-market capitalization-based metrics of said plurality of said accounting-based data about said plurality of said companies in said starting investable universe;
  electronically rank by said relative cumulative non-market capitalization metric-based size score, by one of said at least one electronic computer processors, a ranked plurality of said plurality of said companies in said starting investable universe within a given at least one geographic market regions;
  electronically select, by one of said at least one electronic computer processors, a first threshold top percentage range of a float-adjusted relative cumulative non-capitalization metric-based size score of each of said ranked plurality of said plurality of said companies in said starting investable universe within said given at least one geographic market region, wherein said relative cumulative non-capitalization metric-based size score is computed based upon a weighted average of said plurality of non-market capitalization-based metrics of said plurality of said accounting-based data about said plurality of said plurality of companies in said starting universe, to electronically obtain an electronic list indicative of selected electronic index constituents of said given at least one geographic market region; and
  electronically weight, by one of said at least one electronic computer processors, said electronic list indicative of said electronic index constituents by wherein the system is configured to:
    electronically carve out and assign a float-adjusted market capitalization-based weight, by one of said at least one electronic computer processors, to each of said selected electronic index constituents for each of said given at least one geographic market regions, said selected electronic list indicative of said electronic index constituents electronically obtained by said electronically select of said first threshold top percentage range of said float-adjusted relative cumulative non-capitalization metric-based size score, and electronically normalize said float-adjusted market capitalization-based weight of each of said selected electronic index constituents within each of said given at least one geographic market region, to electronically obtain electronic data indicative of an index of said financial objects comprising said electronic list indicative of said selected electronic index constituents and said float-adjusted market capitalization-based weights;

electronically construct, by one of said at least one electronic computer processors, electronic data indicative of at least one investible portfolio based on said electronic data indicative of said index of said financial objects; and electronically provide at least one or more of: said electronic data indicative of said index of said financial objects, or said electronic data indicative of said at least one investible portfolio based on said index of said financial objects.

* * * * *